(12) United States Patent
Samuels et al.

(10) Patent No.: US 7,630,305 B2
(45) Date of Patent: Dec. 8, 2009

(54) TCP SELECTIVE ACKNOWLEDGEMENTS FOR COMMUNICATING DELIVERED AND MISSED DATA PACKETS

(75) Inventors: Allen R. Samuels, San Jose, CA (US); Paul G. Sutter, San Francisco, CA (US)

(73) Assignee: Orbital Data Corporation, San Mateo, CA (US)

( * ) Notice: Subject to any disclaimer, the term of this patent is extended or adjusted under 35 U.S.C. 154(b) by 760 days.

(21) Appl. No.: 10/902,491

(22) Filed: Jul. 28, 2004

(65) Prior Publication Data

US 2005/0063303 A1   Mar. 24, 2005

Related U.S. Application Data

(63) Continuation-in-part of application No. 10/696,507, filed on Oct. 29, 2003.

(60) Provisional application No. 60/490,694, filed on Jul. 29, 2003.

(51) Int. Cl.
  *G06F 11/00* (2006.01)
  *G08C 25/02* (2006.01)
(52) U.S. Cl. ...................... 370/229; 714/748
(58) Field of Classification Search ............ None
  See application file for complete search history.

(56) References Cited

U.S. PATENT DOCUMENTS

| | | | |
|---|---|---|---|
| 4,701,745 A | 10/1987 | Waterworth et al. | |
| 5,029,164 A | 7/1991 | Goldstein et al. | |
| 5,822,543 A | 10/1998 | Dunn et al. | |
| 5,959,974 A * | 9/1999 | Badt et al. | 370/233 |
| 5,974,028 A * | 10/1999 | Ramakrishnan | 370/229 |
| 6,003,030 A | 12/1999 | Kenner et al. | |
| 6,005,843 A | 12/1999 | Kamiya et al. | |
| 6,252,851 B1 | 6/2001 | Siu et al. | |
| 6,405,252 B1 | 6/2002 | Gupta et al. | |
| 6,421,726 B1 | 7/2002 | Kenner et al. | |
| 6,452,915 B1 | 9/2002 | Jorgensen | |
| 6,496,856 B1 | 12/2002 | Kenner et al. | |
| 6,502,125 B1 | 12/2002 | Kenner et al. | |
| 6,546,425 B1 | 4/2003 | Hanson et al. | |
| 6,584,569 B2 | 6/2003 | Reshef et al. | |
| 6,611,522 B1 | 8/2003 | Zheng et al. | |
| 6,640,248 B1 | 10/2003 | Jorgensen | |
| 6,658,021 B1 | 12/2003 | Bromley et al. | |
| 6,665,706 B2 | 12/2003 | Kenner et al. | |

(Continued)

OTHER PUBLICATIONS

Mathis et al., RFC 2018— TCP Selective Acknowledgement Options, Oct. 1996, http://www.faqs.org/rfcs/rfc2018.html.*

(Continued)

*Primary Examiner*—Ayaz R Sheikh
*Assistant Examiner*—Timothy J Weidner
(74) *Attorney, Agent, or Firm*—Choate, Hall & Stewart LLP; John D. Lanza; Christopher McKenna

(57) ABSTRACT

One or more flow control modules, implemented on various types of network topologies, provide a number of functionalities for controlling the flow of IP packets (such as TCP/IP packets) over a network connection. The flow control modules may be implemented within a sender and/or receiver or may be deployed into a network as a separate device without requiring significant additional resources.

30 Claims, 13 Drawing Sheets

U.S. PATENT DOCUMENTS

| | | | |
|---|---|---|---|
| 6,687,227 B1 | 2/2004 | Li et al. | |
| 6,697,368 B2 | 2/2004 | Chang et al. | |
| 6,711,166 B1 | 3/2004 | Amir et al. | |
| 6,735,218 B2 | 5/2004 | Chang et al. | |
| 6,799,221 B1 | 9/2004 | Kenner et al. | |
| 6,820,133 B1 | 11/2004 | Grove et al. | |
| 6,834,297 B1 | 12/2004 | Peiffer et al. | |
| 6,850,491 B1 | 2/2005 | Firoiu et al. | |
| 6,901,072 B1 | 5/2005 | Wong | |
| 6,914,886 B2 | 7/2005 | Peles et al. | |
| 6,928,473 B1 * | 8/2005 | Sundaram et al. | 709/224 |
| 6,934,288 B2 * | 8/2005 | Dempo | 370/394 |
| 6,973,097 B1 * | 12/2005 | Donzis et al. | 370/470 |
| 6,980,543 B1 | 12/2005 | Kastenholz et al. | |
| 6,981,047 B2 | 12/2005 | Hanson et al. | |
| 6,981,087 B1 | 12/2005 | Heitkamp et al. | |
| 6,982,963 B2 | 1/2006 | Asahina et al. | |
| 7,016,367 B1 | 3/2006 | Dyckerhoff et al. | |
| 7,020,719 B1 | 3/2006 | Grove et al. | |
| 7,028,083 B2 | 4/2006 | Levine et al. | |
| 7,031,315 B2 | 4/2006 | Tanaka et al. | |
| 7,136,645 B2 | 11/2006 | Hanson et al. | |
| 7,209,437 B1 | 4/2007 | Hodgkinson et al. | |
| 7,352,702 B2 * | 4/2008 | Rosier | 370/236 |
| 7,536,473 B2 * | 5/2009 | Ajanovic et al. | 370/229 |
| 2001/0007137 A1 | 7/2001 | Suumaki et al. | |
| 2002/0071434 A1 | 6/2002 | Furukawa | |
| 2002/0089930 A1 * | 7/2002 | Aceves et al. | 370/230 |
| 2002/0089972 A1 | 7/2002 | Chang et al. | |
| 2002/0089977 A1 | 7/2002 | Chang et al. | |
| 2002/0090006 A1 | 7/2002 | Chang et al. | |
| 2002/0091884 A1 | 7/2002 | Chang et al. | |
| 2002/0097713 A1 | 7/2002 | Chang et al. | |
| 2002/0112152 A1 | 8/2002 | VanHeyningen et al. | |
| 2002/0138551 A1 | 9/2002 | Erickson | |
| 2002/0141418 A1 | 10/2002 | Ben-Dor et al. | |
| 2002/0191600 A1 | 12/2002 | Shah et al. | |
| 2003/0023746 A1 | 1/2003 | Loguinov | |
| 2003/0035413 A1 | 2/2003 | Herle et al. | |
| 2003/0086403 A1 * | 5/2003 | Harris et al. | 370/338 |
| 2003/0115331 A1 * | 6/2003 | Xie et al. | 709/227 |
| 2003/0123394 A1 | 7/2003 | Neale et al. | |
| 2003/0123481 A1 | 7/2003 | Neale et al. | |
| 2003/0128704 A1 * | 7/2003 | Mizrachi et al. | 370/394 |
| 2003/0131079 A1 * | 7/2003 | Neale et al. | 709/220 |
| 2003/0131263 A1 | 7/2003 | Keane et al. | |
| 2003/0191799 A1 | 10/2003 | Araujo et al. | |
| 2003/0202480 A1 | 10/2003 | Swami | |
| 2003/0223361 A1 | 12/2003 | Hussain et al. | |
| 2003/0229718 A1 | 12/2003 | Tock et al. | |
| 2003/0233581 A1 | 12/2003 | Reshef et al. | |
| 2003/0236887 A1 | 12/2003 | Kesselman et al. | |
| 2004/0001691 A1 * | 1/2004 | Li et al. | 386/46 |
| 2004/0006643 A1 * | 1/2004 | Dolson et al. | 709/246 |
| 2004/0078465 A1 | 4/2004 | Coates et al. | |
| 2004/0085902 A1 | 5/2004 | Miller et al. | |
| 2004/0107360 A1 | 6/2004 | Herrmann et al. | |
| 2004/0127131 A1 | 7/2004 | Potnis | |
| 2004/0258003 A1 | 12/2004 | Kokot et al. | |
| 2005/0078171 A1 | 4/2005 | Firestone et al. | |
| 2005/0080876 A1 | 4/2005 | Peiffer et al. | |
| 2005/0089049 A1 | 4/2005 | Chang et al. | |
| 2005/0135250 A1 | 6/2005 | Singh et al. | |
| 2005/0223114 A1 | 10/2005 | Hanson et al. | |
| 2005/0223115 A1 | 10/2005 | Hanson et al. | |
| 2005/0229237 A1 | 10/2005 | Xie et al. | |

OTHER PUBLICATIONS

International Preliminary Report on Patentability, PCT/US2004/024655, Feb. 9, 2006, 7 pages.

Notification Of Transmittal Of The International Search Report And The Written Opinion Of The International Searching Authority, Or The Declaration, PCT/USO4/24655, Jun. 10, 2005, 9 pages.

Border, J. et al., "Performance Enhancing Proxies Intended To Mitigate Link-Related Degradations," PILC—Perfomance Enhancing Proxies, Jun. 2001, pp. 1-45, RFC 3135.

Border, J. et al., PILC: Performance Enhancing Proxies (PEPs), 46$^{th}$ IETF, Nov. 10, 1999, pp. 1-17.

Davison, B. et al., "A Split Stack Approach to Mobility-Providing Performance-Enhancing Proxies," Lehigh University, Nov. 2002, pp. 1-13, Bethlehem, PA.

Ehsan, N. et al., "Evaluation Of Performance Enhancing Proxies In Internet Over Satellite," International Journal Of Communication Systems, Sep. 17, 2002, 22 pages.

Vangala, S. et al., "Performance Of TCP Over Wireless Networks With The Snoop Protocol," University Of South Florida, 2 pages, Tampa, FL, 2002.

Fendick et al., ACM SIGCOMM Computer Communication Review, vol. 22, Issue 4, pp. 136-148, Oct. 1992.

Santos J. et al., Increasing Effective Link Bandwidth by Suppressing Replicated Data, Proceedings of the Annual Technical Conference on USENIX, pp. 213-224, Jun. 1998.

Kalampoukas et al., Improving {TCP} Throughput over Two-Way Asymmetric Links: Analysis and Solutions, In Proc. of Sigmetrics, pp. 78-89, 1998.

Jing J. et al., Client Server Computing in Mobile Environments, ACM Computing Surveys, vol. 31, No. 2, pp. 117-157 Jun. 1999.

Samaraweera, Return link optimization for internet service provision using DVB-S networks, ACM SIGCOMM Computer Communication Review, vol. 29, Issue 3, pp. 4-13, Jul. 1999.

Spring N. et al., A Protocol Independent Technique for Eliminating Redundant Network Traffic, Proceedings of SIGCOMM 2000, Aug. 2000.

RFC 3135—Performance Enhancing Proxies Intended to Mitigate Link-Related Degradations, available online at: http://www.faqs.org/rfcs/rfc3135.html, Jun. 2001.

Dutta D. et al., An Active Proxy Based Architecture for TCP in Heterogeneous Variable Bandwidth Networks, Proceedings of IEEE Globecom 2001, vol. 4, p. 2316-2320, Nov. 2001.

Ishac J. et al., Proceedings of IEEE MILCOM 2001, vol. 1, pp. 700-704, 2001.

RFC 3040— Internet Web Replication and Caching Taxonomy, Jan. 2001.

Feighery P., Frequently Asked Questions (FAQ) for Performance Enhancing Proxies (PEPs). Hints on How to Configure PEPs, Online document, Jun. 27, 2005.

Non-Final Office Action, USPTO, U.S. Appl. No. 10/901,952, filed Sep. 14, 2007.

Non-Final Office Action, USPTO, U.S. Appl. No. 10/696,507, filed Apr. 13, 2007.

Non-Final Office Action, USPTO, U.S. Appl. No. 10/902,493, filed Jan. 7, 2008.

Non-Final Office Action. USPTO, U.S. Appl. No. 10/901,940, filed Feb. 20, 2008. 12 pages.

Non Final Office Action. USPTO, U.S. Appl. No. 10/902,509, filed Mar. 18, 2008. 14 pages.

Non Final Office Action. USPTO, U.S. Appl. No. 10/901,691, filed Mar. 20, 2008. 15 pages.

Non Final Office Action. UPSTO, U.S. Appl. No. 10/696,507, filed Apr. 1, 2008. 17 pages.

Final Office Action, USPTO, U.S. Appl. No. 10/901,952, filed Apr. 24, 2008. 9 pages.

* cited by examiner

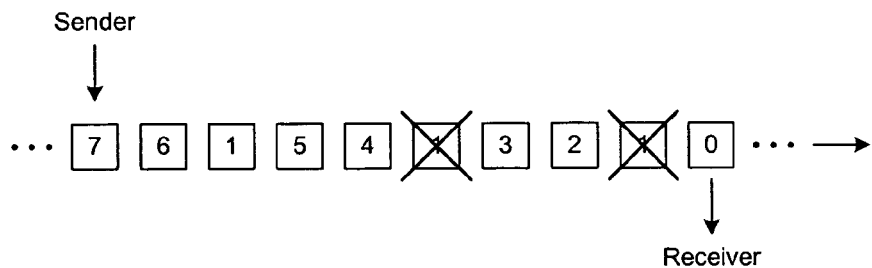
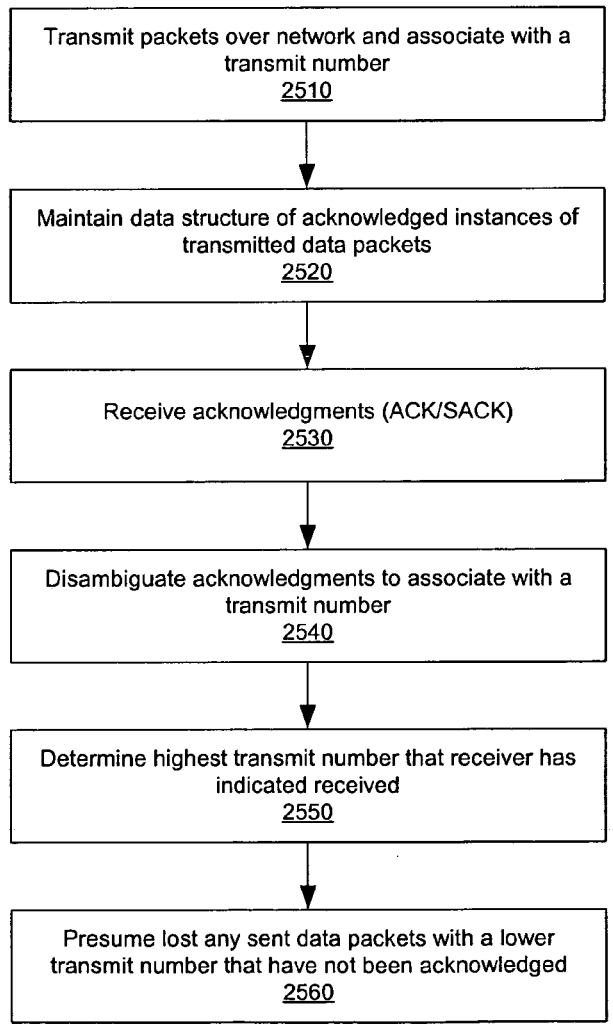
FIG. 24
FIG. 25

TCP SELECTIVE ACKNOWLEDGEMENTS FOR COMMUNICATING DELIVERED AND MISSED DATA PACKETS

CROSS REFERENCE TO RELATED APPLICATIONS

This application claims the benefit of U.S. Provisional Application No. 60/490,694, filed Jul. 29, 2003, which is incorporated by reference in its entirety. This application is also a continuation-in-part of co-pending U.S. application Ser. No. 10/696,507, filed Oct. 29, 2003, which is incorporated by reference in its entirety.

This application is related to the following, each of which is incorporated by reference in its entirety: co-pending U.S. Application entitled "Flow Control System Architecture," U.S. Application No. 10/901,952, filed Jul. 28, 2004; co-pending U.S. Application entitled "Automatic Detection and Window Virtualization for Flow Control," U.S. application Ser. No. 10/901,691, filed Jul. 28, 2004; co-pending U.S. Application entitled "Early Generation of Acknowledgements for Flow Control," U.S. application Ser. No. 10/902,509, filed Jul. 28, 2004; co-pending U.S. Application entitled "Wavefront Detection and Disambiguation of Acknowledgements," U.S. application Ser. No. 10/902,493, filed Jul. 28, 2004; and co-pending U.S. Application entitled "Transaction Boundary Detection for Reduction in Timeout Penalties," U.S. application Ser. No. 10/901,940, filed Jul. 28, 2004.

BACKGROUND

1. Field of the Invention

This invention pertains to the processing of computer networks, networking equipment, and networking protocols, and in particular to systems that enhance the performance of existing networking applications through the deployment of additional networking entities.

2. Background of the Invention

Many computer networking technologies and protocols are well known. One of the most widely used protocols is the Internet protocol (IP). IP is a connectionless, best-effort, unreliable, routable networking protocol. Applications that require reliable communications typically use the Transmission Control Protocol (TCP) on top of IP. The TCP protocol layer provides required functionality such as flow control, packet loss detection, lost packet retransmission, congestion avoidance, etc. (hereinafter referred to as upper-layer behaviors) that are needed to provide reliable communications over the unreliable IP networking substrate. This pair of networking protocols is common enough that they are often referred to jointly as TCP/IP. Detailed descriptions of TCP and IP are found in RFC 792 and RFC 793.

Research has developed a simple model that predicts the maximum performance of TCP implementations that use the standard congestion avoidance algorithm (TCP Reno and TCP Tahoe). One good explanation of this model and its derivation is in a paper by Matthew Mathis, Jeffrey Semke, and Jamashid Mahdavi, entitled "The Macroscopic Behavior of TCP Congestion Avoidance Algorithm." Equation 3 of the paper provides a simple model of TCP performance:

$$BW = (MSS * C)/(RTT * SQRT(P))$$

where:
BW=Bandwidth for the TCP Connection
MSS=Maximum Segment Size, i.e., the size of the packets being transported
RTT=Round Trip Time
P=Percentage of packet loss in the network
C=A constant One of the surprising results of this model is that maximum TCP performance is unrelated to network speed. Another surprising result is that maximum performance is inversely related to round trip time (RTT).

Other phenomena may limit performance below what the model provides as a maximum. For example, if the receiver does not advertise a window that is at least as large as the bandwidth delay product of the connection, then maximum TCP performance will be limited accordingly. Standard implementations of TCP are also known to perform poorly in certain environments and/or conditions. For example, the high rate of packet loss in typical wireless links results in poor TCP performance.

One method of correcting many of these problems is to modify the TCP implementation of one or both of the participants. However, this is frequently not a viable option such as when the source code is unavailable or when there are too many endpoints to manage conveniently.

Another method is to interpose another element in the TCP conversation. This element, called a Performance Enhancing Proxy (PEP), applies algorithms to manipulate the conversation so as to overcome the performance limitations. There are types of conventional PEPs and PEP algorithms are known, as described for example in RFC 3135.

Deployment of conventional PEPs in a network is known by providing a new network processing node and routing packets through it. This technique suffers from at least two disadvantages: first, the extra expense of the additional processing node and its associated administrative overhead; and second, the conventional PEP often requires redundant processing due to the poor integration with the other nodes of the network.

Another method of deploying a conventional PEP is to insert it into the software driver stack of a node. Many operating systems provide the ability to insert a software agent (shim) between the TCP/IP processing stack and the driver for the network interface card (NIC). One advantage of this method is that no changes to the operating system are required, which, in any event, may be impossible since access to the source code is frequently limited. Even with access to the source code of an operating system, the operational issues associated with supplying and supporting customized versions of the operating system make this prohibitive in many environments.

Conventional PEPs have a number of shortcomings, including the need for substantial network changes, utility and application changes, administrative overhead, and extensive use of system and network resources. It would be desirable for the addition of PEPs (either in shim or stand-alone form) be done in such a way as to minimize changes required to other nodes of the network. In particular, no changes should be required to existing utilities and application programs. No changes to firewall settings, routing tables, or port assignments should be required. No retraining of users or network operations staff should be required. No re-installation of applications or utilities should be required. New software that is being developed should be able to take advantage of PEP capabilities without any change to the development process or to the software itself.

Ideally, existing network equipment and software, both on the Local Area Network (LAN) and the Wide Area Network (WAN), should require minimal, if any, modification. It would also be desirable for the PEP itself should not require substantial system resources, such as random access memory or disk storage. Requiring large amounts of these resources not only increases system expense, but also requires additional environment attention (more power, more space, etc.) and also reduces overall system reliability.

Likewise, it would be desirable for communications protocols used by the PEP to adhere to the standard TCP/IP protocols as they currently appear on the network, minimizing any disruption to existing network software or equipment and ensuring compatibility with new equipment that is currently in development now or in the future by inventors not aware of the present invention. Some prior art techniques translate the TCP/IP protocol into other protocols (e.g., User Datagram Protocol (UDP)), causing disruption to network monitoring, traffic shaping, Quality of Service (QoS), Service Level Agreement (SLA), statistics measuring applications, and others; they also require modifications to firewall and security settings due to the usage of protocols that were not previously employed. Worse, applications environments and settings will require modification to direct traffic flows to explicitly designated transcoding network nodes.

Security techniques that are currently deployed should be preserved wherever possible. It would be desirable for the PEP to be fully functional in the presence of modern encryption and authentication techniques.

Moreover, the PEP should operate incrementally, with a minimal increase in the latency of data transmission. It should not require access to multiple blocks of data before data transmission can begin. It would also be desirable to minimize a latency of data transiting a PEP.

Similarly, it would be desirable to have algorithms employed by a PEP not be subject to any arbitrary limits. They should scale to any arbitrary speed and handle any type of connection media, including high-delay satellite links, high loss-rate wireless and power-line networking links, and others. The algorithms should function properly in the presence of standard traffic management techniques. Plus, it should smoothly operate with any existing Quality of Service (QoS) or service level agreement (SLA) architecture that might be deployed, allowing these systems to limit the performance of the original endpoint, just as though the PEP were not present.

TCP connection characteristics can be measured along multiple dimensions. A partial list of the dimensions includes: RTT, connection bandwidth, aggregate loss rate, connection lifetime, application burstiness, and others. Across all of these dimensions, no algorithm can be optimal. A PEP should monitor the connection, characterizing it as conditions change, adapting the PEP algorithms accordingly.

One example of prior art is the Transporter Fountain from Digital Fountain Corporation of Fremont, Calif. The product is intended to transfer files across large RTT links without the performance limits that standard File Transfer Protocol-based (FTP) techniques suffer from. (FTP uses TCP/IP that has the performance limit described above.) This product consists of a "box" that the user connects to his network. The user must explicitly copy the files to be transferred to the box before the files can be transferred. Thus, all applications programs and scripts that wish to utilize the product must be changed to utilize the new box with its proprietary command set. Further, the transfer protocols used by the product are UDP based, requiring the modification of network settings, such as security, QoS, SLA, traffic management, and others. The transcoding from FTP to UDP interferes with any network element that might attempt to process the individual TCP connection, such as QoS, SLA or traffic management.

Another example of prior art is the Sequence Reducer from Peribit Corporation of Santa Clara, Calif. This product provides data compression using advanced data sequence recognition techniques developed for the Human Genome project. However, general-purpose lossless data compression is typically limited to a two- to three-times reduction in data, placing an upper limit on the total performance improvement that can be provided by this technique. Further, many data types are already compressed, wasting system resources attempting any further compression for these data types. The computational expense of this method requires the addition of an extra box to the network and limits the speed at which packets can be processed. Current CPU technology seems to limit processing speeds to about 45 Mb/sec (T3) for any one connection. Current data link speeds are well in excess of this limit and growing at a faster rate than CPU performance is growing. The product does not address the fundamental limits of the TCP/IP protocol and is thereby permanently limited to a maximum of two- to three-times performance improvement over offerings without the PEP.

Research into methods of improving the performance limit of TCP is on-going. One proposal, MulTCP, is documented in the paper "Differentiated End-to-End Internet Services using a Weighted Proportional Fair Sharing TCP" by John Crowcroft and Philippe Oechslin.

Consequently, a new system and/or method of creating and deploying of PEPs is required to efficiently integrate them into a network. These PEPs would preferably supply algorithms that remove the performance limitations inherent in TCP implementations.

SUMMARY OF THE INVENTION

The detection and retransmission of lost packets are important to reliable communications over a network. Accordingly, the invention provides methods, systems, and computer program products for communicating to a sender which data packets have arrived at a receiver, and conversely which data packets have not arrived. This communication can be performed using TCP/IP compatible selection acknowledgement packets, or SACKs.

In one embodiment, at a sender or a proxy acting therefore, data packets received over the network are tracked, for example in a list of ranges of data packet sequence numbers received. Selection acknowledgment (SACK) packets are generated, each SACK packet responsive to a landing data packet and identifying a plurality of ranges of data packets that had been received when the landing data packet was received. In a SACK packet, at least two of the ranges are consecutive to imply that a set of data packets between the consecutive ranges have not been received. The SACK packets are then transmitted to a receiver. In an embodiment, a receiver or a proxy acting therefore receives the SACK packets and infers that a set of data packets between the consecutive ranges have not been received. Based on this, the sender retransmits data packets according to any of a number of schemes.

BRIEF DESCRIPTION OF THE DRAWINGS

FIG. 24 illustrates an example of a series of data packets transmitted from a sender to a receiver over a network.

FIG. 25 is a flow chart of a method for wavefront detection and disambiguation of acknowledgments.

DETAILED DESCRIPTION OF THE PREFERRED EMBODIMENTS

Figure 1:
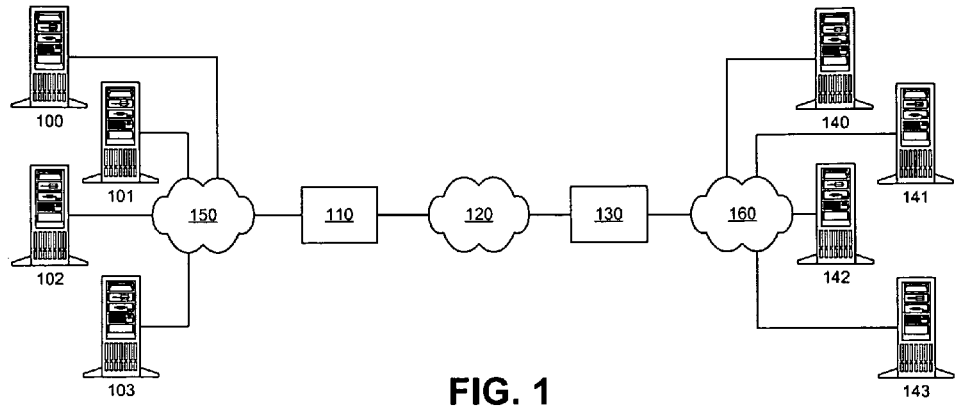
FIG. 1 depicts a Virtual Private Network gateway.

The present invention addresses the deficiencies of conventional PEPs. Several advances in the state of the art are provided, eliminating numerous barriers to deployment present in the prior art solutions. The present invention can be deployed into a network without requiring significant additional resources. The present invention is not fundamentally limited in its performance boost by RTT. Minimal additional latency is introduced by its presence in the network, allowing the PEP benefits to be extended to connections with small RTTs. Distributed implementations of the present invention support redundantly connected networks in order to provide superior reliability and scalable performance.

No changes in the network topology are required to obtain the benefits of the invention. No changes in application or utility programs or operational procedures are required. The invention interoperates seamlessly with the existing security, performance, QoS, SLA, traffic, and network management infrastructure. Usage of existing standard protocols and packet formats allows the invention to be deployed without modification to any part of the network and ensures compatibility with current and future developments in network processing devices.

Though the practitioner understands that the TCP protocol is bidirectional (i.e., every sender is also a receiver), and that every packet may contain information for both directions, this specification will normally describe only one direction of the TCP conversation. It should be understood that the techniques and methods described herein may be applied to one or both directions of a TCP connection, serially and/or simultaneously. In places where the bidirectional nature requires special handling, this specification will address specifically those issues when encountered. In addition, embodiments of the systems and processes described herein are configured for use with transmission control protocol ("TCP") data packets, alternative embodiments of the system and process are configured for use with other Internet-protocol ("IP") based packets, e.g., IP security ("IPSec"), IP version 4 ("IPV4"), IP version 6 ("IPV6", or user datagram protocol ("UDP") data packets.

Packet-switched networks are constructed of interior and endpoint elements. An endpoint element (or end node) is either a sender (or source or initiation) or receiver (or destination or responder) of data, i.e., a place where data enters or exits the network. Typically, an endpoint consists of a network interface card (NIC) for performing physical data reception and transmission and software running on a microprocessor (CPU) that processes the data packets. A new trend in endpoints is to recast portions of the processing software into hardware, improving system performance by reducing CPU processing. Endpoints can be dedicated processing devices as well as general-purpose computers. Many types of dedicated processing devices are known to have IP endpoints including: storage arrays, storage array controllers, storage switches, Fibre Channel bridges, remote tape libraries, disk arrays, file servers, mail servers, personal digital assistants (PDA), handheld computers, cellular phones, embedded computer systems, personal video recorders, media appliances, and others.

Many types of interior elements are known including: hubs, bridges, switches, routers, bridging routers, modems, gateways, and others. The interior elements may be divided into two categories: modifying and non-modifying. A non-modifying interior element passes packets through it without modifying the packet data. Typical nonmodifying interior elements include: hubs, bridges, switches, and others. Note that many interior elements also contain endpoints for maintenance, control, monitoring, and other reasons. Modifying interior elements perform some alteration of packets as they transit. Examples of modifying interior elements include: routers, gateways, modems, base stations, and others.

PEP Costs and Algorithms Classes

The interior elements of networks can be connected in many configurations. Often, redundant transmission paths are created to improve bandwidth and/or reliability. As described in RFC 3135, adding a conventional PEP to a network requires consideration of the network topology. A conventional PEP algorithm can be classified with respect to network topology. One class of conventional PEP algorithms requires that all packets associated with a single TCP connection pass through the same PEP instance (full-duplex). Another class of TCP PEP algorithms requires that only the data for one direction of a TCP connection pass through the same PEP instance (half-duplex). Yet another class of TCP PEP algorithms has no restriction of this type (unrestricted). Deployment of full- and half-duplex PEP algorithms may be restricted depending on the implementation of a PEP "instance."

Invariably, there is a cost to adding a conventional PEP to a network. The cost manifests itself both through increased computation requirements (i.e., associated with actually performing the conventional PEP algorithm itself) and increased latency. Indirect effects of the increased latency (hence increased RTT) caused by the transit of a packet through the conventional PEP implementation includes reduced TCP throughput and increased packet memory requirements. These increased costs may result in a situation where the benefits of the algorithms provided by the conventional PEP are insufficient to overcome the additional costs either in computation, latency, or both, resulting in an overall degradation of the system. An intelligent PEP in accordance with the present invention (an "enhanced PEP") will detect this situation and disable the algorithms that cause the degradation. In a preferred embodiment, an enhanced PEP algorithm that compensates for long RTT connections is disabled when the RTT of an individual connection is sufficiently low.

As another example, an enhanced PEP algorithm for repacketization might be disabled when the connection is to a well-known port for an application program known to provide maximum-sized packets. In the case where the PEP does not initially know that repacketization can be disabled, the enhanced PEP enables repacketization and observes the transiting traffic. Observation may indicate that repacketization is unnecessary, at which time the enhanced PEP disables the algorithm, thereby reducing processing time and decreasing latency. This decision need not be irrevocable. Observation of a connection with disabled repacketization may conclude that it is profitable to re-enable repacketization. Observation need not be continuous; intermittent observation will function equally well for many applications and further reduces processing requirements.

Also, implementation techniques that minimize latency through the enhanced PEP are beneficial. The enhanced PEP contains a list of TCP connections that are known to have no PEP algorithms enabled. Upon receiving an incoming packet, the enhanced PEP consults the list. If the packet belongs to a connection in the list, then the enhanced PEP immediately forwards the packet without applying any PEP algorithms. This "fast path" through the enhanced PEP reduces latency.

A second list contains rules for determining which PEP algorithms should be attempted for new connections. When the enhanced PEP receives a connection-initiating packet for TCP, it consults the rules list to determine if PEP algorithms should be attempted or if the fast path should be applied. The second section contains rules based on IP addresses and TCP port numbers.

Some enhanced PEP algorithms can be enabled or disabled on a packet-by-packet basis. These algorithms can monitor the conversation and adjust themselves accordingly. Other enhanced PEP algorithms only can be enabled or disabled when the TCP conversation is initiated. These algorithms monitor the connection open sequence (SYN packets) to make their choice. Other algorithms only can be enabled at open time, but can be abandoned at any point afterwards.

As described above, certain enhanced PEP algorithms require all of the connection data (either full- or half-duplex, hereinafter x-duplex) to flow through them. Deployment of these algorithms is conditional upon knowing that the x-duplex condition exists. Since network topologies can vary over time and since there is no topology change notification mechanism in an IP network, a PEP should be able to detect the creation and the destruction of the x-duplex condition. Detection of the negative x-duplex condition allows the enhanced PEP to disable the algorithms that would malfunction. It is acceptable for the detection algorithm to generate false negatives (i.e., where the detection algorithm incorrectly asserts a negative x-duplex condition) as the system continues to operate correctly, although the performance benefits of the disabled PEP algorithm are not obtained. In general, it may not be possible for the PEP directly to detect the existence of the x-duplex condition; however, it can detect it indirectly simply by assuming its existence and then detecting a negative x-duplex condition. One simple technique for detecting a negative x-duplex condition is to monitor the packet stream and look for acknowledgements to packets that have not been seen, this is an indication that packets are being sent through a different path. This technique is very accurate, generating false negatives only in the presence of a malicious third party (i.e., a node injecting packets into another endpoint's connection). Another method of detecting the negative x-duplex condition is to monitor timeouts. Too many timeouts in a time horizon are a strong indication of the negative x-duplex condition.

The x-duplex condition is a characteristic of network topology, not of an individual connection. Thus, when an enhanced PEP makes an assertion of the x-duplex condition, it applies not only to that connection, but to all other connections that are part of the same flow (see below for the definition of flow).

Packet Flow

A flow is the collection of packets and connections that passes through the same two nodes on the network. There may be variations in the routing before, between, and after the two nodes. Packets belonging to a flow share the same path maximum transmission unit (PMTU) and share the bandwidth of the network connections between the two nodes. Many PEP algorithms may be applied to all connections within a flow. For example, recongestion and repacketization operations are applied to all packets within a flow, optimizing the usage of system resources.

Flow Control System Overview

In conventional IP environments, e.g., transmission control protocol (TCP) environments, a sending node uses a slow start and congestion avoidance algorithms to determine data transmission rate. Because the data transmission rate determination is made in a distributed fashion based on packet loss feedback, response time is poor and utilization is often low in high latency circumstances.

Figure 16:
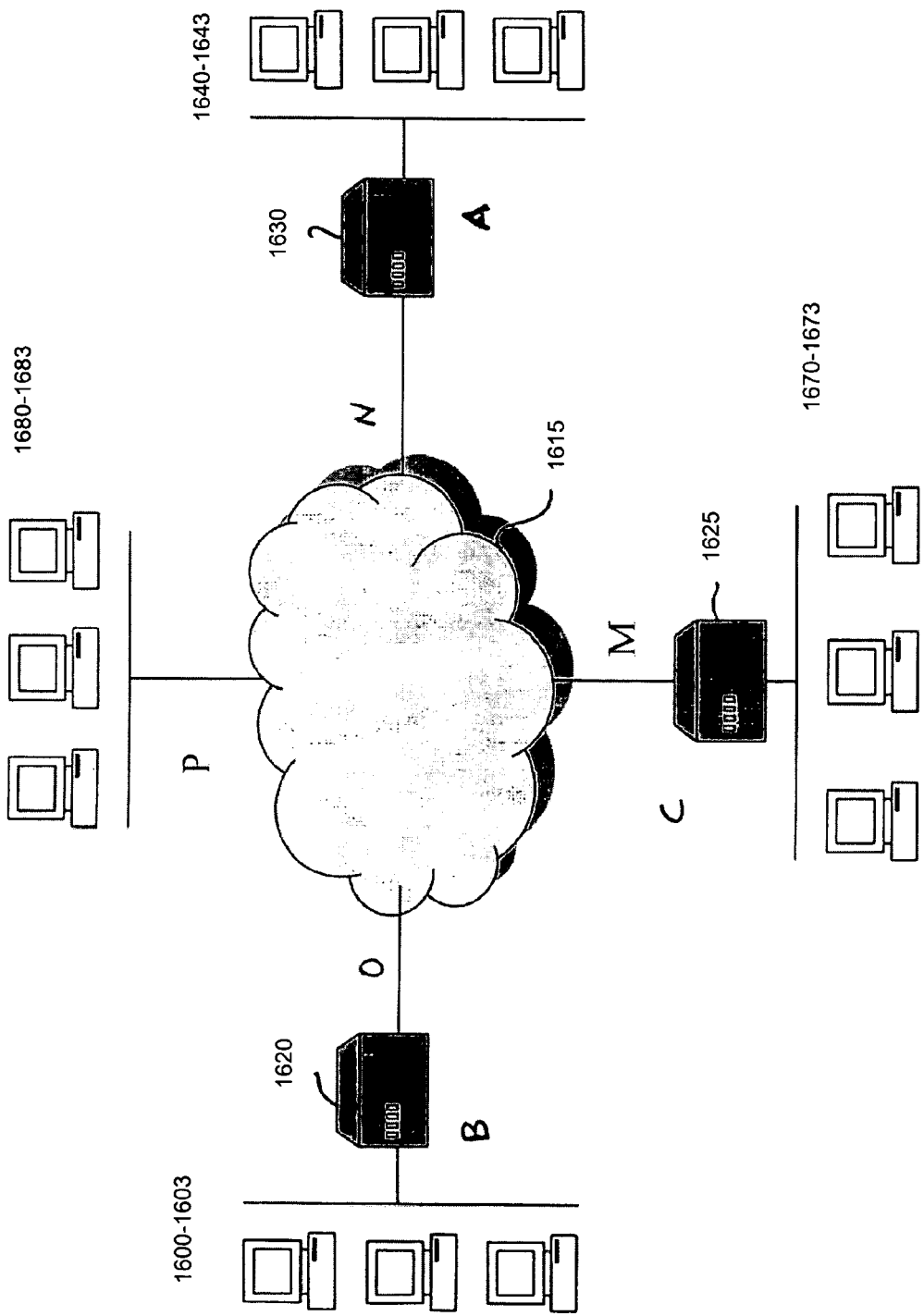
FIG. 16 illustrates one embodiment of a flow control system, which includes three flow control modules, for use in transporting data between a sender.

To address the shortcomings of conventional data communication environments such as TCP, one embodiment the present invention includes one or more flow control modules at bottleneck points in the network. FIG. 16 illustrates one embodiment of a flow control system, which includes three flow control modules, for use in transporting data between a sender and a receiver in accordance with the present invention.

FIG. 16 illustrates one embodiment of a flow control system 20 including a first flow control module 1620 and a second flow control module 1630 for use in transporting data from a first node, e.g., computer 1600, to a second node, e.g., computer 1640. In addition, the flow control system may have coupled with a third node, e.g., computer 175, which communicatively couples the wide area network 120.

The flow control system 20 includes a one or more first (or sender, sending, source, or initiating) nodes, e.g., computers 1600 to 1603, one or more second nodes (receiver, receiving, destination, or responding) nodes, e.g., computers 1640 to 1643, one or more third nodes (receiver, receiving, destination, or responding) nodes, e.g., computers 1670 to 1673, one or more fourth nodes (receiver, receiving, destination, or responding) nodes, e.g., computers 1680 to 1683, a first flow control module 1620, a second flow control module 1630, a third flow control module 1625, and a wide area network (e.g., the Internet) 1615.

Each one or more nodes may be networked, e.g., on a local area network (LAN), which are often high-speed networks and have shorter distances and/or latencies than wider area networks. The one or more nodes couple with a nearest flow control module in provided illustration, although the fourth set of one or more nodes A80 does not have an associated flow control module and is considered to be external to the flow control system, although interoperable with it. Each flow control module 1620, 1625, 1630 communicatively couples with the wide area network (WAN) 1615, which is often a low speed network and may have longer distances and/or latencies that LANs. In one embodiment, the flow control modules 1620, 1625, 1630 are inserted between the appropriate LAN and the WAN 1615. In addition, the LANs or WAN may be wired or wireless.

It is noted that the flow control modules 1620, 1625, 1630 may also be referred to as enhanced performance enhanced proxies (enhanced PEP). In addition, the flow control modules 1620, 1625, 1630 may be configured in hardware, software (including firmware), or a combination thereof. For example, the flow control module 1620, 1625, 1630 may be a physical device configured to execute software embodying processes described herein through a processing mechanism (e.g., processor, controller, or state machine) or it may be a software component embodying processes described herein residing within a network point, e.g., a switch or router, to operate within and/or in conjunction with that network point.

In communications initiated at the first node (e.g., 1600), how that communication traverses the flow control system 20 depends upon whether the communication is destined for the second or third nodes (e.g., 1640, 1670) or a fourth node A80 that is outside the flow control system 20. Each flow control module 1620, 1625, 1630 regulates data transfer rates, and can do so effectively because it is connected at a bandwidth bottleneck in the overall network. In addition, flow control modules 1620, 1625, 1630 also may be placed at points on the network of latency transitions (low latency to high latency) and on links with media losses (such as wireless or satellite links).

In one embodiment, each flow control module 1620, 1625, 1630 is configured to allow bandwidth at the bottleneck to be fully utilized, yet not overutilized. The flow control module 1620, 1625, 1630 transparently buffers (or rebuffers data already buffered by, for example, the sender) network sessions that pass between nodes having associated flow control modules. When a session passes through two or more flow control modules, one or more of the flow control modules controls a rate of the session(s).

In one embodiment, the flow control module 1620, 1625, 1630 is either configured with predetermined data relating to bottleneck bandwidth. Alternatively, the flow control module 1620, 1625, 1630 may be configured to detect the bottleneck bandwidth. Unlike conventional network protocols such as TCP, the receiver-side flow control module e.g., 1630, controls the data transmission rate. The receiver-side flow control module controls 1630 the sender-side flow control module, e.g., 1620, data transmission rate by forwarding transmission rate limits to the sender-side flow control module 1620. In one embodiment, the receiver-side flow control module 1630 piggybacks these transmission rate limits on acknowledgement (ACK) packets (or signals) sent to the sender 1600 by the receiver 1640. The receiver-side flow control module 1630 does this in response to rate control requests that are sent by the sender side flow control module 1620. The requests from the sender-side flow control module 1620 may be piggybacked on data packets sent by the sender 1600.

As an example, in FIG. 16, a sender node at site B establishes a connection to transfer data to a receiver node at site A. The flow control module 1620 at site B includes a send rate request for bandwidth O with the session establishment packet for the session. Assuming there is no other traffic flowing to site A, the flow control module 1630 at site A notifies the flow control module 1620 at site B to use a data transmission rate of, e.g., min(N, O), and data transfer commences at that rate. In situations where multiple data communication sessions, e.g., TCP sessions, are established between the same pair of flow control nodes, e.g., 1620 and 1630, the bandwidth would have to be allocated among the sessions. This could be done fairly, with equal bandwidth given to each active session, or it could be done according to a predetermined policy configured for use with the appropriate flow control modules.

Referring now to multi-session communication involving two or more nodes, for example, in system configurations where N<O and N<M, and a node at site C now also seeks to establish a connection to a node at site A also with node B. In this scenario, the third flow control module 1625 at C sends a rate request for bandwidth M. The second flow control module 1630 at site A now must reallocate the bandwidth between the two flow control nodes 1620, 1630 requesting bandwidth. In one embodiment, there may be an allocation of half bandwidth to each site. In this case, the flow control module at A sends a rate limit of N/2 to the third flow control module 1625 and a rate limit of N/2 to the first flow control module 1620. Thereafter, data transfer continues at these rates.

In some scenarios, different latencies between the sites can create data transmission issues. For example, if the round trip time (RTT) for data transmission between sites A and B is 100 milliseconds (ms), and the RTT between sites A and C is only 10 ms, if the second flow control module 1630 at site A sends the rate limits simultaneously, the first flow control module 1620 at site B will reduce its transmission rate 90 ms after the third flow control module 1625 at site C starts sending. Hence, for 90 ms the bottleneck at A may be overbooked.

To address overbooking, in one embodiment, the flow control modules may be configured to delay rate control changes according to the known latencies. For example, in TCP, TCP protocol receivers have no knowledge of RTT, but TCP senders can calculate an estimate for RTT. If the sending-side flow control module, e.g., 1620, 1625, forwards its RTT estimate to the receiving-side flow control module, e.g., 1630, the receiving-side flow control module 1630 uses this information to determine when to send rate control information. In such embodiments, there is a significant reduction of packet loss.

In an alternative embodiment, a sending-side first flow control module, e.g., 1620, module notifies the receiving-side second module, e.g., 1630, of its current sent rate. In this embodiment, the receiver-side second flow control module 1630 at A waits until it receives confirmation from the sender-side first flow control module 1620 at B that it is reducing its sending rate before notifying the sending-side third flow control module 1625 at C to increase its sending rate. Hence, this approach minimizes or eliminates overbooking while still reducing or eliminating packet loss. In addition to the examples provided, those skilled in the art will recognize other alternative embodiments may be configured to vary rate control changes more slowly or more quickly depending on the send rate history of a given flow control node.

In one embodiment the system and process describe herein may be configured as modular component having appropriate functionality for the process or flow described. In alternative embodiments, the processes or flows may be configured as software executable by a processor. In yet other embodiment, the process or flows may be configured as a combination of modules and or processor executable software.

Distributed PEPs

Using well-known techniques of distributed computing (e.g., shared memory, clustering, replication, etc.), a single enhanced PEP instance can consist of multiple PEP members that communicate among themselves. These members share data so that they can jointly and individually perform PEP processing while simultaneously maintaining the coherence of a single PEP instance. In this section, the enhanced PEP (or flow control module) will simply be referred to as a PEP for ease of discussion.

The benefits of distributed PEP processing are scaling in performance, capacity and reliability. Performance scaling comes from improving the processing of a single TCP connection. Capacity scaling comes from increasing the total number of connections that can be handled. Reliability scaling comes from having multiple cooperating implementations that can survive the failure of one or more members. Distributed PEPs, that have members along all network paths for which a TCP connection may traverse, are able to implement those PEP algorithms that require access to all of the packets for a TCP connection (either half- or full-duplex), whereas multiple instances of nondistributed PEPs in a similar configuration would not be able to implement these same PEP algorithms. A distributed PEP can be deployed in environments that include link aggregation, multi-homing, link failover, and multiply interconnected networks.

As is typical of distributed computing, portions of some PEP algorithms require global consistency. These portions necessitate that a single packet not completely traverse one cooperating PEP member until all of the members have been updated to a consistent state. This update increases the per-packet computation cost, as well as potentially adding to the latency of the system. Just as with nondistributed PEPs, these increased costs may result in overall degradation. Again as with nondistributed PEPs, careful monitoring of the TCP conversation allows the appropriate algorithms to be enabled and disabled so as to avoid degradation:

Communication between PEP members can be accomplished in a variety of ways: through common memory or via an external message facility, like a packet-switched network or a communications bus. As the communications method becomes more expensive, the costs of the PEP cooperation increase accordingly, raising the crossover point to yield a PEP benefit.

There are at least two cooperation models for distributed PEPs: tightly coupled and loosely coupled. In the tightly coupled model, communication between the PEP members is inexpensive and low latency when compared to network communication; this is typically provided via shared memory, although a high-speed inter-processor communication link would suffice (e.g., Myrinet, Infiniband, Ethernet, etc.). In a tightly coupled PEP, global consistency is easy to achieve, as only a single copy of the data structures is present and simple locking schemes provide orderly and coherent access. A tightly coupled distributed PEP can scale in all three directions described above (performance, capacity, and reliability).

In the loosely coupled distributed PEP model, communication between the PEP members is more expensive and must be carefully considered, as the overhead of communication between PEP members is a principal design constraint.

In one embodiment, individual TCP connections are assigned to individual PEP members. When a PEP member receives a packet pertaining to a TCP conversation that is assigned to another PEP member, it forwards the packet to that PEP member for processing. This method requires global synchronization only during connection establishment and termination, at other times no global synchronization is required. When a PEP member receives a connection initiation or termination packet, it communicates with the other members to update their connection tables. Upon receipt of a connection initiation packet, the receiving PEP member determines which member this connection will be placed on (i.e., performs a load-balancing selection) and informs all of the PEP members of the choice for the new connection. Once all the members have responded, indicating that their tables have been updated, the establishment of the connection can be allowed to proceed by forwarding the connection-initiating packet. By waiting for this global synchronization, the distributed PEP members will be certain to understand how to forward (i.e., which PEP member is responsible for) any further packets associated with this conversation. It is possible that two PEP members will receive connection initiation packets for the same connection simultaneously (i.e., before they have had a chance to communicate). The PEP must detect this case, ensuring that the connection table remains globally consistent; typically, one of the two packets is simply ignored. This method guarantees that all the packets associated with a single TCP connection are processed by a single PEP member, enabling the application of the PEP algorithms that require access to all of the conversation data (i.e., full- or half-duplex). This model of implementing a distributed PEP does not provide performance scaling, in that a single TCP connection can run no faster than the limit of a single PEP member. However, when multiple TCP conversations are present, they can be distributed among the plurality of members so that, in aggregate, overall performance is improved, as each individual connection has the PEP algorithms implemented on it. Another advantage of this scheme is that it is relatively easy to disable PEP algorithms for individual TCP connections. This information can be distributed in the same fashion, at which point any of the PEP members can process packets for that TCP connection without forwarding it to other PEP members, minimizing the additional latency imposed on the connection.

Implementation of the tightly coupled model does not require a single table for globally consistent information. The table can be distributed, provided that it is maintained consistently as packets transit the members. Naturally, the cost of maintaining the distributed, consistent tables may result in increased latency and computation costs. However, for connections with very high RTTs, relatively expensive member interconnections can be utilized while still obtaining substantial system-level performance boosts.

Several strategies for handling failover can be realized within both the tightly and loosely coupled distribution models. A failover condition occurs when one of the PEP members fails, or when the network path through one of the PEP members ceases to operate (due to failure, operator request, routing change, etc.). Recovery is defined as the procedure that the system uses to recover from a failover condition. In the tightly coupled configuration, recovery is relatively easy to perform, as the globally consistent state is still available to all remaining PEP members. Typical recovery actions involve ensuring the integrity of shared data structures and addressing the reduction in overall capacity due to the failure.

Recovery in a loosely coupled environment is more difficult, since not all of the PEP algorithm's information for each connection may have been globally synchronized, making it impossible to continue with those connections (depending on the particular algorithm). If the connection cannot be continued, then it must be resynchronized and the endpoints will need to invoke their own recovery algorithms.

Sometimes a connection can be transferred from one PEP member to another member. This action, called migration, can be initiated for several reasons. One reason is due to loading issues, (i.e., a PEP member may be overloaded and will use the migration of a TCP connection to a different PEP member as a method of rebalancing the system load). Another reason is external routing change, (i.e., one PEP member may notice that the preponderance of packets for a TCP conversation is arriving at a PEP member that does not own the connection; rather than continuing to pay the costs of internally forwarding those packets to the owning member, the connection is migrated to the member that is receiving the preponderance of packets). Another reason is route failure. The owning PEP member may lose connectivity to one or both of the endpoints. The connection is migrated to another PEP member to reestablish connectivity. Yet another reason is member failure. Connections owned by a failing member are migrated to operational members.

Migration is similar to connection establishment. First, packet forwarding for the connection is suspended. Second, the connection table of the PEP members is updated to indicate the new owner. Finally, packet forwarding is enabled (naturally, any packets received during this process must be forwarded to the new owner).

PEP Deployment

When adding an enhanced PEP to a network, there are many choices for the deployment vehicle. One method of deployment is to create a new interior element. This element may have one or more network connections and may contain facilities for performing the selected enhanced PEP algorithms on the packets that flow through it. Another option is to deploy the enhanced PEP within an already existing element, either interior or endpoint. In general, an enhanced PEP can be deployed in either an endpoint or interior element configuration. As described above, network topology affects the classes of enhanced PEP algorithms that can be enabled. Multiple deployed implementations of enhanced PEPs, either in endpoints or interior nodes or both, may cooperate to create a single distributed enhanced PEP instance, as described above. In this section, enhanced PEPs (or flow control module) may be referenced as a PEP for ease of discussion.

Certain network interior nodes are natural places to deploy PEPs, as they tend to aggregate network traffic, reducing the number of members required to create a distributed PEP instance. Additionally, these nodes tend to be the most profitable places to locate performance-boosting PEP algorithms. For example, a wireless base station is a natural place to deploy a PEP, as all traffic between wireless nodes and the wired network must pass through it. Further, there are many PEP algorithms that would be ideal in improving the performance of the high error-rate wireless link.

Another natural PEP deployment point is the Virtual Private Network gateway (VPN). FIG. 1 depicts one example of a VPN gateway. Computers 100-103 are connected to switch 150. Communication between computers 100-103 are routed amongst each other by switch 150, as directed by the routing tables contained therein. Likewise, computers 140-143 communicate through switch 160, to which they are connected.

When one of computers 100-103 (100 in further usage) sends a packet destined for one of computers 140-143 (140 in further usage), switch 150, using its routing tables, directs these packets to VPN gateway 110. VPN 110 accepts these packets and inspects them. Using its own routing tables, VPN 110 determines that these packets must be forwarded to VPN 130. Each of the packets to be forwarded is placed into an envelope that specifies VPN 130 as the destination and then the packet is sent to Internet 120. Wide area network (WAN) (e.g., Internet) 120 forwards the packet to VPN 130, which removes the packet from its envelope and forwards it to switch 160, which then forwards it to computer 140. Because the packet, while traveling over the Internet, is placed inside an envelope, the contents and format of the original packet do not affect, and are unaffected by, its transport via Internet 120. Typically, cryptographic techniques are used to hide the contents of the packet, ensuring that no intermediate node is able to examine the packet. Other cryptographic techniques can be employed to allow the receiving node to detect if a packet has been altered after initial transmission. In this case, the altered packet can simply be dropped, whereupon the upper-level behavior will detect this and retransmit an original copy. Note that Internet 120 need not be the public Internet, it could be any particular network, public or private. Note further that the use of the term "switch" should be understood to include all forms of switching, including routing, bridging, forwarding, and others.

This technique allows the use of Internet 120 as a private link between the two VPN instances. Indeed, the addressing domain of the packets used by computers 100-103 and 140-143 and switches 130 and 160 are distinct and possibly separate from that used by Internet 120. Further, the packets contained within the envelopes may contain protocols unknown to Internet 120.

The transport of the contained packets through the Internet in this fashion is commonly known as tunneling. The network interface that connects the VPN to Internet 120 is can be referenced as the wide-area network (WAN) side. The other VPN network interface is known as the local-area network (LAN) side. Note that in some configurations, the separation of WAN- and LAN-sides of the VPN is logical and not physical (i.e., there may be only a single network connection over which both sets of traffic are multiplexed). VPN 110 may be combined with switch 130, yielding certain efficiencies due to sharing of resources and computations. Likewise, VPN 140 may be combined with switch 160.

When computer 100 and computer 140 communicate using the TCP protocol, VPN 110 and 130 typically perform little or no special processing, as compared to the other Internet protocols. Each TCP packet is placed into its envelope and transmitted to the other VPN participant. Each TCP endpoint remains ignorant of the presence of the intermediate VPN nodes or of Internet 120.

There are many choices for the protocol used for the VPN tunnel. Two of the most common protocols are: Internet Protocol Security (IPSec) and Layer 2 Tunneling Protocol (L2TP). These protocols do not provide reliable communications, as they simply layer over IP with minimal additional services. Another common protocol is Point to Point Tunneling Protocol (PPTP), which uses an additional TCP connection to provide reliable communication between the two VPN nodes. For those tunneling protocols that use unreliable communications, the TCP endpoints remain solely responsible for the upper-level TCP behaviors, as these VPN protocols do not provide them.

In the case of PPTP (as well as other protocols that use TCP for the tunnel), the VPN's upper-level TCP behaviors may interact with the upper-level TCP behaviors of the endpoints (computers 100 and 140). This interaction may severely limit the performance of the TCP connection between computers 100 and 140. For example, packets that are dropped by Internet 120 must be retransmitted. Initially, one of the VPN nodes notices that a packet has been dropped, using one of the known TCP methods: duplicate acknowledgements (dupacks) or selective acknowledgements (sacks), retransmitting the lost packet accordingly. However, while the VPN has initiated a retransmit, the TCP implementations in the endpoint computers 100 and 140 may also experience a timeout, since the retransmit by the VPN may take substantially longer than the endpoint's current running estimate of the RTT. In this case, the endpoints will also assume that the packet has been lost and perform their own retransmit. The endpoint retransmit is redundant, as the VPNs are already engaged in retransmitting the missing data. This entire sequence results in an overall degradation of system throughput. The redundantly retransmitted packets may be treated by the VPN as additional packets to be transmitted (i.e., the VPN may fail to recognize a packet received from an endpoint as representing a retransmission, packaging the redundant packet and sending it across the tunnel, also).

There are several ways that a PEP, inserted into the conversation between the endpoint and the VPN, could improve this situation. In one way, upon detecting the unnecessary retransmission, the PEP could simply drop the redundant packet. Detecting the situation requires that the PEP have access to state information for the VPN's TCP (tunnel) connection. This access could be performed in several manners. First, the PEP could be in the same node as the VPN and could access the VPN transmission state directly. Second, the PEP could be connected to the WAN side of the VPN, monitoring its packets directly to detect retransmissions. Thirdly, the VPN could explicitly notify the PEP via a message when a retransmission occurs.

As described above, some VPN algorithms use cryptographic techniques to prohibit inspection and/or alteration of the encapsulated packets. If the PEP is connected to the LAN side of the VPN, then it can apply its algorithms to packets prior to their encapsulation, avoiding cryptographic issues. However, a PEP connected to the WAN side of the VPN may be severely limited in the presence of cryptographic protection techniques if it has no access to the clear-text of the encapsulated packets. But, in the case of a VPN tunnel using TCP (e.g., PPTP), the PEP algorithms may be applied to the TCP envelope, provided that the cryptographic techniques are used only to protect the interior packet and not the envelope. With support for a cryptographic NIC, even this restriction can be removed (as further described below).

Just as it is possible currently to achieve efficiencies by combining VPNs with switches, it is possible to achieve similar efficiencies by combining PEPs with VPNs, PEPs with switches, and PEPs with combined VPN/switches. Further, unexpected benefits beyond simple integration are obtained from such a combination, as described below.

The typical data center configuration results in the principal bandwidth bottleneck occurring right at the VPN node. In such a configuration, the VPN node has a high-speed connection to the LAN and a much lower-speed connection to the WAN. Indeed, when the VPN is integrated into a switch, this mismatch is accentuated, as the VPN may have access to all of the traffic across all the LAN ports of the switch, which usually greatly exceeds the speed of a single WAN link. Further, the connections that pass through the VPN normally have higher RTTs and packet-loss rates than do LAN connections, particularly when the VPN uses the public Internet as its tunnel transport.

The VPN is a natural place for making bandwidth allocation decisions; however, the standard VPN lacks efficient mechanisms to implement these decisions. The only bandwidth allocation technique available to the standard VPN is to drop packets, assuming that the sender will reduce his sending rate appropriately. However, this technique is inefficient, resulting in retransmission of data that was otherwise properly received. Further, the technique lacks the ability to provide a fine resolution to the permitted bandwidth, particularly when the sender is using TCP. This is because standard TCP implementations reduce their bandwidth by one-half when a packet is dropped. Also, many TCP implementations will provide data in bursts rather than evenly spaced after a packet drop.

A better flow control mechanism allows the VPN to manipulate the receive window seen by a sending endpoint. Also, since a TCP acknowledgement contains a window advertisement, a VPN can manipulate the window to provide a more effective form of flow control. Thus, the VPN is able to more precisely inform and control the sending rate of the endpoint. However, window manipulation is limited, as once the window is opened to a certain value, the receiver is not permitted to retract the advertisement unless the data has been received accordingly. This limitation imposes a time lag between the decision to reduce a sender's rate and the actual realization of that rate reduction. This rate limiting mechanism can be used by a VPN to efficiently provide a fine-grained control over individual connections.

Other benefits occur when a PEP is combined with a VPN. This combination allows the PEP to have access to clear-text packets lacking cryptographic protection, allowing the maximum opportunities to provide performance enhancements.

Preacks

Alternative embodiments of a flow control module (an enhanced PEP) handles the acknowledgements and retransmits for a sender, effectively terminating the sender's connection with the downstream portion of a network connection. Such a PEP can be implemented in a variety of network topologies. Again, in this section the enhanced PEP (or flow control module) is referenced as a PEP for ease of discussion.

Figure 2:
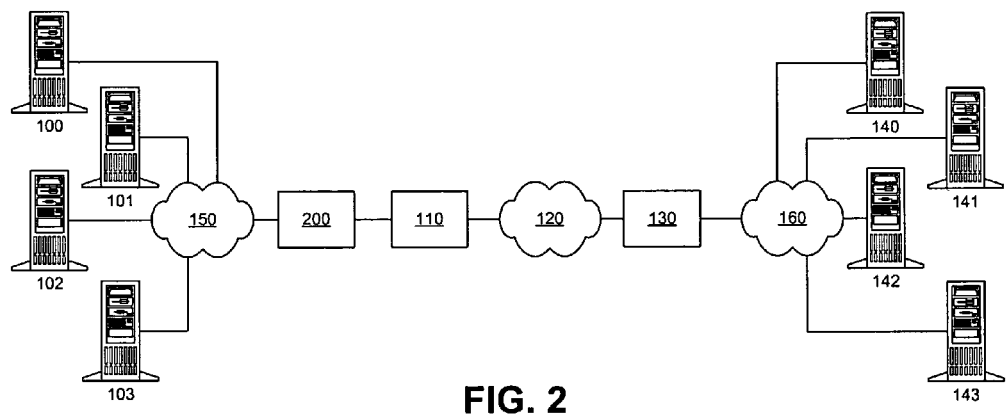
FIG. 2 depicts the Virtual Private Network of FIG. 1 augmented with a single PEP.
Figure 17:
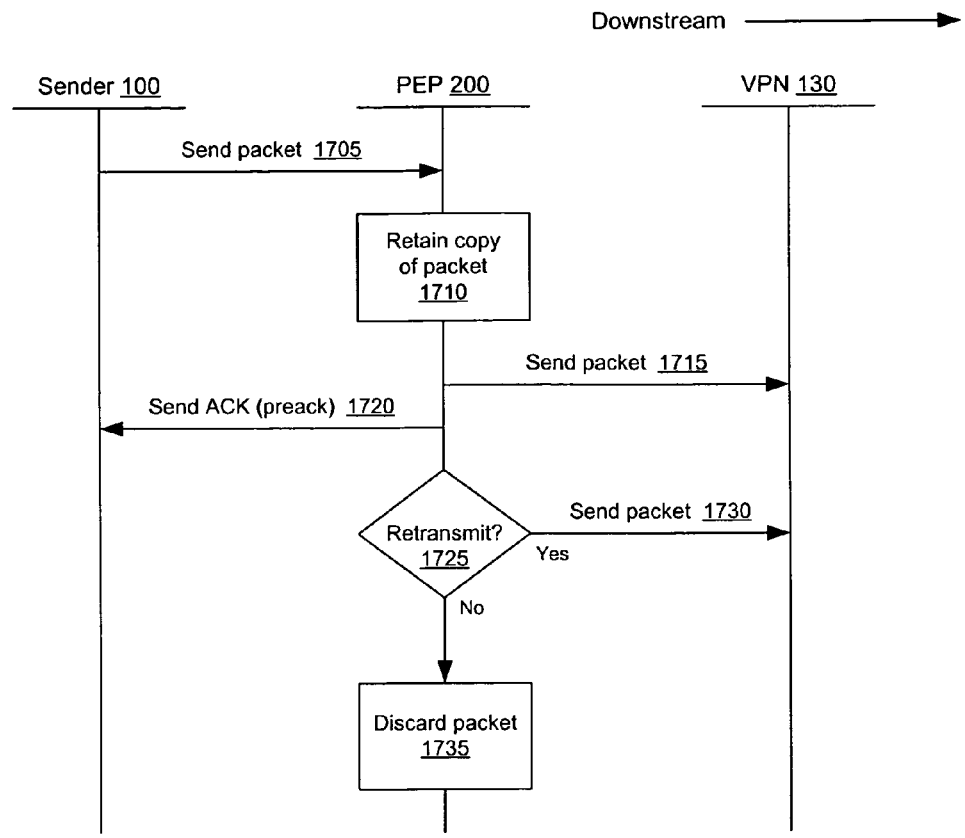
FIG. 17 is a trace diagram for one embodiment of a method for generating early acknowledgements for flow control.

As an example, FIG. 2 shows one possible deployment of a PEP 200 into a network architecture to implement this feature. In this architecture, a sender computer 100 sends data to switch 150, which determines that the data are destined for VPN box 130. Because of the chosen LAN topology, all data destined for VPN 130 must transit PEP 200, so the PEP 200 can apply any necessary algorithms to these data. FIG. 17 illustrates a trace diagram for one embodiment of the flow of information among the sender 100, the PEP 200, and a VPN 130 (or any other network entity downstream on the network connection).

As shown in FIG. 17, the sender 100 transmits 1705 a packet, which is received by the PEP 200. When the PEP 200 sees the packet, which is transmitted from the sender 100 to a recipient via the VPN 130, the PEP 200 retains 1710 a copy of the packet and forwards 1715 the packet downstream to the VPN 130. The then generates an acknowledgement packet (ACK) and sends 1720 the ACK back to the sender 100, or sending endpoint. This ACK, a pre-acknowledgment, causes the sender 100 to believe that the packet has been delivered successfully, freeing the sender's resources for subsequent processing. The PEP 200 retains the copy of the packet data in the event that a retransmission of the packet is required, so that the sender 100 does not have to handle retransmissions of the data. This early generation of acknowledgements may be called "preacking."

If 1725 a retransmission of the packet is required, the PEP 200 retransmits 1730 the packet containing the missing data. The PEP 200 may determine whether retransmission is required as a sender would in a traditional system, for example, determining that a packet is lost if an acknowledgement has not been received for the packet after a predetermined amount of time. To this end, the PEP 200 monitors acknowledgements generated by the receiving endpoint (or any other downstream network entity) so that it can determine whether the packet has been successfully delivered or needs to be retransmitted. If 1725 the PEP 200 determines that the packet has been successfully delivered, the PEP 200 is free to discard 1735 the saved packet data. The PEP 200 may also inhibit forwarding acknowledgements for packets that have already been received by the sending endpoint.

In the embodiment described above, the PEP 200 controls the sender 100 through the delivery of pre-acknowledgements, or preacks, as though the PEP 200 were the receiving endpoint itself. But because the PEP 200 is not an endpoint and does not actually consume the data, the PEP 200 preferably includes a mechanism for providing overflow control to the sending endpoint. Without overflow control, the PEP 200 could run out of memory because, as explained above, the PEP 200 stores packets that have been preacked to the sending endpoint but not yet acknowledged as received by the receiving endpoint. Therefore, in a situation in which the sender 100 transmits packets to the PEP 200 faster than the PEP 200 can forward the packets downstream, the memory available in the PEP 200 to store unacknowledged packet data can quickly fill. A mechanism for overflow control allows the PEP 200 to control transmission of the packets from the sender 100 to avoid this problem.

In the embodiment described in connection with FIG. 17, the PEP 200 includes an inherent "self-clocking" overflow control mechanism. This self-clocking is due to the order in which the PEP 200 may be designed to transmit A50 packets downstream and send A55 ACKs to the sender 100. In the embodiment shown in FIG. 17, the PEP 200 does not preack A55 the packet until after it transmits A50 the packet downstream. In this way, the sender 100 will receive the ACKs at the rate at which the PEP 200 is able to transmit packets rather than the rate at which the PEP 200 receives packets from the sender 100. This helps to regulate the transmission of packets from the sender 100.

Another overflow control mechanism that the PEP 200 may implement is to use the standard TCP window, which tells the sender 100 how much buffer the receiver is permitting the sender to fill up. A nonzero window size (e.g., a size of at least one Maximum Segment Size (MSS)) in a preack permits the sending endpoint to continue to deliver data to the PEP, whereas a zero window size inhibits further data transmission. Accordingly, the PEP 200 may regulate the flow of packets from the sender 100, for example when the PEP's buffer is becoming full, by appropriately setting the TCP window size in each preack. This scheme has the advantages of simplicity and adherence to standard TCP methodologies.

A potential disadvantage of using TCP window size in this way, however, is the high expense of ACK processing. In the steady-state case, when the sending endpoint has a higher bandwidth to the PEP than the PEP to receiving endpoint path, two ACK packets are sent by the PEP, as well as processed by the sending endpoint, for every packet sent by the sender. This occurs as follows: Due to the bandwidth imbalance, the sender will eventually fill the PEP (i.e., exhaust the PEP's advertised receive window to the sender), causing the PEP to generate a zero window size ACK packet. Eventually, the link between the PEP and the receiving endpoint, which is slower, will succeed in delivering a packet, causing the PEP to realize that it is no longer full. The PEP then sends a packet to the sending endpoint, indicating a nonzero window (e.g., the space for the packet just delivered), causing the sending endpoint to deliver another packet, in turn causing the PEP to generate, once again, a zero window size ACK packet to prevent the sender from sending packets. Hence, for every packet sent by the sender to the PEP, there are two ACK packets sent from the PEP back to the sender (one each with a zero and a nonzero window size).

One technique to reduce this additional overhead is to apply hysteresis. When the PEP 200 delivers data to the slower side, the overflow control mechanism in the PEP 200 can require that a minimum amount of space be available before sending a nonzero window advertisement to the sender 100. In one embodiment, the PEP 200 waits until there is a minimum of four packets of space available before sending a nonzero window packet (in this case, a window size of four packets). This reduces the overhead by approximately a factor four, since only two ACK packets are sent for each group of four data packets, instead of eight ACK packets for four data packets. However, this may increase the "burstiness" of the delivery of packets, since the sender's window is opened four packets at a time.

Another technique for overflow control is to use the TCP delayed ACK mechanism, which skips ACKs to reduce network traffic. Standard TCP delayed ACKs automatically delay the sending of an ACK, either until two packets are received or until a fixed timeout has occurred. This mechanism alone can result in cutting the overhead in half; moreover, by increasing the numbers of packets above two, additional overhead reduction is realized. But merely delaying the ACK itself may be insufficient to control overflow, and the PEP 200 may also use the advertised window mechanism on the ACKs to control the sender 100. When doing this, the PEP 200 preferably avoids triggering the timeout mechanism of the sender by delaying the ACK too long. Accordingly, the PEP delay should be designed with this concern in mind, avoiding delaying an ACK, if possible, so long that it will cause a timeout in the sender 100.

In one embodiment, the PEP does not preack the last packet of a group of packets. By not preacking the last packet, or at least one of the packets in the group, the PEP avoids a false acknowledgement for a group of packets. For example, if the PEP were to send a preack for a last packet and the packet were subsequently lost, the sender would have been tricked into thinking that the packet is delivered when it was not. Thinking that the packet had been delivered, the sender could discard that data. If the PEP also lost the packet, there would be no way to retransmit the packet to the recipient. By not preacking the last packet of a group of packets, the sender will not discard the packet until it has been delivered. Accordingly, this problem is avoided.

This preacking technique may also be employed at downstream entities, for example just before the recipient. At a downstream PEP, coupled to the recipient, there are a number of options for handling packets and acknowledgements. In one case, the downstream PEP may preack received packets just as described in connection with FIG. 17. Alternatively, the downstream PEP may avoid preacking, instead waiting to send back an ACK until the recipient acknowledges receipt of the packet. In a third technique, the downstream PEP sends a SACK after it receives and forwards a packet, but waits to send an ACK until the recipient actually acknowledges receipt of the packet. This gives the sender-side PEP information about whether the packet passes through the downstream PEP as well as when it arrives at its destination. This is good when the connection fails, as this technique provides the network entities the most information about the status of the packets.

Figure 18:
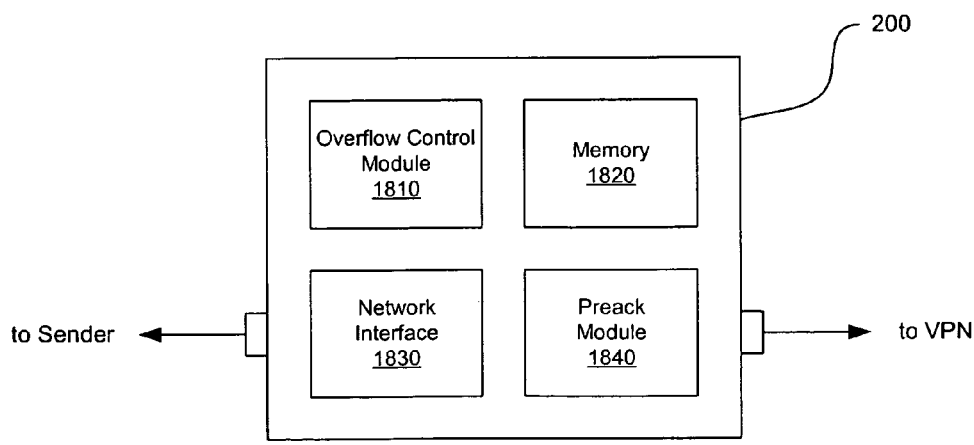
FIG. 18 is a schematic diagram of one embodiment of a flow control module, or PEP, for generating early acknowledgements for flow control.

FIG. 18 illustrates one embodiment of a PEP 200, which includes an overflow control module 1810, a memory 1820, a network interface 1830, and a preack module 1840. The network interface 1830 allows the PEP 200 to communicate with other network entities, such as the sender and the VPN. The PEP 200 store packet data received from the network in its memory 1820, which may be logically partitioned into separate receive and transmit buffers. Additionally, the overflow control module 1810 is coupled to the network interface 1830 to implement one or more of the flow control mechanisms described above. The preack module 1840 is configured to send early acknowledgements, or preacks, to the sender 100.

There are many ramifications of preacking, both beneficial and detrimental. In the situation described, preacking is beneficial because it eliminates the need to retransmit packets by the endpoint, thereby saving sender-side bandwidth and sender-side transmission delays (i.e., a reduction in latency). It can be appreciated that this benefit is accentuated in a number of situations, for example before a high-loss link in a network connection, at a point of bandwidth mismatch where the downstream portion of the network connection has a lower bandwidth (i.e., a bottleneck), and at a point of latency transition in the network connection. Another benefit of this technique is to eliminate the RTT limitation on the upper bound of TCP performance. But preacking may have detrimental effects as well. For example, failure of the PEP instance may result in the two endpoints of the TCP conversation becoming unsynchronized.

Window Virtualization

As previously noted, insufficient receive window size is one limiter of TCP performance. The receive window sizes of many TCP implementations are limited for various reasons. One reason for the limitation may be a lack of support for well-known protocol extensions (e.g., RFC 1323), that allow the receive window to be increased beyond its standard 16-bit range. Another reason may be the desire to limit the consumption of system buffer memory by each TCP connection, since the advertised receive window carries a promise of dedicated buffer space. The latter is especially crucial in certain system configurations that may have large numbers of relatively idle TCP connections open at any instant. Usually, default window-size settings are set for LAN environments, as these tend to dominate connections in most environments.

Though it is not immediately apparent from examining conventional literature such as RFC 1323, there is effectively a send window, also. The send window is similar to the receive window, in that it consumes buffer space (though on the sender), and sometimes serves to limit performance. The sender's send window consists of all data sent by the application that has not been acknowledged by the receiver. This data must be retained in memory in case retransmission is required. Since memory is a shared resource, TCP stack implementations limit the size of this data.

When the send window is full, an attempt by an application program to send more data results in blocking the application program until space is available. Subsequent reception of acknowledgements will free send-window memory and unblock the application program. This window size is known as the socket buffer size in some TCP implementations. Unlike the receive window, no network interoperability standard limits the size of the send window, although, many implementations either provide a fixed limit or require source code modifications to utilize a larger window. Thus, although there appears to be promise of reserved memory the practical reality is otherwise. Thus, the flow control module (or enhanced PEP) is configured as described herein to provide access to increased window (or buffer) sizes. This configuration may also be referenced to as window virtualization. In one embodiment, "window" may be referenced in a context of send, receive, or both.

Figure 19:
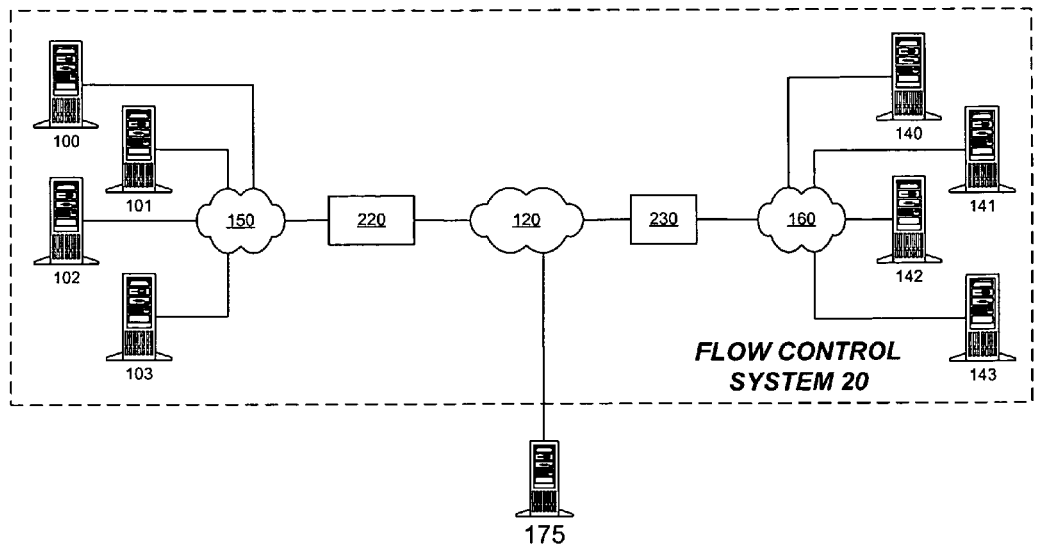
FIG. 19 illustrates one embodiment of a flow control system including a first flow control module and a second flow control module for use in transporting data from a first node to a second node.

One method of window virtualization is to insert a preacking PEP into a TCP session (or conversation). FIG. 19 illustrates one embodiment of a flow control system 20 including a first flow control module 220 and a second flow control module 230 for use in transporting data from a first node, e.g., computer 100, to a second node, e.g., computer 140. In addition, the flow control system may have coupled with a third node, e.g., computer 175, which communicatively couples the wide area network 120.

The flow control system 20 includes a one or more first (or initiating) nodes, e.g., computers 100-103, a first switch 150 (which may include a network such as a local area network (LAN)), a first flow control module 220, a wide area network (e.g., the Internet) 120, a second flow control module 230, a second switch 160 (which also may include a network such as a LAN), and one or more second (or responding) nodes, e.g., computers 140-143. The one or more first nodes 100-103 couple the first switch 150. The first flow control module 220 couples the first switch 150 and the wide area network 120. The second flow control module 230 couples the wide area network 120 and the second switch 160. The second switch 160 couples the one or more second nodes 140-143. As noted above, the flow control modules 220, 230 may also be referred to as enhanced performance enhanced proxies (PEP), or simply, PEPs in this section for each of discussion.

Note in one embodiment, the components between the one or more first nodes, e.g., source (or initiating or sender or sending) nodes, and the one or more second nodes, e.g., the destination (or responding or receiver or receiving) nodes, may be referenced as points (or intermediary nodes) along a data path between these end nodes in the flow control system 20. In addition, it is noted that the flow control modules 220, 230 may be configured in hardware, software (including firmware), or a combination thereof. For example, the flow control module 220, 230 may be a physical device configured to execute software embodying processes described herein through a processing mechanism (e.g., processor, controller, or state machine) or it may be a software component embodying processes described herein residing within a network point, e.g., a switch or router, to operate within and/or in conjunction with that network point.

In communications initiated at a first node (e.g., 100), how that communication traverses the flow control system 20 and uses window (or buffer) virtualization depends upon whether the communication is destined for a second node (e.g., 140) in the flow control system 20 or a third node 175 that is outside the flow control system 20. To handle each situation each flow control node 220, 230 is configured to allow a process for auto-discovery. When auto-discovery identifies appropriate flow control modules, e.g., 220, 230, additional mechanisms and processes are leveraged for increasing session window sizes and buffer utilization along points in a data path.

Auto-discovery may be configured when establishing a communication connection, for example, in TCP environments during synchronization (SYN) and synchronization acknowledgement (SYN-ACK). In particular, with auto-discovery, one embodiment of the present system and process involves using a modified synchronization (SYN) and synchronization acknowledgement (SYN-ACK) structure in the flow control system 20 to determine whether a particular point from a first node to a second node is enabled as a flow control module.

Figure 20:
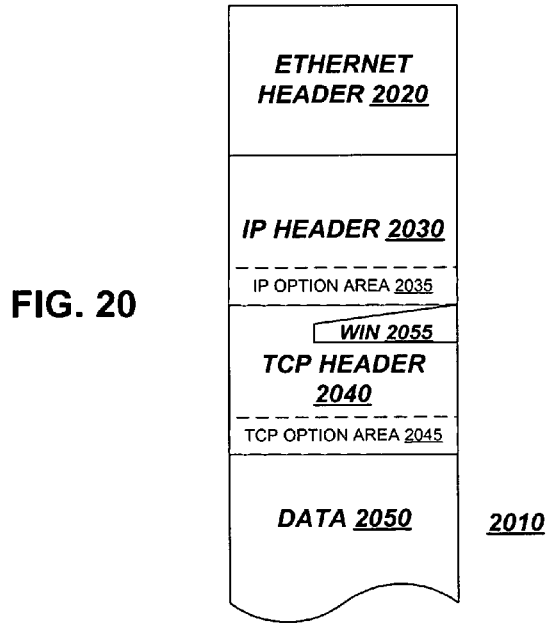
FIG. 20 illustrates one embodiment of a data packet for use in a flow control system.

Referring briefly to FIG. 20, it illustrates one embodiment of a data packet 2010 for use in a flow control system 20 in accordance with the present invention. The data packet includes an Ethernet header 2020, an Internet protocol ("IP") header, 2030, a transmission control protocol ("TCP") header 2040, and data 2050. In the IP header 2030 and the TCP header 2040 there are corresponding options area 2035, 2045. In addition, the TCP header also includes a bit string corresponding to a window scale 2055.

Figure 21:
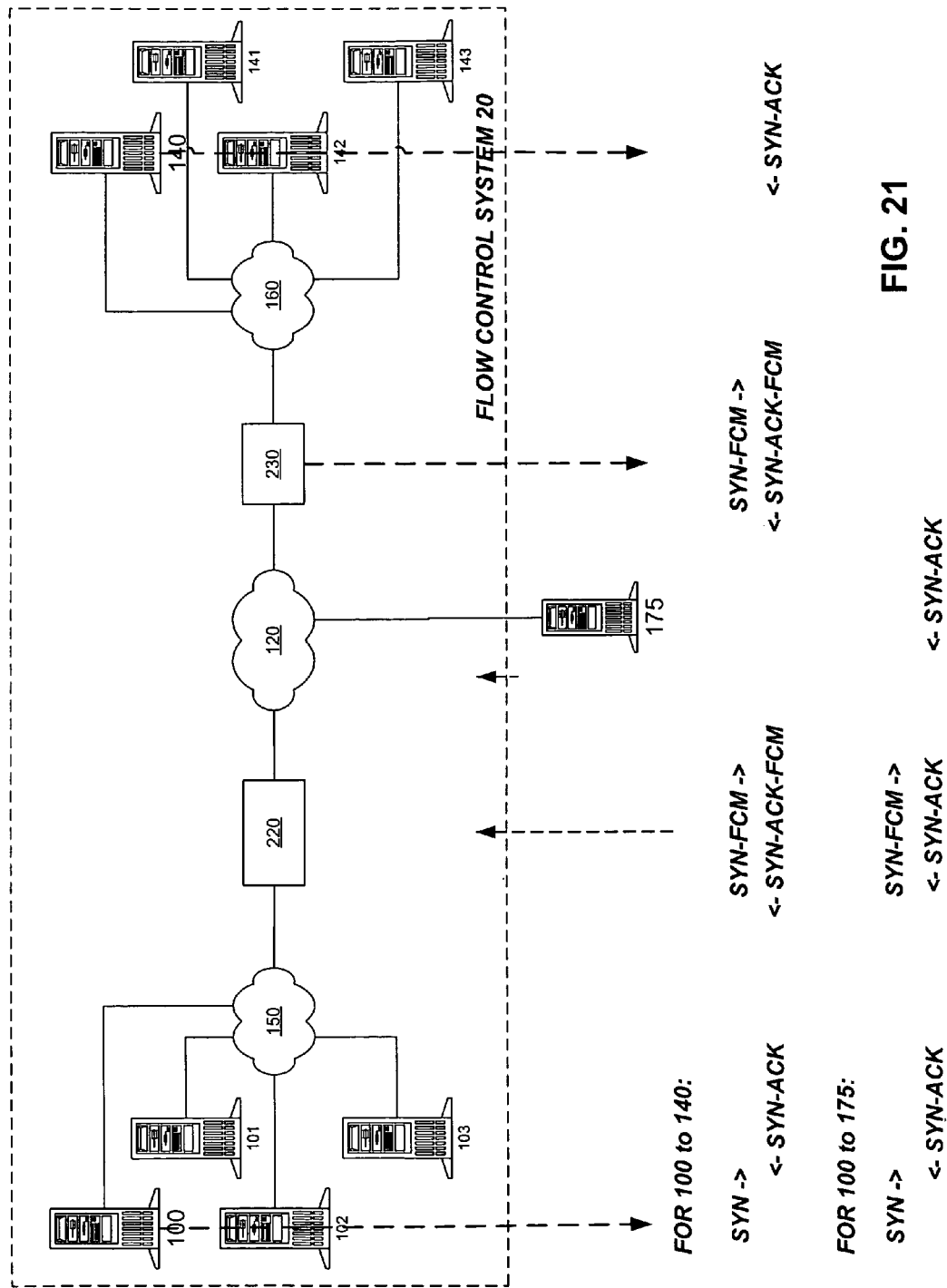
FIG. 21 illustrates one embodiment of session initialization in a flow control system.

Turning now to FIG. 21, illustrated is initiation of a data communication session between a source node, e.g., computer 100 (for ease of discussion, now referenced as source node 100), and a destination node, e.g., computer 140 (for ease of discussion, now referenced as destination node 100) in accordance with the present invention. For TCP communications, the source node 100 initially transmits a synchronization signal ("SYN") through its local area network 150 to first flow control module 220. The first flow control module 220 inserts a configuration identifier into the TCP header 2040 options area 2045. The configuration identifier, e.g., FCM, identifies this point in the data path as a flow control module.

The SYN-FCM signal continues onto the wide area network 120 to the second flow control module 230. Unlike conventional points in the data path, the second flow control module 230 recognizes the configuration identifier in the TCP header 2040 options area 2045 and extracts that information to store it. It can be stored in any storage mechanism, e.g., a state block, a volatile memory, a non-volatile memory, disk storage, or the like. The second flow control module 230 optionally forwards the SYN-FCM signal or the SYN signal to the destination node 140 via the destination node's local area network 160. Note that if the SYN-FCM signal is sent, the destination node 140 will ignore the configuration identifier in the TCP header 2040 options area 2045.

Upon receipt of the SYN-FCM or SYN signal, the destination node 140 returns a synchronization acknowledgement ("SYN-ACK") signal for the source node 100. The second flow control module 230 receives the SYN-ACK signal and inserts its configuration identifier into the TCP header 2040 options area 2045 of the SYN-ACK signal. The SYN-ACK signal with the second flow control module configuration identifier (SYN-ACK-FCM) is transmitted through the wide area network 120 to the first flow control module 220. The first flow control module recognizes the configuration identifier in the TCP header 2040 options area 2045 and extracts it for storage. The first flow control module 220 passes the SYN-ACK-FCM or a SYN-ACK signal to the source node 100, which ignores the configuration identifier in the TCP header 2040 options area 2045 if it receives the SYN-ACK-FCM signal.

With the session initiated, the flow control system 20 is now able to identify the first flow control module 220 and the second flow control module 230 in the data path. In this identified configuration, the connection between the local area networks 150, 160 and the respective flow control modules 220, 230 can be referenced as a fast side connection, e.g., having gigabit connection speeds and low latencies, while the connection between the two flow control modules 220, 230 can be referenced as a slow side connection, e.g., having megabit connection speeds and high latency (e.g., with respect to the fast side connection).

Note that if the source node 100 initiates a session with a node 175 in which there is no other flow control module other than the first flow control module 220, the flow control module does not interfere, or provides a passive conduit, between the source node 100 and the outside node 175. In this situation, the when the SYN-FCM signal goes from the flow control module 220 to the outside node 175, the outside node ignores the configuration identifier (FCM) and returns a SYN-ACK to the flow control module 220 that ultimately goes back to the source node 100. Thus, in this situation, the flow control module 220 would not be further configured to provide enhanced PEP services as described herein. In this case, the flow control module 220 may be considered to have two fast sides to its connection. In addition, in alternative embodiments of such situations, the flow control module may perform fast side optimizations, such as improved retransmit support, which could be useful near a link with media losses such as a wireless (e.g., WiFi) base station.

In addition to auto-discovery, the flow control modules 220, 230, also provide window virtualization. Window (or buffer) virtualization allows increasing data buffering capabilities within a session despite having end nodes with small buffer sizes, e.g., typically 16 k bytes. However, RFC 1323 requires window scaling for any buffer sizes greater than 64 k bytes, which must be set at the time of session initialization (SYN, SYN-ACK signals). Moreover, the window scaling corresponds to the lowest common denominator in the data path, often an end node with small buffer size. This window scale often is a scale of 0 or 1, which corresponds to a buffer size of up to 64 k or 128 k bytes. Note that because the window size is defined as the window field in each packet shifted over by the window scale, the window scale establishes an upper limit for the buffer, but does not guarantee the buffer is actually that large. Each packet indicates the current available buffer space at the receiver in the window field.

Figure 22:
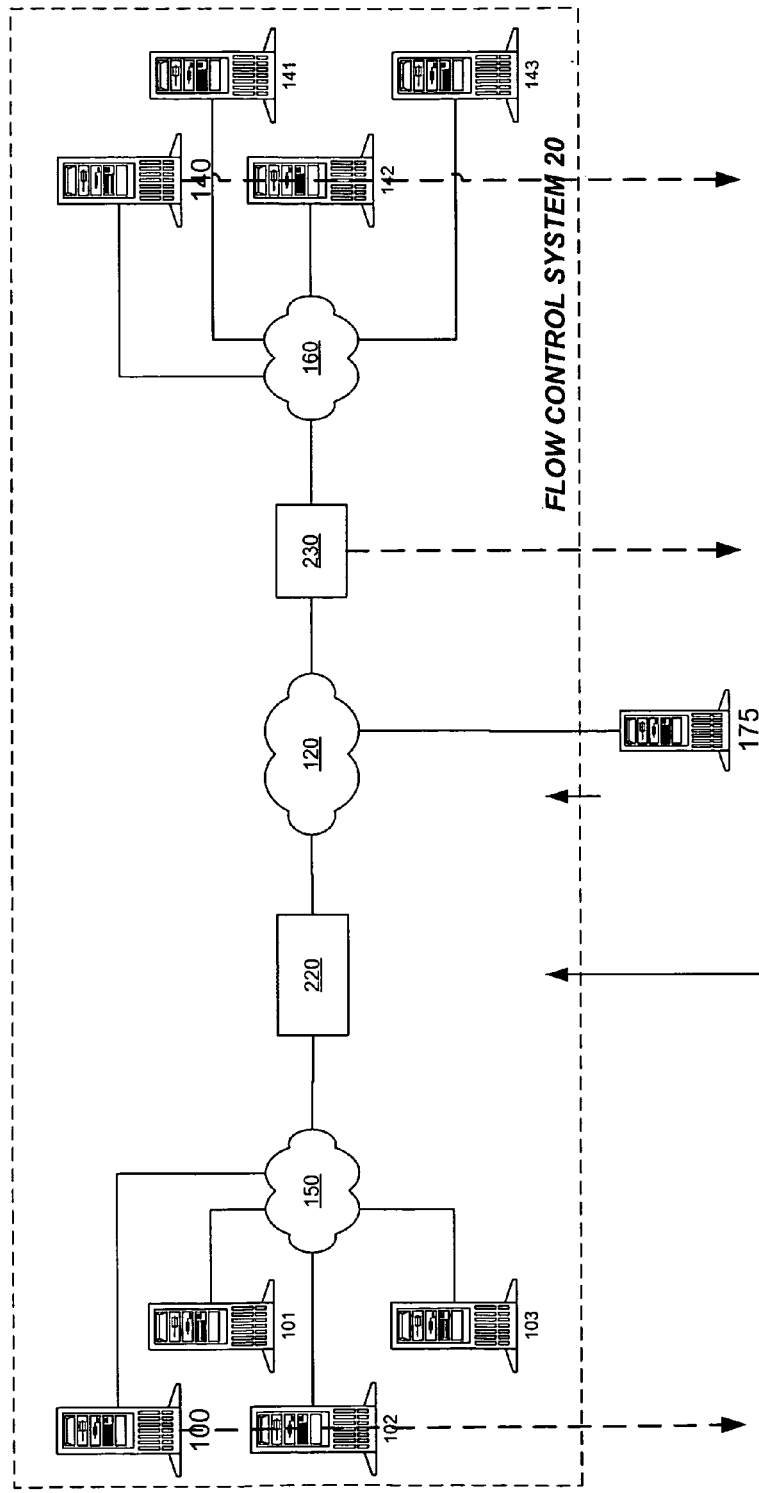
FIG. 22 illustrates one embodiment of scaling in a flow control system.

FIG. 22 illustrates one embodiment of scaling in a flow control system in accordance with the present invention. Specifically, during connection establishment (i.e., initialization of a session) when the first flow control module 220 receives from the source node 100 the SYN signal (or packet), it stores the windows scale of the source node 100 (which is the previous node) or stores a 0 for window scale if the scale of the previous node is missing. The first flow control module 220 also modifies the scale, e.g., increases the scale to 4 from 0 or 1, in the SYN-FCM signal. When the second flow control module 230 receives the SYN signal, it stores the increased scale from the first flow control signal 4 and resets the scale in the SYN signal back to the source node 100 scale value for transmission to the destination node 140. When the second flow 230 receives the SYN-ACK signal from the destination node 140, it stores the scale from the destination node 140 scale, e.g., 0 or 1, and modifies it to an increased scale that is sent with the SYN-ACK-FCM signal. The first flow control node 220 receives and notes the received window scale and revises the windows scale sent back to the source node 100 back down to the original scale, e.g., 0 or 1. Based on the above window shift conversation during connection establishment, the window field in every subsequent packet, e.g., TCP packet, of the session must be shifted according to the window shift conversion.

The process described above may also apply to non-flow control modules. For example, if there is only one flow control module in the data path, e.g., the first flow control module 220, and the destination node is an outside node 175, the process can use the increased scale between the first flow control module 220 and the outside node 175 when the outside node 175 is configured to also use a similar increased scale, e.g., a windows scale of 4. As with the above case, in this case also the flow control module, e.g., here 220, will serve to "translate" the window scale on each side of the flow control module 220 in a manner that is transparent to the individual end nodes 100, 175 during communication between them.

The window scale, as described above, expresses buffer sizes of over 64 k and may not be required for window virtualization. Thus, shifts for window scale may be used to express increased buffer capacity in each flow control module 220, 230. This increase in buffer capacity in may be referenced as window (or buffer) virtualization. The increase in buffer size allows greater packet through put from and to the respective end nodes 100, 140. Note that buffer sizes in TCP are typically expressed in terms of bytes, but for ease of discussion "packets" may be used in the description herein as it relates to virtualization.

Figure 23:
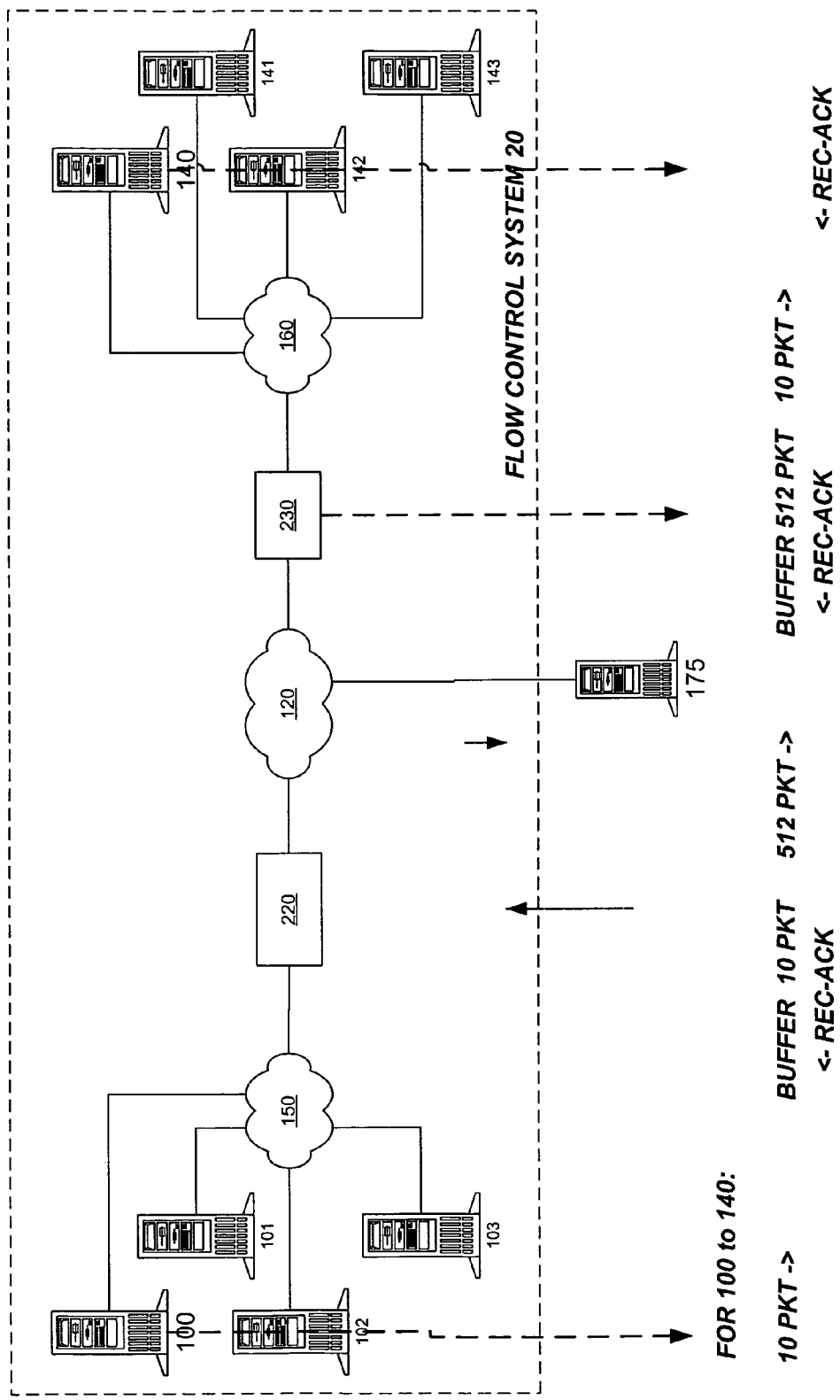
FIG. 23 illustrates one embodiment of buffer virtualization in a flow control system.

FIG. 23 illustrates one example of window (or buffer) virtualization in a flow control system in accordance with the present invention. In this example, the source node 100 and the destination node 140 are configured similar to conventional end nodes having a limited buffer capacity of 16 k bytes, which equals approximately 10 packets of data. Typically, an end node 100, 140 must wait until the packet is transmitted and confirmation is received before a next group of packets can be transmitted.

In one embodiment, using increased buffer capacity in the flow control modules 220, 230, when the source node 100 transmits its 10 data packets, the first flow control module 220 receives the packets, stores it in its larger capacity buffer, e.g., 512 packet capacity, and immediately sends back an acknowledgement signal indicating receipt of the packets ("REC-ACK") back to the source node 100. The source node can then "flush" its current buffer, load it with 10 new data packets, and transmit those onto the first flow control module 220. Again, the first flow control module 220 transmits a REC-ACK signal back to the source node 100 and the source node 100 flushes its buffer and loads it with 10 more new packets for transmission.

As the first flow control module 220 receives the data packets from the source nodes, it loads up its buffer accordingly. When its ready to transmit the first flow control module 220 can begin transmitting the data packets to the second flow control module 230, which also has an increased buffer size, for example, to receive 512 packets. The second flow control module 230 receives the data packets and begins to transmit 10 packets at a time to the destination node 140. Each REC-ACK received at the second flow control node 230 from the destination node 140 results in 10 more packets being transmitted to the destination node 140 until all the data packets are transferred. Hence, the present invention is able to increase data transmission throughput between the source node (sender) 100 and the destination node (receiver) 140 by taking advantage of the larger buffer in the flow control modules 220, 230 between the devices.

It is noted that by "preacking" the transmission of data as described previously, a sender (or source node 100) is allowed to transmit more data than is possible without the preacks, thus affecting a larger window size. For example, in one embodiment this technique is effective when the flow control module 220, 230 is located "near" a node (e.g., source node 100 or destination node 140) that lacks large windows. If both communicants are lacking large windows, then two flow control modules 220, 230 may be required, one near each node 100, 140 to obtain greater performance.

In one embodiment, "near" may be referenced as a bandwidth delay product of the path between a source node 100 or destination node 140 (e.g., endpoints) and the flow control module 220, 230 is less than the maximum window size supported by the end nodes 100, 140. If the flow control module 220, 230 is "farther" away, some performance enhancement may still be provided, but the maximum may be limited by the insufficient window size (e.g., TCP window size) between the end node 100, 140 and the flow control module 220, 230.

In some embodiments, for greater performance, the flow control module, e.g., 220, can be configured to cause the source node 100 (or sender) to provide enough data to fill both the source node-to-flow control module path and the flow control module-to-destination (or receiver) path. When generating a preack for a packet received from the source node 100, the flow control module 220 performs an appropriate computation as described herein to determine the buffer size to place into the packet (i.e., the window size to advertise).

It is noted that alternative forms of window virtualization can be performed. For example, the flow control module could simply alter the contents of the advertised receive window as packets transited it. This could cause the advertisement of a larger window than the endpoint was actually offering. This might not be a problem, as the endpoint node might be capable of processing the data at a high enough rate to avoid overflowing.

Because the destination node 140 is still acknowledging the receipt of the packets through the flow control module 230, the flow control module 230 itself could monitor the inflow of data, holding up the transmission of packets that would overrun the window of the destination node 140. These packets could be stored locally until space became available at the destination node 140. Alternatively, the overflow packets could be dropped, eventually causing a retransmission. In either scenario, the flow control module 220, 230 could monitor the rate that the destination node 140 is absorbing data and limit the increase in the advertised send window so as to minimize overruns.

Another optimization with respect to window sizing can be applied. For example, many TCP implementations advertise a fixed window size for each TCP connection (actually a fixed maximum). However, TCP performance does not increase substantially when the window size is increased beyond the bandwidth delay product of the connection. Further, the advertised window size implies an equivalent reservation of system buffer memory. Thus, for connections with a bandwidth delay product less than the maximum window size, excess memory is reserved; while connections with a bandwidth delay product exceeding the fixed maximum experiences performance loss.

Note that a fixed maximum window size may be either wasteful of memory or underutilizes available bandwidth or both. To help address this, there can be configured an advertised window size that more closely tracks the bandwidth delay product of the TCP connection. One implementation of this permits each endpoint to monitor its current throughput and adjust its advertised window size (and the associated buffering) accordingly. Another method sets a relatively small fixed window size and uses a flow control module 220, 230, located within the bandwidth delay product range of the small window size, to provide the monitoring required to adjust the window size accordingly. The flow control module 220, 230 can optimize the window size of each individual connection so as to better utilize buffer memory.

Recongestion

Another enhanced PEP algorithm is recongestion. Once again, the enhanced PEP (or flow control module) is referred to as PEP for ease of discussion in this section. The standard TCP congestion avoidance algorithms are known to perform poorly in the face of certain network conditions, including: large RTTs, high packet loss rates, and others. When the PEP detects one of these conditions, it intervenes, substituting an alternate congestion avoidance algorithm that better suits the particular network conditions.

This PEP algorithm uses preacks to effectively terminate the connection between the sender and the receiver. It then resends the packets from itself to the receiver, using a different congestion avoidance algorithm. For maximum performance, the PEP should be located near the sender, as the connection between the sender and the PEP may serve to limit overall performance.

Recongestion algorithms are dependent on the characteristics of the TCP connection. An optimal algorithm for large RTT connections may perform poorly in a small RTT environment. The PEP monitors each TCP connection, characterizing it with respect to the different dimensions, selecting a recongestion algorithm that is appropriate for the current characterization.

In a preferred embodiment, upon detecting a TCP connection that is limited by RTT, a recongestion algorithm is applied which behaves as multiple TCP connections. Each TCP connection operates within its own performance limit but the aggregate bandwidth achieves a higher performance level. One parameter in this mechanism is the number of parallel connections that are applied (N). Too large a value of N and the connection bundle achieves more than its fair share of bandwidth. Too small a value of N and the connection bundle achieves less than its fair share of bandwidth.

One method of establishing "N" relies on the PEP monitoring the packet loss rate, RTT, and packet size of the actual connection. These numbers are plugged into the TCP response curve formula (see Mathis, et al.) to provide an upper limit on the performance of a single TCP connection in the present configuration. If the each connection within the connection bundle is achieving substantially the same performance as that computed to be the upper limit, then additional parallel connections are applied. If the current bundle is achieving less performance than the upper limit, the number of parallel connections is reduced. In this manner, the overall fairness of the system is maintained since individual connection bundles contain no more parallelism than is required to eliminate the restrictions imposed by the protocol itself. Further, each individual connection retains TCP compliance.

Another method of establishing "N" is to utilize a parallel flow control algorithm such as the TCP "Vegas" algorithm or its improved version "Stabilized Vegas." In this method, the network information associated with the connections in the connection bundle (e.g., RTT, loss rate, average packet size, etc.) is aggregated and applied to the alternate flow control algorithm. The results of this algorithm are in turn distributed among the connections of the bundle controlling their number (i.e., N). Optionally, each connection within the bundle continues using the standard TCP congestion avoidance algorithm.

In a preferred embodiment, the individual connections within a parallel bundle are virtualized, i.e., actual individual TCP connections are not established. Instead the congestion avoidance algorithm is modified to behave as though there were N parallel connections (more details below). This method has the advantage of appearing to transiting network nodes as a single connection. Thus the QOS, security and other monitoring methods of these nodes are unaffected by the recongestion algorithm.

In an alternate embodiment, the individual connections within a parallel bundle are real, i.e., a separate TCP connection is established for each of the parallel connections within a bundle. The congestion avoidance algorithm for each TCP connection need not be modified. However, transiting nodes will now see "N" separate connections and this may alter their behavior. Other implementation difficulties exist, as the sending PEP may not always be able to open an additional connection to the receiving PEP.

Figure 10:
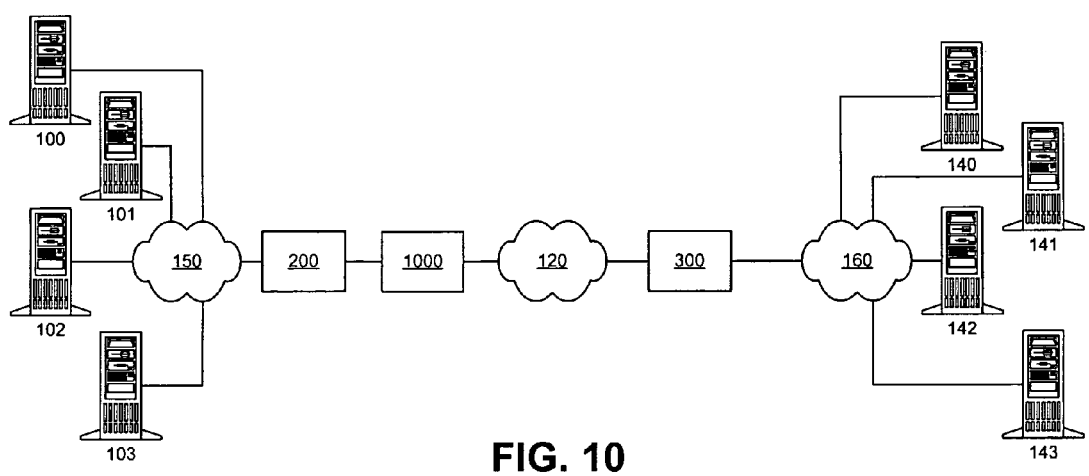
FIG. 10 shows the architecture of a system with two PEPs and a network address translation (NAT) device.

FIG. 10 depicts the architecture of a system with two PEPs (200 and 300) and a network address translation (NAT) device 1000. In this example, computer 100 (sender, source, or initiator) opens a TCP connection to computer 140 (receiver, destination or responder), resulting in the transfer of a large amount of data from computer 140 back to computer 100 (e.g., fetching a file via FTP, accessing a web page, etc.). The PEP 300 determines that the performance of the data transfer is limited and acts to increase the parallelism. In the preferred embodiment with virtual connection bundles, the PEP 300 uses the alternate congestion control algorithm to send data at the higher rate.

In an alternate embodiment with real connections, PEP 300 may be unable to directly open a connection to PEP 200 since it is behind a NAT device (this is a limitation of NAT devices). In this situation, PEP 300 adds a TCP option to one of the TCP packets indicating the need for an additional connection (or alternately, the number of additional connections needed). When PEP 200 receives a packet with this option, it initiates a connection to PEP 300. This secondary connection is tagged to indicate that it should be made a part of the original bundle (possibly the original request contained a tag that is reflected back). The tagging may be in the form of a TCP or IP option. After the secondary connection is established, it is made part of the connection bundle, enhancing performance.

If the sending PEP (i.e., the PEP desiring to increase the number of connections in the bundle) can directly address the receiving PEP (e.g., there is no NAT-like device in the path), then the sending PEP can open the correction directly using a normal TCP SYN packet, tagged to indicate to the receiver that this new connection is a secondary connection associated with the original bundle. Additional performance optimization can be made in this case by combining data to be sent with the opening SYN packet. This is expressly allowed by the TCP standard but is not commonly used due to limitations in the applications program interface (API) used in most operating systems (i.e., BSD sockets). If data to be sent is combined with the SYN that initiates the secondary connection then the total number of packets in the network is identical between the two methods. The primary difference is that the nodes along the path between the two PEPs either see one or multiple connections.

Advantageously, upon establishment of a parallel connection within a bundle, the congestion avoidance algorithm parameters for the new connection may be based on the other members of the bundle, avoiding the standard TCP slow-start behavior which is used to determine network conditions. For example, when the second connection of a bundle is opened, the sender can simply transfer half of the cwnd and ssthresh control variables of the primary connection to the second connection and allow the second connection to skip the slow-start phase and move directly into the congestion avoidance phase (alternate congestion avoidance algorithms would use different, but analogous, variables). One implementation difficulty of this choice is the lack of a TCP self-clock due to the absence of ACKs having been established by the second connection. However, the second connection could share the ACKs of other connections within the connection bundle itself. Alternately, the second connection could utilize a rate-based sending scheme until the TCP ACK self-clock is established. This is particularly effective since the round trip time of the second connection is already well established, allowing a rate-based sending scheme to spread the inter-packet delay evenly.

When the number of connections needs to be reduced, the sender may simply close a secondary connection by sending a FIN on that secondary connection. A FIN on the primary connection may be considered a shorthand to close all of the connections. Unlike the connection open scenario, there are no visibility problems created by NAT-like devices, as communications have already been established. Further, since it is a likely case that the number of parallel connections will vary over time (especially for long-lived connections), the system may optimize the creation of a secondary connection near in time to the destruction of a secondary connection by reusing the same port numbers so that the TCP control block associated with them can be reused (remember, TCP control blocks must remain active for up to two minutes after a connection is closed due to IP packet duplication, loss and delayed delivery issues).

When the PEP creates additional real connections, there are issues associated with how it is addressed. If the initiating PEP is known to have an independent, IP address that is visible to the responding PEP (this information may be exchanged during the open of the original connection when the PEPs identify each other's presence), then the secondary connections can utilize the IP address and port numbers associated with the originating PEP. Otherwise, the originating PEP must utilize the IP address of the original initiating system. This may force the PEP to pick a port number that is not currently in use by the originating system (for example, by tracking all connections opened by the originating system that transit the PEP whether to PEP enabled destinations or not) for the new secondary connection. Future activity by the originating system may cause it to choose as a port number the same port number chosen by the PEP. In this case, the PEP detects the port number' collision and translates it into an unused port number (again, this is done independently of whether the connection is to another PEP or not). Alternately, the PEP might choose to close the previously established secondary connection, allowing the new connection (that reuses the same port number) to proceed without port number translation. The closed secondary connection could be reestablished on a different, currently unused port number. As an optimization, a special option could be sent that directly transfers the second connection to an unused port (i.e., combines the close and subsequent open into a single message).

In the alternate embodiment with real connections, data ordering is an issue. The receiving PEP must be able to order the data received from the multiple parallel connections into a single stream of data. One method is for a TCP or IP option to be appended to each packet to indicate the ordering of the data between the multiple streams. Preferentially, this option contains either a starting sequence number and size or two sequence numbers (starting and ending). A single sequence number is insufficient as TCP packets can be fractured into two TCP packets legally by transiting nodes. By including the second number (i.e., size or ending sequence number) the receiving PEP is able to detect and handle this situation. Another method is to multiplex based on data index and an arbitrary data size. For example, if the data size is "M" and there are "N" parallel connections, then bytes [0 . . . M*N) of the original stream could be multiplexed as follows. M bytes of connection 0 could be bytes [0 . . . M) and M Bytes of connection 1 could be bytes [M . . . 2*M), etc. Other multiplexing schemes could be used, including placing additional demultiplexing information directly in the TCP payload itself.

In the preferred embodiment where the multiple connections are virtual, there are two implementation options: separate or combined bookkeeping. In the combined bookkeeping case, a single congestion window is computed for the overall aggregate connection. The referenced paper, "Differentiated End-to-End Internet Services using a Weighted Proportional Fair Sharing TCP" by John Crowcroft and Philippe Oechslin, contains one implementation method for this situation. In the separate bookkeeping case, a separate congestion window (and slow-start threshold) is maintained for each virtual connection. Individual packets are assigned to virtual connections with each virtual connection following the standard TCP operation rules. Assignment of packets to virtual connections can be done in many algorithms, including round robin, statistical, and first available. In the preferred embodiment, assignment of packets is deferred until one of the connections has sufficient congestion window to enable transmission of the packet. Thus packets are transmitted whenever any of the virtual connections has available bandwidth.

In cases of extreme congestion, enough packets can be lost to trigger a timeout (RTO) on one of the connections within a bundle. Under standard TCP congestion avoidance behavior, this causes a return to a cwnd of one packet and an initiation of slow-start behavior. The PEP may optionally apply this behavior to all connections within a bundle if any of them experiences an RTO. Alternately, the PEP may apply this behavior to only the individual connection that suffered the RTO. Alternately, the PEP may choose to reduce "N" to one before beginning the RTO recovery procedure.

The congestion avoidance algorithms described above use different methods to retain differing degrees of fairness in the allocation of network bandwidth while overcoming protocol limitations. However, while this is similar to the behavior of standard TCP implementations, it is not always the desired result. In many situations, unfair allocation of network resources is desired. Existing allocation algorithms (generically referred to as "Quality of Service" or QoS algorithms) often fail due to design or deployment deficiencies, resulting in insufficient performance for critical applications. In particular, there are no reliable QoS capabilities for the public Internet. Indeed, most private IP networks also fail to implement any usable form of QoS.

The least fair algorithm is to send the data at a constant rate regardless of network conditions. For some applications, this approximates the best behavior. In the presence of congestion, this algorithm would not reduce its rate, causing it to maximally benefit from the reduction in sending rates of the competing connections. In a preferred embodiment, one congestion avoidance algorithm is to seek a specified loss rate within a fixed minimum and maximum bandwidths. Periodically, the packet loss rate is measured and compared to the specified loss rate, if the measured loss rate is below the optimal target and the current sending rate is below the specified maximum then the sending rate is increased. If the measured loss rate is above the target and the current sending rate is above the minimum then the sending rate is reduced.

In a preferred embodiment, the selection of the congestion avoidance algorithm as well as the particular algorithms parameters is specified by operations personnel, considering criteria such as date, time of day, originating system, terminating system, protocol type and others.

Some congestion avoidance algorithms use estimates of the available bandwidth for a connection. Many techniques are known, an example of which is described in the paper "ABwE: A Practical Approach to Available Bandwidth Estimation," by Jiri Navratil and R. Les. Cottrell. This paper describes a method of estimating the available bandwidth on a connection using the dispersion of pairs of packets that where known to be sent adjacent to each other by the sender. One limitation of the mechanism described by the paper is that it periodically injects extra packets into the network, reducing network performance accordingly. In order to avoid this extra loading, the paper suggests operating intermittently.

In an alternate embodiment, a PEP may use the packet dispersion technique to estimate available bandwidth on a link. Rather than injecting additional packets (as taught by the referenced paper), the PEP simply marks each packet that is bound for the same destination as the previous packet when they are sent adjacent. The receiver uses this marking to compute the estimated available bandwidth and sends this information back to the sender (typically with a TCP option).

Local Retransmission

Another reason for implementing preacks is to prepare to transit a high-loss link (e.g., wireless). In these cases, the preacking PEP (i.e., the enhanced PEP or flow control module) is located most beneficially "before" the wireless link. This allows retransmissions to be performed closer to the wireless link, removing the retransmission burden from the remainder of the network.

Figure 8A:
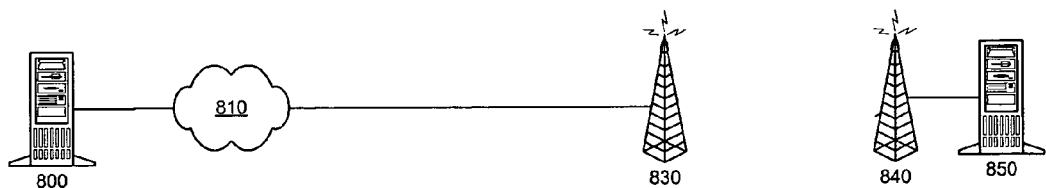
FIG. 8a depicts a common network configuration utilizing one wireless link.
Figure 8B:
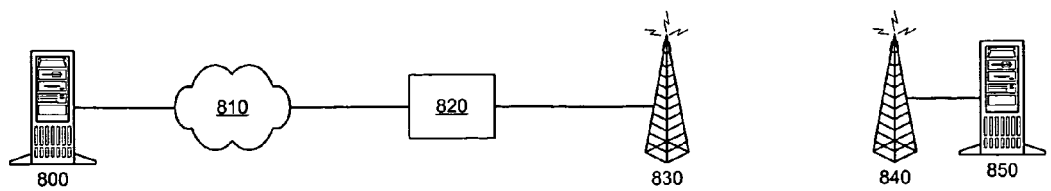
FIG. 8b shows the system of FIG. 8a augmented with a PEP.
Figure 9:
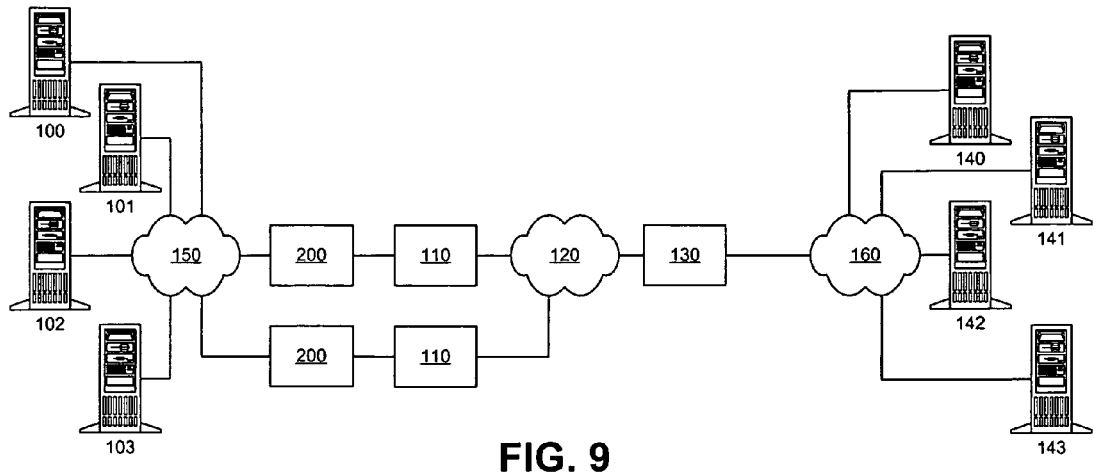
FIG. 9 depicts an embodiment of a system with multiple PEPs.

FIG. 8a depicts a common network configuration utilizing one wireless link. Computer 800 is connected to routing and switching infrastructure 810. One node of infrastructure 810 is wireless transceiver 830, which communicates with wireless transceiver 840, which is connected to computer 850. Packets from computer 800 destined for computer 850 are forwarded, by infrastructure 810, to transceiver 830. Transceiver 830 broadcasts the packets, which are received by transceiver 840, which sends them to computer 850. Packets from computer 850 to computer 800 travel the reverse route. If a packet is corrupted during the wireless transmission and reception phase, it is dropped by transceiver 840. Computer 800 will detect the loss of the packet using any of the standard TCP techniques for detecting dropped packets (dupacks and selective acknowledgements), and will retransmit accordingly. FIG. 8b shows the system of FIG. 8a augmented with PEP 820. Packets sent between transceiver 830 and infrastructure 810 transit the PEP and may be modified according to any PEP algorithms that are enabled.

PEP 820 may provide local retransmission, in which case, packets dropped due to failures of the wireless transmission process are retransmitted directly by PEP 820. This is advantageous because it eliminates the retransmission burden upon computer 800 and infrastructure 810. Further, it is often the case that the bandwidth of the wireless segment exceeds that of the slowest link within infrastructure 810. Without the PEP, the dropped packet would have to be retransmitted by computer 800, which would, according to standard TCP/IP congestion avoidance algorithms, reduce its bandwidth by one-half, resulting in poor overall transmission rates. With PEP 820 providing local retransmissions, the dropped packet can be retransmitted across the wireless link without necessitating a retransmit by computer 800 and a corresponding decrease in the rate of data transmission from computer 800 (since, in this case, the wireless link has greater bandwidth than the current transmission rate—likely the bandwidth differential is sufficient to retransmit the packet several times without requiring a pause in data transmission from the source).

Another reason for implementing preacks is to avoid the RTO penalty. In standard TCP there are many situations that result in an RTO, even though a large percentage of the packets in flight were successfully received. With standard TCP algorithms, dropping more than one packet within an RTT window would likely result in a timeout. Additionally, most TCPs experience a timeout if a retransmitted packet is dropped. In a network with a high bandwidth delay product, even a relatively small packet loss rate will cause frequent RTOs.

This RTO behavior is particularly painful with TCP SACK as the RTO requires packets that are known to have been received by the receiver (i.e., SACKed) to be retransmitted. This requirement is present to avoid a relatively rare memory deadlock situation at the receiver. (e.g., a receiver may be forced to drop previously SACKed packets in order to create sufficient room to receive packets that are actually in order, essentially reneging on the previous acknowledgement). In standard TCP, retransmission of packets is induced either by reception of a fixed number of duplicate ACKs (dupacks), typically three, or by examining SACK information and inferring a packet loss (i.e., forward acknowledgements—see RFC 2760 and others). The PEP may also use other criteria, such as direct RTT based evidence (i.e., noticing the lack of an acknowledged after one RTT has elapsed—naturally, this must take into account the Nagle delayed ACK behavior, if present).

An alternate retransmit and timeout algorithm is used by the PEP to avoid prematurely RTOing. A count of retransmissions is maintained on a per-packet basis. Each time that a packet is retransmitted, the count is incremented by one and the PEP continues to transmit packets (within the current bandwidth and window constraints). Any of the retransmission indicators described above can be used to stimulate the PEP into a retransmission. Only if a packet has been retransmitted a certain number of times is an RTO declared. This mechanism avoids declaring a premature RTO yet still successfully recovers in the rare situation when the receiver must renege on a previous SACK.

As described above, the standard TCP retransmit algorithms function poorly in the face of multiple packet losses within an RTT window. Depending on the congestion avoidance algorithm selected, the PEP may be called upon to operate in an environment where substantial packet loss is expected. In order to achieve acceptable performance, the retransmit algorithms of the PEP must handle this situation effectively without resorting to RTOs except in extremely rare conditions. The algorithms preferably are robust in the face of both intermittent and burst packet losses of both transmitted data and acknowledgements. The presence of packet reordering further complicates these algorithms and the description thereof. Consequently, the algorithms will be described as though reordering were not a consideration, and then their description will be enhanced to address reordering issues.

Wavefront Detection and Disambiguation of Acknowledgements

The paper, "Forward Acknowledgment: Refining TCP Congestion Control," by Matthew Mathis and Jamshid Mahdavi, describes an extension of the standard TCP mechanisms for determining that retransmitted packets have been lost. The mechanism operates by retaining the highest sequence number known to be held by the receiver (called snd.fack in the paper) and labeling each retransmitted packet with the current value of snd.nxt (the highest sequence number ever sent). When the sender receives an ACK or a SACK that updates snd.fack beyond the value of snd.nxt associated with a retransmitted packet, the sender assumes that the retransmitted packet has been lost.

One deficiency in this mechanism is that it relies on the introduction of new data to detect the loss of retransmitted data. Without the introduction of new data, snd.nxt is not advanced, thereby crippling the mechanism. There can be many reasons for the inability to introduce new data, including: exhaustion of the receiver's advertised window, exhaustion of the sender's window, and the end of new application data (i.e., the end of a transaction). Many network applications are transactional in nature; they send some data and wait for a response from their communicant. If the size of an application transaction is less than the bandwidth delay product of the network, this mechanism often fails to detect that retransmitted packets have been lost.

To address this deficiency, in one embodiment of a system and process in accordance with the present invention, a sender makes decisions about whether data packets have been lost by determining which data packet in the wavefront of transmitted data packets caused an acknowledgement to be generated. When the sender receives an acknowledgement for a data packet, the sender presumes loss of any data packet that was transmitted before the acknowledged data packet but has not yet been acknowledged. This is based on the observation that acknowledgements for packets tend to arrive in the same order the packets were originally transmitted. But an ambiguity arises when a retransmitted packet is acknowledged. In such a case, the receiver does not know which transmission of the data packet (i.e., which instance of the acknowledged data packet) in the wavefront of transmitted data packets caused the acknowledgement to be generated. This ambiguity is illustrated in the example of FIG. 24.

FIG. 24 illustrates an example of a series of data packets transmitted from a sender to a receiver over a network. Each data packet is labeled with its sequence number, which shows the identity of the data transmitted in the packet. In this example, the data packet having a sequence number of 1 is transmitted three times, ostensibly because the first two instances of its transmission are lost or otherwise not delivered to the receiver within sufficient time (indicated in the figure by the crossing out of the first two instances). When the receiver does receive a data packet having a sequence number of 1 (here, the third instance), the receiver generates and transmits an acknowledgement for that data packet back to the sender. From the point of view of the sender, however, it is ambiguous whether that acknowledgement was in response to the first, second, or third instance of the data packet's arriving. If the sender knows the real answer to this question—here, that the third instance is the one that was received—the sender will know that it is likely that earlier transmitted packets (e.g., sequence numbers 5, 4, 3, 2, and 0) are lost unless they have already been acknowledged.

Accordingly, the sender retransmits data packets to a receiver based on a perceived need to retransmit the packets by identifying the data packet in the wavefront of transmitted data packets that caused an acknowledgement to be generated. FIG. 25 illustrates a flow diagram of one embodiment of a method for determining whether particular data packets need to be retransmitted. As FIG. 25. illustrates, a sender transmits 2510 data packets over a network, where each instance of a transmitted data packet is associated with a transmit number. It can be appreciated that the transmit number for a packet is not the same as the packet's sequence number, since a sequence number references the data in the packet while the transmit number references an instance of a transmission of that data. The transmit number can be any information usable for this purpose, including a timestamp associated with a packet or simply an increasing number (similar to a sequence number or a packet number). Because a data segment may be retransmitted, different transmit numbers may be associated with a particular sequence number.

As the sender transmits 2510 data packets, the sender maintains 2520 a data structure of acknowledged instances of data packet transmissions. Each instance of a data packet transmission is referenced by its sequence number and transmit number, as shown in FIG. 24. By maintaining a transmit number for each packet, the sender retains the ordering of the transmission of data packets. When the sender receives 2530 an ACK or a SACK, the sender determines 2550 the highest transmit number associated with packets that the receiver indicated have arrived (in the received acknowledgement). Any outstanding unacknowledged packets with lower transmit numbers are presumed 2560 lost. In the cases where the ACK or SACK indicates the arrival of a packet that has never been retransmitted, this algorithm yields results substantially similar to the Mathis mechanism described above.

As mentioned above, however, the sender is presented with an ambiguous situation when the arriving packet has been retransmitted: The standard ACK/SACK does not contain enough information to allow the sender to determine which transmission of the arriving packet has triggered the acknowledgement. After receiving 2530 an ambiguous acknowledgement, therefore, the sender disambiguates 2540 the acknowledgement to associate it with a transmit number. This is needed before steps 2550 and 2560 because standard acknowledgements contain only the sequence number, not a transmit number. In various embodiments, one or a combination of several techniques may be used to resolve this ambiguity.

In one embodiment, the sender includes an identifier with a transmitted data packet, and the receiver returns that identifier or a function thereof with the acknowledgement. The identifier may be a timestamp (e.g., a TCP timestamp as described in RFC 1323), a sequential number, or any other information that can be used to resolve between two or more instances of a packet's transmission. In an embodiment in which the TCP timestamp option is used to disambiguate the acknowledgement, each packet is tagged with up to 32-bits of unique information. Upon receipt of the data packet, the receiver echoes this unique information back to the sender with the acknowledgement. The sender ensures that the originally sent packet and its retransmitted version or versions contain different values for the timestamp option, allowing it to unambiguously eliminate the ACK ambiguity. The sender may maintain this unique information, for example, in the data structure in which it stores the status of sent data packets. This technique is advantageous because it complies with industry standards and is thus likely to encounter little or no interoperability issues. However, this technique may require ten bytes of TCP header space in some implementations, reducing the effective throughput rate on the network and reducing space available for other TCP options.

In another embodiment, another field in the packet, such as the IP ID field, is used to disambiguate in a way similar to the TCP timestamp option described above. The sender arranges for the ID field values of the original and the retransmitted version or versions of the packet to have different ID fields in the IP header. Upon reception of the data packet at the receiver, or a proxy device thereof, the receiver sets the ID field of the ACK packet to a function of the ID field of the packet that triggers the ACK. This method is advantageous, as it requires no additional data to be sent, preserving the efficiency of the network and TCP header space. The function chosen should provide a high degree of likelihood of providing disambiguation. In a preferred embodiment, the sender selects IP ID values with the most significant bit set to 0. When the receiver responds, the IP ID value is set to the same IP ID value with the most significant bit set to a one. Two potential difficulties may arise with this method.

One difficulty is that the technique may fail or be unusable when data transmission is bi-directional, as the ID field may be oversubscribed (since the receiver is also a sender, the value that the receive path needs to reflect may overlap with one of the values disallowed by the send path). Even if bi-directionally compatible values can be achieved, there is another danger if the packets were to be IP fragmented, since the IP fragmentation reassembly algorithm might fail due to the potentially non-dense selection of the ID field values. The IP fragmentation hazard only occurs when the packet is larger than the minimum MTU size of 576 bytes. For unidirectional data transfer, the ACK-only packets are always smaller than 576 and therefore will never be fragmented, so this would not be an issue.

Another potential difficulty is that the identity of the ID field might not be preserved by intermediate processing equipment. In particular, intermediate equipment that repacketizes the data stream might alter the ID field. The sender monitors the reflected IP ID fields in the ACK-only packets, when it detects inconsistent values (e.g., values that are known not to be "in flight") it disables this method.

When data transmission is bi-directional and the packet size is greater than 576 bytes, two variations of the second technique may be employed. In a first variation, the ID field retains its traditional definition and the sender is left with the inability to disambiguate for these particular packets. In a second variation, the ID field retains its traditional definition and the TCP timestamp option is added to bi-directional packets to disambiguate. As with all usages of the TCP timestamp option, the sender of the first timestamp has the issue of what value to place in the echo half of the option—since the sender has not yet received one. In this variation, the incoming ID field is used as the echo value, allowing the original sender, which was not experiencing bi-directional data, to disambiguate.

In another embodiment, the transmit numbers associated with non-ambiguous acknowledgements are used to disambiguate an ambiguous acknowledgement. This technique is based on the principle that acknowledgements for two packets will tend to be received closer in time as the packets are transmitted closer in time. Packets that are not retransmitted will not result in ambiguity, as the acknowledgements received for such packets can be readily associated with a transmit number. Therefore, these known transmit numbers are compared to the possible transmit numbers for an ambiguous acknowledgement received near in time to the known acknowledgement. The sender compares the transmit numbers of the ambiguous acknowledgement against the last known received transmit number, selecting the one closest to the known received transmit number. In FIG. 24, for example, if an acknowledgement for data packet 1 is received and the last received acknowledgement was for data packet 5, the sender resolves the ambiguity by assuming that the third instance of data packet 1 caused the acknowledgement. Advantageously, this method requires no nonstandard actions on the part of the receiving equipment.

TCP Selection Acknowledgements

The techniques described above can provide robust behavior in the presence of very high loss rates for the transmitted data packets and modest loss rates for the acknowledge packets. Nevertheless, large burst losses of ACK packets will sometimes degrade these techniques, causing them needlessly to retransmit data that was actually received. This can occur when a receiver implements the SACK algorithm according to the recommendations in RFC 2018. The TCP header has room for up to four SACK ranges. The RFC requires that the first SACK range include the landing packet that triggered this SACK packet, and any additional ranges, up to the capacity of the SACK packet, are to be presented in most recent temporal order. This ordering guarantees that any landing packet will be documented in at least three consecutive SACK packets. However, this algorithm may result in poor performance in high packet loss environments because it confines the knowledge of the receipt of a packet to temporally adjacent SACK packets—all of which may be dropped in a burst loss situation. When using this algorithm, while the sender is able to determine that some packets have been received, it cannot necessarily determine which packets have been lost due to the possibility of dropped SACK packets.

Figure 26:
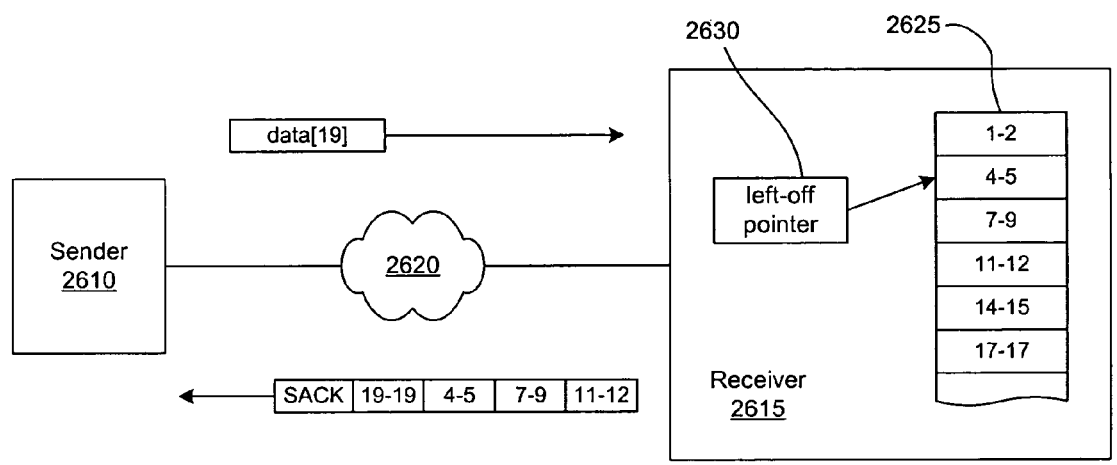
FIG. 26 illustrates one embodiment of a system for transmitting and acknowledging data packets.

These deficiencies can be addressed by adding functionality to the sender and to the receiver in accordance with the present invention. This additional functionality allows the sender to determine unambiguously a list of packets that have been received by the receiver as well as an accurate list of packets not received—even in the presence of high SACK packet losses. The added functionality may be implemented by modifying the sender and/or receiver, or by inserting sender- and receiver-side flow control modules (or PEPs, such as those described herein) in the network path between the sender and receiver. Accordingly, any functionalities attributed to the sender or receiver here could be implemented by a flow control module, acting as a proxy device for the sender or receiver, coupled to the sender or receiver in the network connection therebetween. FIG. 26 illustrates one embodiment of a system for transmitting and acknowledging data packets, in accordance with an embodiment of the invention.

As FIG. 26 illustrates, a sender 2610 is communicatively coupled to a receiver 2615 over a network 2620. The sender 2610 is configured to transmit data packets to the receiver 2615 over the network 2620, in response to which the receiver 2615 returns a SACK packet to the sender 2610. In a typical embodiment, the communication is bi-directional, although only one direction of communication is discussed here for simplicity. The receiver 2615 maintains a list 2625, or other appropriate data structure, that contains a group of ranges of sequence numbers for data packets that the receiver 2615 has actually received. Preferably, the list 2625 is sorted by sequence number in an ascending or descending order. The receiver 2615 also maintains a left-off pointer 2630, which comprises a reference into the list 2625 and indicate the left-off point from the previously generated SACK packet.

Upon reception of a data packet, the receiver 2615 generates and transmits a SACK packet back to the sender 2610. As described above, the SACK packet includes a number of fields, each of which can hold a range of sequence numbers to indicate a set of received data packets. Completing the first field of the SACK information per the RFC, the receiver 2615 fills this first field with a range of sequence numbers that includes the landing packet that triggered the SACK packet. (It is noted that this is compatible with RFC 2581.) In the example shown in FIG. 26, this first range is 19-19, since the data packet having a sequence number of 19 triggered the SACK packet. The remaining available SACK fields are filled with ranges of sequence numbers from the list 2625 of received packets. As there are more ranges in the list 2625 than can be loaded into the SACK packet, the receiver 2615 uses the left-off pointer 2630 to determine which ranges are loaded into the SACK packet. The receiver 2615 inserts the SACK ranges consecutively from the sorted list 2625, starting from the range referenced by the pointer 2630 and continuing down the list 2625 until the available SACK range space in the TCP header of the SACK packet is consumed. The receiver 2630 wraps around to the start of the list 2625 if it reaches the end. Typically, two or three additional SACK ranges can be added to the SACK range information. Continuing the example of FIG. 26, the remaining three range fields are loaded with the ranges: 4-5 (the range referenced by the pointer 2630), 7-9, and 11-12.

Once the receiver 2615 generated the SACK packet, it sends the acknowledgement back to the sender 2610. The receiver 2615 then advances the left-off pointer 2630 by one or more SACK range entries in the list 2625. If the receiver 2615 inserts four SACK ranges, for example, the left-off pointer 2630 may be advanced two SACK ranges in the list 2625. When the advanced left-off pointer 2630 reaches at the end of the list, the pointer 2630 is reset to the start of the list 2625, effectively wrapping around the list 2625 of known received ranges. Wrapping around the list 2625 enables the system to perform well, even in the presence of large losses of SACK packets, since the SACK information that is not communicated due to a lost SACK packet will eventually be communicated once the list 2625 is wrapped around.

The example of FIG. 26 illustrates how this scheme communicates which packets have been received as well as which packets have not been received. In the example, the receiver's SACK range list 2625 includes the ranges: 1-2, 4-5, 7-9, 11-12, 14-15 and 17-17. Because the list 2625 is sorted, these ranges imply that the receiver 2615 has not received the packets 3, 6, 10, 13, and 16. In the example, further, the left-off pointer 2630 references the range 4-5 in the list 2625. As the arriving packet from the sender 2610 contains the data with sequence number 19, the receiver 2615 responds with a SACK packet containing 19-19 in the first range and 4-5, 7-9, and 11-12 in the following three ranges. The left-off pointer 2630 is then advanced to reference entry 7-9 of the list 2625 (or, optionally, to reference entry 11-12). Upon receiving this SACK information, the sender 2610 knows unambiguously that when the packet containing 19 landed at the receiver, the receiver not only possessed the data explicitly included in the SACK ranges (4, 5, 7, 8, 9, 11, 12, and 19 in the example), but that the receiver had not received data packets for the data between the provided ranges (6 and 10 in the example). In this example, the sender could be confidant that it should retransmit 6 and 10, assuming that it had not already retransmitted 6 or 10 after the transmission of 19. Continuing the example, if the next packet received by the sender were packet 20, the sender would return a SACK packet with the ranges 19-20, 7-9, 11-12, and 14-15. Again, this SACK packet would communicate to the sender that the receiver did not have packets 10 or 13 at the time it received the data with sequence number 20.

It can be appreciated, therefore, that the SACK packet described herein may communicate several details about the condition of the receiver 2615. First, the SACK packet indicates that, upon generation of the SACK packet, the receiver 2615 had just received a data packet that is within the first field of the SACK information. Secondly, the second and subsequent fields of the SACK information indicate that the receiver 2615 has received the data packets within those ranges. And finally, the SACK information implies that the receiver 2615 had not, at the time of the SACK packet's generation, received any of the data packets that fall between the second and subsequent fields of the SACK information. In essence, the ranges between the second and subsequent ranges in the SACK information are "holes" in the received data, the data therein known not to have been delivered. Using this method, therefore, when a SACK packet has sufficient space to include more than two SACK ranges, the receiver 2615 may indicate to the sender 2610 a range of data packets that have not yet been received by the receiver 2615. It is noted that nothing is necessarily known about the data packets with sequence numbers that fall between the first and second ranges in the SACK packet, as these ranges are usually not consecutive.

In another embodiment, the sender 2610 uses the SACK packet described above in combination with the retransmit algorithm, described in the previous section, to make assumptions about which data packets have been delivered to the receiver 2615. For example, when the retransmit algorithm (using the transmit numbers) declares a packet lost, the sender 2610 considers the packet to be only conditionally lost, as it is possible that the SACK packet identifying the reception of this packet was lost rather than the data packet itself. The sender 2610 thus adds this packet to a list of potentially lost packets, called the presumed lost list. Each time a SACK packet arrives, the known missing ranges of data from the SACK packet (as described above) are compared to the packets in the presumed lost list. Packets that contain data known to be missing are declared actually lost and are subsequently retransmitted. In this way, the two schemes are combined to give the sender 2610 better information about which packets have been lost and need to be retransmitted.

In one embodiment, sender 2610 continually monitors the returned SACK ranges, looking for inconsistent behavior. Behavior that is inconsistent with this technique indicates to the sender 2610 that the receiver 2615 is not following the scheme. One method of detecting inconsistent behavior is to notice that SACK ranges after the first range are not provided in a sorted sequence number order. If inconsistent behavior is detected, the sender 2610 cannot make valid assumptions in accordance with this scheme, so the functionality is suppressed in the sender 2610 as well.

As stated earlier, the above description does not discuss packet reordering. In the presence of packet reordering, the scheme described above may prematurely determine that a packet has been lost and retransmit it, only to subsequently discover that the packet was received out of order and therefore the retransmission was unnecessary. To address this problem, in one embodiment, packets are not removed from the presumed lost list and retransmitted until a minimum number of additional acknowledgements (called dupthresh) have arrived. The value for dupthresh can be set in accordance with the amount of packet reordering present or expected. Several methods of determining the value of dupthresh are known, a discussion of which is contained in the paper, "RR-TCP: A Reordering-Robust TCP with DSACK," by Ming Zhang, Brad Karp, Sally Floyd, and Larry Peterson.

Transaction Boundary Detection

One class of optimizations pertains to ping-pong behaved connections. At the TCP layer, ping-pong behavior is when one communicant sends data and then waits for a response from the other communicant. Examples of ping-pong behavior include remote procedure call, HTTP and others. The algorithms described above use retransmission timeout (RTO) to recover from the dropping of the last packet or packets associated with the transaction. Since the TCP RTO mechanism is extremely coarse (requiring a minimum one second value in all cases), poor application behavior is seen in these situations.

To address this problem, in one embodiment, the sender of data or a flow control module coupled to the sender detects a transaction boundary in the data being sent. Upon detecting a transaction boundary, the sender or a flow control module sends additional packets, whose reception generates additional ACK or SACK responses from the receiver. Insertion of the additional packets is preferably limited to balance between improved application response time and network capacity utilization. The number of additional packets that is inserted may be selected according to the current loss rate associated with that connection, with more packets selected for connections having a higher loss rate. In one example, the method is performed in a flow control module, such as in the PEP 200 in a network topology like that shown in FIG. 2.

One method of detecting a transaction boundary is time based. If the sender has been sending data and ceases, then after a period of time the sender or flow control module declares a transaction boundary. This may be combined with other techniques. For example, as is known, the setting of the PSH bit by the sender in the TCP header is a potential indication of a transaction boundary. Accordingly, combining the time-based approach with these additional heuristics can provide for more accurate detection of a transaction boundary. In another technique, if the sender or flow control module understands the application protocol, it can parse the protocol data stream and directly determine transaction boundaries. This last behavior can be used independent of any time-based mechanism.

Responsive to detecting a transaction boundary, the sender or flow control module transmits additional data packets to the receiver to cause acknowledgements therefrom. The additional data packets should therefore be such that the receiver will at least generate an ACK or SACK in response to receiving the data packet. In one embodiment, the last packet or packets of the transaction are simply retransmitted. This has the added benefit of retransmitting needed data if the last packet or packets had been dropped, as compared to merely sending dummy data packets. In another embodiment, fractions of the last packet or packets are sent, allowing the sender to disambiguate the arrival of these packets from their original packets. This allows the receiver to avoid falsely confusing any reordering adaptation algorithms. In another embodiment, any of a number of well-known forward error correction techniques can be used to generate additional data for the inserted packets, allowing for the reconstruction of dropped or otherwise missing data at the receiver.

Accordingly, this technique helps to avoid a timeout when the acknowledgements for the last data packets in a transaction are dropped. When the sender or flow control module receives the acknowledgements for these additional data packets, it can be determined from these additional acknowledgements whether the last data packets have been received or need to be retransmitted, thus avoiding a timeout. In one embodiment, if the last packets have been received but their acknowledgements were dropped, a flow control module generates an acknowledgement for the data packets and sends the acknowledgement to the sender, thus communicating to the sender that the data packets have been delivered. In another embodiment, if the last packets have not been received, a flow control module sends a packet to the sender to cause the sender to retransmit the dropped data packets. This can be accomplished according to any of a number of techniques, such as the methods described in previous sections herein.

Repacketization

As described above, TCP performance is proportional to packet size. Thus increasing packet sizes improves performance unless it causes substantially increased packet loss rates or other nonlinear effects, like IP fragmentation. In general, wired media (such as copper or fiber optics) have extremely low bit-error rates, low enough that these can be ignored. For these media, it is advantageous for the packet size to be the maximum possible before fragmentation occurs (the maximum packet size is limited by the protocols of the underlying transmission media). Whereas for transmission media with higher loss rates (e.g., wireless technologies such as WiFi, etc., or high-loss environments such as power-line networking, etc.), increasing the packet size may lead to lower transmission rates, as media-induced errors cause an entire packet to be dropped (i.e., media-induced errors beyond the capability of the standard error correcting code for that media), increasing the packet loss rate. A sufficiently large increase in the packet loss rate will actually negate any performance benefit of increasing packet size.

It is difficult for a TCP endpoint to choose an optimal packet size. Indeed, the optimal packet size may vary across the transmission path, depending on the nature of each link. By inserting an enhanced (or flow control module) PEP into the transmission path, this situation can be improved. Again, the enhanced PEP may simply be referenced as a PEP for ease of discussion in this section. An intermediate PEP can repacketize data, (i.e., combine packets with sequential data into a smaller number of larger packets or break apart a sequence of large packets into a larger number of smaller packets). A PEP can monitor the link characteristics and adjust the transiting packet sizes through recombination to improve throughput.

A choice facing the PEP designer, when repacketizing, is how to handle ACKs to the sending TCP endpoint. One strategy is to do nothing (i.e., let the destination TCP endpoint generate ACKs—as it does normally—and allow these ACKs to propagate back to the originating TCP endpoint). This method's advantage is that there is no requirement that the ACKs be routed through the PEP. Hence, this option works regardless of the overall network topology (i.e., unrestricted). However, this method has other disadvantages. One disadvantage is that the sending TCP endpoint will be receiving ACKs for sequence numbers different than those that were sent. Although permitted by the TCP specification, this situation is unusual, increasing the risk that some TCP implementations will malfunction. Another disadvantage is that when a packet is dropped, the sending TCP may incorrectly recognize which packets require retransmission, ultimately requiring a timeout to regain synchronization and causing needless performance loss.

Another PEP implementation choice is to require full-duplex communications. In this case, the PEP can alter the returning ACKs and adjust the sequence numbers to match the original sending sequence. This requires the PEP to reproduce the original sequence number stream. One method of reproduction is to store the original sequence number sequence.

Saving only the original sequence number stream limits the performance gain that a PEP can achieve. Since the original data is not saved, only the TCP endpoint can retransmit any dropped data. But the retransmissions are performed only on the boundaries of the original packets, wasting network bandwidth due to the misalignment of the original and repacketized streams.

Another implementation choice is to save the original data stream. This choice allows increased efficiency in the handling of dropped packets as the PEP can supply the missing data exactly. Further optimization occurs because the retransmitted data does not consume bandwidth on the network links between the sending TCP endpoint and the PEP. Note that this is very similar to a preack situation. If the PEP implements preacks, then repacketization is easy to add.

Repacketization is beneficial for connections that move large amounts of data. However, it is injurious to connections that are latency sensitive (e.g., TELNET and others), as the PEP may wait for additional packets from the sender to constitute a full MTU packet, increasing the latency for transmission.

Dual PEP Algorithms

Another class of enhanced PEP algorithms in accordance with the present invention is known as dual-PEP algorithms. Again, for ease of discussion, enhanced PEPs (flow control modules) are referenced as PEPs in this and subsequent sections. Dual-PEP algorithms require the presence of two PEPs in the conversation. Typically, a dual-PEP algorithm is also a full-duplex PEP algorithm. A dual-PEP algorithm, similar to a VPN, operates by transforming the packets sent by a sender into another format. This intermediate packet format is sent from one PEP to the other PEP. The receiving PEP transforms the packet back into a format comprehensible to the receiver before forwarding it. Packet transformations are not limited to modifications of the payload. Dual-PEP algorithms may augment or modify protocol control fields, as well.

Figure 3:
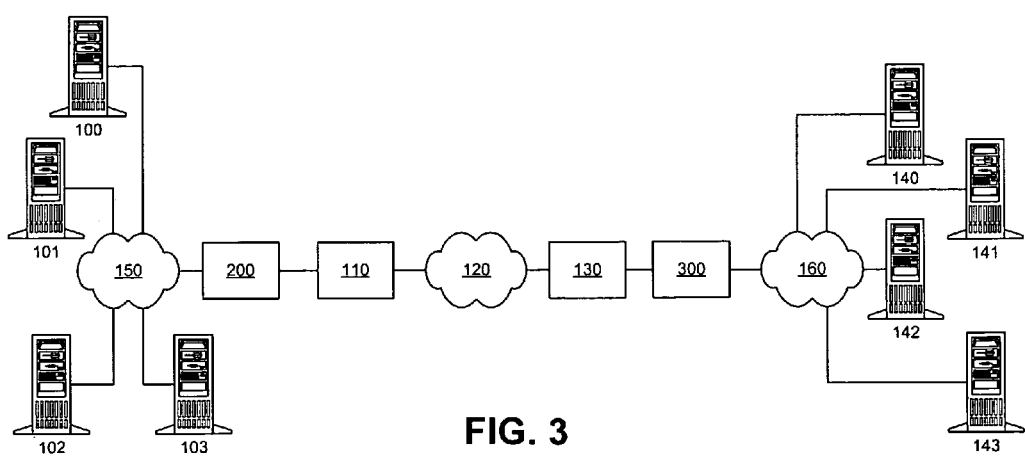
FIG. 3 depicts the Virtual Private Network of FIG. 1 augmented with two PEPs.

FIG. 3 depicts the addition of a second PEP 300 into the system of FIG. 2. This configuration allows the use of dual-PEP algorithms in communications between computer 100 and computer 140. In this configuration, the packets that flow between PEP 200 and PEP 300 may contain data that is not understood by either endpoint. However, through the use of standard TCP format packets, the transfer of these packets between the two PEPs is subject to the same operations as though the two PEPs were not present in the conversation (i.e., FIG. 1).

Compression

One example of a dual-PEP algorithm is compression, which boosts performance by transferring less data between the two participating PEPs. Two forms of compression are known, context-sensitive and context-insensitive. Context-insensitive data compression is applied to data without knowledge of the type of data. Context-sensitive compression utilizes knowledge of the data type to select a specific compression algorithm from a suite of suitable algorithms. In general, knowledge of the specific protocol is required to perform context-sensitive compression. A PEP can use TCP port numbers (i.e., well-known ports), as well as data from the connection itself to determine the appropriate compression algorithm to use. Some protocols use only a single type of data, requiring only a single compression algorithm that can be selected when the connection is established. Other protocols contain different types of data at different times. For example, POP, IMAP, SMTP, and HTTP all move files of arbitrary types interspersed with other protocol data. Knowledge of the data type and, in most cases, permission from the user are required to use a lossy compression algorithm. Otherwise, only lossless compression algorithms can be employed safely. Compression is not limited to the protocol payload. The control fields of the protocol itself may be compressed, using a completely different algorithm than that used for the payload.

Upper-Level Protocol PEPs

Some PEP algorithms are applied specifically to the upper-level protocol of a connection. These upper-level protocol-specific PEP algorithms analyze the conversation, typically on a transaction-by-transaction basis. Typical upper-level PEP algorithms include: caching, pre-fetching, post-writing, and others.

The UNIX Network File System (NFS) and The Common Internet File System (CIFS, also known as Server Message Block (SMB)) are well known file serving network protocols that may operate on top of TCP/IP. An upper-level PEP algorithm can apply many optimizations to TCP connections using these protocols.

Bridging Gateway

Figure 11:
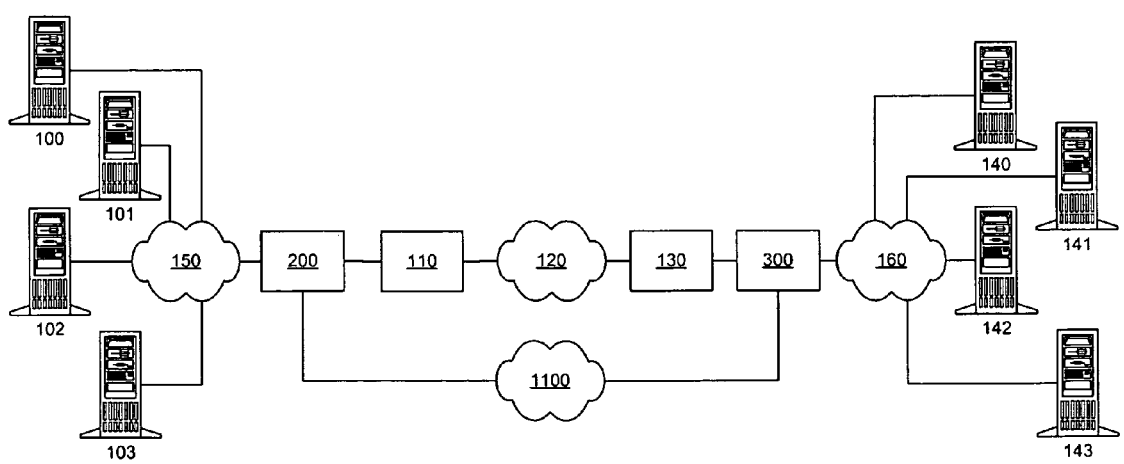
FIG. 11 shows the system of FIG. 3 augmented with a connection oriented network.

Two PEPs can also use a non-IP network to transfer data between themselves. FIG. 11 depicts the system of FIG. 3 augmented with network 1100 connected between PEPs 200 and 300. In this example, network 1100 is a connection-oriented network using technologies such as Asynchronous Transfer Mode (ATM), Frame Relay (FR) or Signaling System Seven (SS7). When PEP 200 receives packets bound for PEP 300 that it determines should use network 1100, it establishes a connection to PEP 300 through network 1100 (assuming one does not already exist that is to be reused) and sends these packets to PEP 300 through this network. Likewise, PEP 300 may choose to route packets destined for PEP 200 through the same connection on network 1100 or use an alternate path, like a different connection on network 1100 or via a normal IP oriented connection through Internet 120.

In a preferred embodiment, a TCP connection from computer 100 destined for computer 140 is handled as follows. The connection initiating SYN packet is allowed to flow through Internet 120. The SYN packet is tagged to indicate the presence of PEP 200 and optionally the network 1100 address of PEP 200. When PEP 300 receives the SYN packet, the tagging is stripped off before it is forwarded to computer 140. When the return SYN from computer 140 transits PEP 300, it is augmented with the network 1100 address of PEP 300. PEP 200, upon receipt of the packet, signals network 1100 to establish a connection to PEP 300. Subsequent packets associated with this TCP connection are sent directly through network 1100, bypassing Internet 120.

One advantage of this method is that packets sent through network 1100 may utilize the benefits of the alternate network. For example, ATM networks offer Quality of Service (QoS) capabilities not generally available in IP networks, allowing the guarantee of bandwidth to be made for mission-critical applications.

In an alternate embodiment, the connection on network 1100 can be initiated by PEP 300 upon receipt of the original SYN packet. In this case, the return SYN packet could still be returned through Internet 120 or it could be returned via the connection on network 1100, in neither case does it need to be augmented with the network 1100 address of PEP 300 (though it still could be).

Two mechanisms are provided to determine whether an individual connection should be left on Internet 120 or moved to a connection on network 1100. One mechanism is direct knowledge of the connection. PEP 200 (or PEP 300) consults a table upon receipt of the connection-initiating packet. The information within the table identifies which network to use. The PEP uses the IP address and port information together with the information in the table to make its decision. Other information may also be used to influence the decision, such as time of day, network utilization levels, network congestion levels, etc. Another mechanism is programmatic. An external agent can directly inform a PEP that certain connections are to be placed on network 1100 instead of on Internet 120.

The connection on network 1100 may be used to serve a single TCP connection. If network 1100 provides reliable sequenced delivery of data, then the TCP and IP headers on each packet can be removed before being sent on the network 100 connection and no TCP acknowledgements need be sent (noting that acknowledgements may be sent as part of the particular protocol on network 1100, but they are not TCP acknowledgements). Another advantage of this configuration is the elimination of the TCP congestion avoidance algorithm's interactions with the transport algorithms of network 1100. If the connection on network 1100 is used to service multiple TCP connections, then data packets need to be tagged with a connection identifier so that the receiving PEP can demultiplex the data stream.

In another mode, the PEP need not be driven by connection establishment to utilize network 1100. Criteria can be established that direct a PEP to transparently move a connection currently operating over Internet 120 to utilize a connection on network 100 or the reverse. Indeed a long running connection could be moved between the two networks multiple times during its lifetime. Suitable criteria may include operational parameters such as time of day, priority of data, etc. or may include such information such as network loading and loss rates. When the TCP connection is actually a connection bundle or real TCP connections, only a subset of the connections within the bundle need be moved from one network to another, thereby utilizing both networks.

Additional Embodiment

Figure 4:
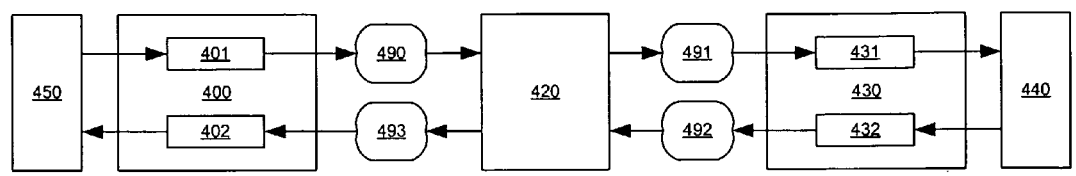
FIG. 4 shows the architecture of a PEP.

FIG. 4 shows the architecture of an additional embodiment of a PEP in accordance with the present invention. The depicted PEP is symmetrical, in that data can flow in either direction. For a first direction of data flow, packet interface 450 receives packets from a network and forwards them to endpoint 400. Endpoint 400, operating as described below, contains receive path 401, which delivers data to storage queue 490. Filter 420 removes data from storage queue 490 and processes it as described below. Filter results destined for the same data flow direction are placed into storage queue 491. Endpoint 430, containing send path 431, removes data from storage queue 491, packetizing it for delivery to a network via network interface 440.

Note that storage queue 490 may be required only for certain implementations of filter 420. Some implementations of filter 420 may not require retaining inbound data, in which case, the storage queue is unnecessary. Other implementations of filter 420 may provide storage within themselves, eliminating the need for the storage queue.

Similarly, for a second direction of data flow, network interface 440 provides packets to endpoint 430. Receive path 432 of endpoint 430 delivers data to storage queue 492. Filter 420 removes data from storage queue 492, placing results destined for the same direction into storage queue 493. Send path 402 of endpoint 400 removes data from storage queue 493, packetizing it for delivery to a network via network interface 450. Henceforth, this description will describe data flowing in the first direction. However, one skilled in the art will understand that the same description also applies to data flowing in the second direction, using the inverse direction elements, as described above.

Filter 420 is able to operate on both directions of data flow serially and simultaneously. For example, data removed from storage queue 490 may contain a command whose result is currently cached or can be internally generated. In this case, filter 420 simply inserts the result of this operation into storage queue 493 for transmission back to the original requestor, deleting the original request.

Once a connection has been established (i.e., after the special connection establishment processing described below), endpoint 400 provides some TCP upper-level behaviors and PEP algorithms. Receive path 401 is responsible for reconstructing the TCP data stream before placing it into storage queue 490. This requires that receive path 401 perform packet reordering. When out-of-order packets are received, as identified by their TCP sequence number, receive path 401 places them into an internal storage area until the missing packets arrive. As packets arrive, receive path 401 examines its internal storage area, delivering into storage queue 490 all of the data that has arrived in the correct order.

Receive path 401 of endpoint 400 provides preacking; when a packet arrives an acknowledgement is generated and sent using send path 402. Standard TCP delayed ACKs are supported as well as non-delayed ACKs. Flow control of the sender is provided by controlling the contents of the window field on acknowledge packets. The endpoint determines the value to place in the window field by subtracting the amount of data resident in this direction of the system (i.e., in storage queues 490 and 491, filter 420 and endpoint 430) from its estimate of the correct window size. This value is clipped to the maximum value of the window field in the packet (i.e., if the maximum window field of the ACK packet is insufficient to represent the computed value). The correct window size is computed from the running estimate of the RTT or, in an alternate embodiment, is simply a large constant. Optionally, the window size may be further limited when insufficient buffer memory is available. In steady state the window size is adjusted to maintain the rate of data ingress equal to the rate of data egress, as defined by any bandwidth allocation policy that may be present. Thus, the PEP provides fine-grained flow control, limiting the sender's rate without dropping packets and without forcing retransmissions.

In an alternate embodiment, flow control may be accomplished by delaying ACKs as well as manipulating the window field. In this embodiment, when receive path 401 receives a packet that is in order the ACK response for that packet is queued until that packet is sent by send path 431. If a packet is received that is out of order, then all previously queued ACKs are transmitted as well as the ACK that indicates the receipt of the out of order packet. In addition, send path 491 of endpoint 430 provides multiple PEP algorithms for outbound data, including recongestion and repacketization, for example, as described previously and below.

Additional Repacketization Embodiment

Repacketization is performed by extracting data from storage queue 491 in full-sized packet amounts and sending those packets. When there is insufficient data in storage queue 491 to form a full-sized packet, send path 431 decides either to wait for more data to arrive or to send a small packet immediately. The send-or-wait decision involves several criteria. If the push flag (PSH) or urgent pointer has been set for the data in the send queue, then it is sent immediately. If neither of these is set, then the send path may choose to delay sending the data, opting to wait for more data to arrive in storage queue 491. If additional data has not arrived within a short period, then the remaining data is sent even though the packet is smaller than the maximum allowed. In a preferred embodiment, the PEP monitors the average time between the arrivals of adjacent non-MTU sized packets. When the arrival time is less than a constant, repacketization is enabled. When the arrival time is greater than a constant, repacketization is disabled. In a preferred embodiment, the constant is 0.2 seconds, approximately the same as the maximum amount of time that the PEP waits before sending a non-full MTU sized packet.

The repacketization algorithm is most effective when storage queue 491 continues to receive data at a rate sufficient to allow the sending of full-sized packets. The window virtualization method of receive path 401 uses the occupancy of storage queue 491 as part of the criteria for controlling the sending rate of the TCP sender, filling storage queue 491 so as to allow maximum-sized packets to be sent by send path 431 as much as possible.

Path MTU Discovery

An important part of the repacketization algorithm is the handling of path MTU (PMTU) discovery. RFC 1191, herein included by reference, contains a description of the IETF-recommended algorithm for PMTU discovery. The repacketization algorithm needs to know the PMTU to the receiver. There are two methods for handling PMTU discovery within a PEP using the standard IETF methods: piggybacked and autonomous.

In the piggybacked method, the PEP relies on the sending TCP to perform PMTU discovery, observing the results and reacting accordingly. When a packet is received by receive path 401 with the "don't fragment" bit (DF) set, this flag is carried through the PEP and placed onto a corresponding packet sent by send path 431 (e.g., having the DF flag set on a packet temporarily inhibits the repacketization algorithm, so that a packet larger than the current MTU can be transmitted). This packet will either reach the destination, in which case it represents a candidate for a new PMTU size, or an ICMP error packet will be received. Upon reception of this error packet, the PEP knows that the new proposed PMTU size is not valid for send path 431 and that it must retain the old PMTU size. Reception of the ICMP error message also indicates that the large PMTU packet was dropped, so the PEP retransmits it. Of course, normal TCP behavior will also cause this packet to be retransmitted, so special handling of this ICMP-induced retransmission case by the PEP is optional. The ICMP packet is not forwarded back to the TCP sender. By failing to forward the ICMP packet, the TCP sender will use the new PMTU in its communications with the PEP.

This is a typical case whereby a computer on a LAN communicates with another computer via the WAN (VPN or through a router). Often, the PMTU for the LAN segments is larger than that for the WAN segments. By suppressing the PMTU error packet (ICMP), the TCP sender is allowed to use the larger packet size for this connection, achieving improved network efficiencies for the LAN, TCP sender, and PEP as fewer, larger packets are processed for the same data transfer rate.

In the autonomous method, the PEP itself initiates PMTU discovery. The PEP creates a proposed new PMTU (larger than the current PMTU for the connection). Transiting data is repacketized to the larger PMTU and the DF flag is set on these packets. The PEP waits for the return of an ICMP error packet. Upon receipt of the error packet, the proposed larger PMTU is known to be invalid and a smaller value is used. If, after a suitable period, there is no error, then the PEP knows that the new larger PMTU is acceptable. Alternately, an ACK of the larger-sized packet signals acceptance of the new PMTU size.

The piggyback method cannot be relied upon completely to optimize the PMTU of all paths in the connection. For example, referring to FIG. 3, assume that the PMTU of the segments comprising Internet 120 have the smallest PMTU and further assume that PEPs 200 and 300 utilize only the piggyback method. PMTU discovery initiated by computer 100 to computer 140 properly will discover that computer 100 can send large packets to PEP 200. PEP 200 properly will repacketize to the smaller PMTU of Internet 120. However, PEP 300 will fail to recognize that it can repacketize from the smaller, inbound PMTU of Internet 120 to a larger PMTU for transmission to computer 140. Only if PEP 300 uses the autonomous PMTU discovery method for data sent to computer 140 will the larger MTU size be discovered. Alternately, PEP 300 must wait for computer 140 to initiate PMTU discovery to enable the larger-size packets, however, this only operates correctly when it is known that the two directions are symmetric.

It is known that the standard algorithm for PMTU discovery does not work in all configurations, due to the blocking of the returning ICMP messages in many interior nodes, such as firewalls, etc. In these situations, the sender must notice that all packets are dropped after attempting to increase the MTU. After a suitable timeout, the sender lowers the MTU and suspends the PMTU discovery algorithm. Note that the blocking of the ICMP error packet in the piggybacked PMTU mode described above does not cause failure of the standard PMTU discovery algorithm, as the larger packets are ACKed to the sender.

A dual-PEP algorithm performs reliable PMTU discovery between PEPs for TCP connections in a more efficient manner than that described in the IETF's RFCs. As with the standard PMTU discovery algorithm, the sender periodically probes for a larger MTU. The sending PEP computes a new proposed PMTU size (larger than the current PMTU and no greater than the MTU of the initial network segment) and repacketizes to the larger size. Unlike the standard algorithm, fragmentation is not prohibited for these larger packets (i.e., the DF flag is left off). The receiving PEP observes the arrival of packets. If the receiver detects the arrival of a fragmented packet, then the receiver reports back to the sender that fragmentation is occurring, by marking the ACK packet that is generated for the received packet. There are several options for marking the packet to indicate to the sender that fragmentation is occurring. One option is to use an unused bit in the TCP header flags field. Another option is to use a TCP or IP option (see e.g., FIG. 20). A third option is to mark the IP header of the packet (i.e., IP Header Option, or some of the other underutilized fields like TOS). The receiving PEP may use a single bit indication, requiring the sender to iteratively adjust his sending size to determine the MTU. Alternately, the receiving PEP may use a multi-bit field to indicate a minimum size for the MTU. This is easily computed by the receiving PEP as the largest fragment received on this connection. The sender can use this information to accelerate the convergence of the iterative MTU adjustment algorithm. The receiver cannot know the true value of the PMTU, the size of the fragments received only place a lower bound on the MTU.

When the sender detects the marking on a packet, it knows that fragmentation is occurring. The proper response to a fragmentation indication depends on whether the sender actively is engaged in PMTU discovery. If the sender is not engaged in PMTU discovery, then this indicates a reduction in the PMTU, causing the sender to initiate active PMTU discovery to adapt to the new smaller size. If the sender actively is engaged in PMTU discovery, then the receipt of a fragmentation indication informs the sender that it has exceeded the PMTU, leading to the suspension of the PMTU discovery algorithm.

The active PMTU discovery algorithm operates by increasing the MTU of transmitted packets until a fragmentation indication is received, signaling that the PMTU has been exceeded. Because of the time lag between the sending of a larger packet and the reception of the ACK for it, as well as the use of cumulative ACKs, the PMTU discovery algorithm operates with imprecise information. In a preferred embodiment, the PMTU discovery algorithm increases the size of packets slowly, so as to reduce the uncertainty. The PMTU for a connection is increased by a few percent once for every RTT that elapses without a fragmentation indication. In a preferred embodiment, the sequence number of the first packet with an increased RTT is recorded. If that sequence number is ACKed without a fragmentation indication (either specifically or cumulatively), then the algorithm assumes that the PMTU for that packet is acceptable and increases it, again recording the sequence number. Upon receipt of a fragmentation indication, the algorithm undoes the last increase in the PMTU and suspends itself until the next time that PMTU discovery is initiated (either due to elapsed time or a fragmentation indication). By sending all packets within an RTT at the larger packet size, the uncertainty of cumulative ACKs is nearly eliminated.

If the PMTU algorithm is initiated due to the unexpected receipt of a fragmentation indication, then it immediately reduces the PMTU (in a preferred embodiment, by one-half of the current size, but no less than the minimum MTU for IP networks) before beginning to search for the new maximum PMTU.

This algorithm is more efficient than the standard algorithm since no packets are dropped. At worst, performance degrades due to the requirement that interior nodes perform IP fragmentation. This load is generally negligible, as the PMTU tends to remain unchanged for long periods of time, allowing the period between activations of PMTU discovery to be large, resulting in only a slight load.

The PMTU applies to a packet flow, not to individual connections. This allows further optimization as the algorithm can apply its results to all connections that are part of the same flow and need be activated only once for the entire flow.

Optionally, a PEP can probe for a larger MTU on a connection that is initiated to a PEP-enabled destination that does not have an established flow. The PEP begins data transfer with the MTU size set to the maximum allowed for the link that it is directly connected to. If the packet exceeds the MTU of a link along the path it is fragmented, the receiving PEP informs the sending PEP that fragmentation is occurring, allowing the sending PEP to reduce its sending size until fragmentation is eliminated.

Additional Recongestion Embodiment

Due to the preacking behavior of receive path 401 and send path 402, send path 431 must provide its own flow control and congestion-avoidance behavior. One option is to utilize the standard TCP congestion with the additive increase, multiplicative decrease behavior described by RFC 2581. However, any other congestion-avoidance algorithm can be used.

Connection Establishment

TCP Connection establishment packets (SYN packets and the associated ACKs) require special handling. Firstly, SYN packets cannot always be preacked. To preack a SYN packet, the enhanced PEP determines whether the TCP connection will be established. If the PEP were to preack the SYN packet and the connection could not actually be established, then the connection would be reset after it appeared to the application program to have opened successfully. This would likely cause failures in the application program, as many programs are prepared to handle a failure to open a connection, but are not prepared to handle a reset of a connection after it appeared to open successfully. Alternately, having the connection reset after an apparently successful open may induce recovery behavior in the application that is inappropriate or erroneous when the actual problem is a failure to connect. Of course, if the enhanced PEP knows that the connection is certain to open, then it could preack SYN packets just like regular data packets. In the case when the enhanced PEP is not ready to guarantee successful opening of the TCP connection, it suppresses preacking of those SYN packets. Since preacking is suppressed, the originating TCP endpoint remains responsible for retransmission in case the packet is dropped. Also, an ACK-only packet that is received by a receive path (401 or 492) that is acking a SYN must not be dropped, as it would be for normal preacked data transmissions. Instead, it is forwarded through the enhanced PEP to the corresponding send path to complete the opening of the connection.

Secondly, the enhanced PEP alters the connection initiation options contained in a SYN packet. By altering the connection options, the enhanced PEP is able to utilize optional TCP capabilities that may be supported by only one of the two endpoints, gaining the benefit of the option without requiring both endpoints to support the option. Also, the enhanced PEP may insert additional options in an attempt to probe for the existence of other PEPs elsewhere in the connection, allowing the application of dual-PEP algorithms and the identification of flows. In a preferred embodiment, an enhanced PEP adds to a SYN packet a token, uniquely identifying the PEP instance. This unique token could be an IP address, a MAC address, a Globally Unique Identifier (GUID), a random number, a machine name, an assigned number, or others. Upon receipt of a SYN packet with an identifying token a PEP can determine the flow for the connection. Referring to FIG. 3, SYN packets transferred between computer 100 and PEP 200 control the TCP conversation between them. Modified SYN packets exchanged between PEPs 200 and 300 control the conversation between them. Finally, modified SYN packets exchanged between PEP 300 and computer 140 control their conversation.

Referring to FIG. 4, receive path 401 receives a SYN packet, noting the connection options contained therein. These are retained for use by send path 402. Receive path 401 forwards the SYN packet to send path 431 for transmission. Send path 431 alters the connection options to include optional features that it supports (e.g., window scaling, selective acknowledgement, etc.). One or more additional TCP options can be included to offer dual-PEP algorithms, such as compression, CIFS server side caching, etc. The altered packet is sent by send path 431.

Later, an answering SYN packet is received by receive path 432. By examining the options contained therein, receive path 432 determines which TCP options and PEP algorithms will be enabled for itself and send path 431. This answering SYN packet will, of course, be forwarded for transmission by send path 402. However, send path 402 alters the SYN packet's options to respond to those decoded by receive path 401.

Thus, the reader can see that two separate TCP option negotiations are performed, resulting in two different sets of TCP options being enabled. This allows the system to obtain the benefits of these TCP options without requiring the modification of all of the endpoints. For example, assume that the TCP implementation of computer 100 does not support window scaling and that the TCP implementation of computer 140 does support window scaling. In the absence of a PEP (i.e., FIG. 1), the window-scaling option is not enabled, resulting in a limitation on TCP performance when the bandwidth delay product between the two computers exceeds the maximum standard TCP window size of 65,535 bytes. However, when the enhanced PEP is present (i.e., FIG. 2), only the communication between computer 100 and PEP 200 is subject to the unscaled TCP window-size limitation, as the communication between PEP 200 and computer 140 enables window scaling. Further, a different congestion-avoidance algorithm (more suited to long RTT links) can be employed for the PEP 200 to computer 140 link, even if neither computer 100's nor computer 140's TCP endpoint implementation supports it.

In the dual-PEP system of FIG. 3, there are three sets of TCP connection options that become enabled. The first set is between computer 100 and PEP 200. The second set is between enhanced PEP 200 and PEP 300. The third set is between enhanced PEP 300 and computer 140. When PEP 200 forwarded its connection initiating SYN packet received from computer 100, it altered the TCP options to include a TCP option that allowed PEP 300, upon receipt thereof, to determine that dual-PEP algorithms could be enabled between PEP 200 and PEP 300. PEP 300, upon forwarding the answering SYN received from computer 140 to PEP 200, alters the TCP options to indicate the support of dual-PEP algorithms. Thus dual-PEP algorithms are enabled in the PEP 200 to PEP 300 segment of communication without requiring any modification of the endpoint TCP implementations.

In a preferred embodiment, if a connection has three PEPs deployed along it, then by utilizing the SYN-based connection information described above, the PEP in the middle discovers that there are PEPs on both sides of the connection. A PEP-in-the-middle can suppress its own application of certain dual-PEP algorithms (for example, data compression and others), leaving the PEPs on either end of the connection to shoulder the burden of these algorithms, while the middle PEP merely passes the data through itself. The PEP in the middle need not be bypassed entirely; repacketization and recongestion algorithms may still be applied profitably, depending on the specific network topology.

Optionally, an enhanced PEP may choose not to rely solely on the endpoints to address the retransmission of connection establishment packets. In an alternate embodiment, an enhanced PEP retains connection establishment packets and periodically retransmits them until a response is received or is no longer expected, at which point the retained packets can be discarded.

Some TCP options may only be specified on a connection establishment packet. Once one of these options is advertised for a connection, it may not be revoked or modified for the duration of that connection. If an enhanced PEP modifies one of these options on a connection establishment option and subsequently discovers that there is no PEP on the other side of the connection, it cannot revoke the modification of the options for the duration of that connection. One example of this type of TCP option is the RFC 1323 window scaling option. If an enhanced PEP modifies the value for a window scaling option (or inserts one where one did not exist before) on a connection establishment packet, then all packets that subsequently flow through that connection require their window advertisements to be scaled as specified by the window scaling actually in effect.

Filter Operations and Algorithms

In a preferred embodiment, filter 420 allows upper-level protocol enhancements. Any protocol based on TCP can have a filter that provides protocol-specific optimizations. Filters are not limited to a single TCP connection; some upper-level protocols actually consist of multiple TCP connections as well as UDP-based protocols, all of which can be handled by filter 420.

A filter operates by reconstructing the transactions of a protocol and optimizing them at the transaction level. Typical optimizations include: caching, pre-reading, post-writing, prediction, and others. Generally, optimizations are focused either on reducing the total amount of bandwidth used by eliminating redundant operations or on reducing latency in large RTT environments.

In the case of remote file access protocols, such as NFS and CIFS, there are several optimizations that can be performed to reduce the latency of accesses. It is well known that most file accesses are sequential, thus when the filter detects that a file is being read in a sequential manner, it issues operations to speculatively read multiple blocks from the server, ahead of their having been requested.

The filter must provide a consistent view of the file data being read. As with any data-retaining proxy, several well-known rules must be followed to ensure consistency. For example, write traffic to a file must either invalidate or update any pre-read data for the same file. Beyond the standard rules, the filter provides additional speculative read-ahead rules, as follows. In the CIFS case, the filter tracks the usage of opportunistic locks, allowing it to detect when the file might be volatile (i.e., capable of being altered by another agent), and suppressing the read-ahead optimization in this rare case. In the NFS case, the filter is careful to ensure that any read ahead is limited to retaining its data for a short amount of time (unlike a cache, which might retain the data for a substantial period), typically no more than one or two RTTs. This short duration of data retention is sufficient to ensure the consistent behavior of a well-formed application, since every read operation already views the file data at least one-half RTT out of date. The number of blocks read ahead is controlled by a combination of the available memory and bandwidth resources, as well as the RTT. Usage of the RTT in the computation of the read ahead amount optimizes use of PEP memory, while simultaneously allowing maximum bandwidth. File system meta-data can be read ahead just like blocks of an individual file, accelerating many operations, such as file enumeration, file name searching, etc.

For write-behind optimizations, many of the same issues apply. Read operations issued after a write behind must be consistent when viewed through the write activity. However, write behinds represent volatile data that must be retained even in the face of a system failure. Nevertheless, there are many optimizations that can be performed for write operations. Firstly, most file servers allocate storage space only when needed for a write operation. The storage allocation operation can take substantial time and tends to be erratic in its performance. The PEP, upon detecting a sequential write situation, forces the file server to pre-allocate storage ahead of the actual write operation. This improves performance by reducing the time needed for the server to complete the write operation itself. Also, by forcing a preallocation of the storage, the PEP is able to provide an accurate out-of-storage error response to a posted write operation. Secondly, for most file types, the PEP can provide a small amount of posted-write capability, without impacting correctness in the face of a system failure. Open files can have their meta-data prefetched. By observing the pattern of access to meta-data for a file, the PEP can prefetch meta-data speculatively when a file is opened.

Beyond file-level optimizations, an enhanced PEP can also provide directory-level optimizations. One directory-level optimization is known as open ahead. When a PEP detects a pattern in the opening of files in a directory, (e.g., directory enumeration, directory copy, copy all files of type 'x', etc.), it can open the next file in the sequence speculatively. The open ahead must be done with attributes that are gleaned from the original sequence, so that it is a compatible open. Some-file sharing protocols provide some form of wild-card directory searching operation. The PEP retains the results of these operations and uses them to control the open-ahead optimization. Another directory-level optimization is meta-data prefetching. With meta-data prefetching, the enhanced PEP prereads file meta-data speculatively in anticipation of need. Again, by retaining the data for only a short time, no additional consistency problems are created.

There are additional optimizations specific to the CIFS protocol, such as file locking. Current implementations of the CIFS protocol often do not recognize that multiple accesses to the same file from the same source system do not necessarily constitute a need to demote an opportunistic lock from exclusive to shared. By tracking the usage of a file, a filter can retain an opportunistic lock, even when the requesting client has multiple opens of the file.

Another class of optimization is file open and close. Often, an application will open a file, close it, and reopen it almost immediately. The filter can optimize this behavior by suppressing the close of a file for a short time, in hopes that a subsequent open can eliminate a round trip to the file server. Even though the close is suppressed, the filter has the option to update the meta-data immediately, so that the information is not lost in case of a failure. If a short period elapses and the file is not reopened, then it is closed completely.

No matter how carefully conditioned, there is always the possibility that a speculatively issued operation ultimately is unneeded, wasting the associated bandwidth. The PEP limits this waste by constraining the issuance of speculative operations, based on the availability of unused bandwidth. Speculative operations are issued only when sufficient network bandwidth is available. To determine if network bandwidth is available, the filter examines both outgoing bandwidth (i.e., the request) and incoming bandwidth (i.e., the response). The availability of bandwidth may be controlled not only by unused bandwidth on the packet interfaces, but also by internal estimates of the available bandwidth between two communicants, as well as any policy restrictions that may be present. When deployed in an interior node such as a VPN gateway, the enhanced PEP may include the bandwidth of all of the connections transiting it in its calculations.

Figure 15:
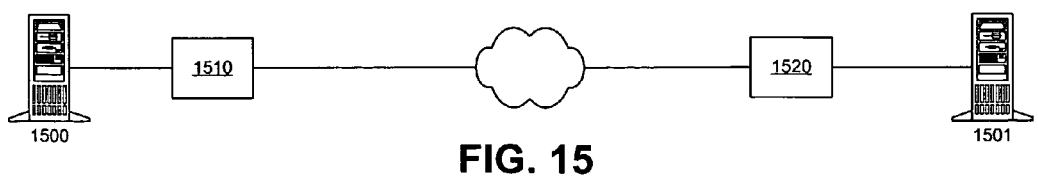
FIG. 15 depicts the architecture of the dual PEP HTTP system.

In a preferred embodiment, when a dual-PEP situation is detected, additional optimizations are applied to connections using the HTTP protocol. Referring to FIG. 15, client 1500 establishes a connection to server 1501 via upstream PEP 1510 and downstream PEP 1520. Upstream PEP 1510 and downstream PEP 1520 cooperate to maintain a cache of HTTP entities. An HTTP request is constructed by client 1500 and sent to server 1501. Upstream PEP 1510 examines the request and its cache to determine if the response can be locally generated (i.e., is the requested entity in the cache?). If the response can be locally generated (i.e., the entity is present in the cache) then upstream PEP 1510 generates the response and directly sends it to client 1500 (on behalf of server 1501).

If the response cannot be locally generated (i.e., the entity is not present in the cache) then the request is forwarded to server 1501 via downstream PEP 1520. Server 1501 constructs a response and sends it to client 1500 via downstream PEP 1520. Downstream PEP 1520 parses the reply from server 1501, locating all references to external entities. (An external entity is an HTML entity that is not present within the response but is referenced through some name, such as a Uniform Resource Locator (URL) or a Uniform Resource Identifier (URI), which is contained in the reply). Downstream PEP 1520 determines which of the external entities are likely to be requested by client 1500. For each of the likely to be requested entities, downstream PEP 1520 fetches them from server 1501 (a request is constructed and sent to server 1501, downstream PEP 1520 awaits the response—this is known as a prefetch). Downstream PEP 1520 then forwards the likely to be requested entities to upstream PEP 1510. Upstream PEP 1510 receives the likely to be requested entities and places them in its cache in anticipation of subsequent requests by client 1500.

The method described above requires that the downstream PEP have knowledge about the contents of the cache of the upstream PEP. This is relatively easy, as each of the entries in the cache of the upstream PEP had gone through the downstream PEP at some earlier time. Many distributed cache coherence schemes are known. In a preferred embodiment, the downstream PEP retains cache-indexing information (also referred to as a cache) for the entries sent to the upstream PEP. The upstream PEP uses a cache replacement algorithm that is predictable by the downstream PEP so that the downstream PEP is able to maintain its cache-indexing information synchronized to the upstream PEP as the contents change over time without additional communication. There are two ways that the caches of the upstream PEP and downstream PEP will lose synchronization.

The first reason is a loss of cache information by the upstream PEP (e.g., due to a failure and restart of the upstream PEP). In this situation, the downstream PEP will believe that the cache of the upstream PEP contains HTML entities that it does not. This situation is detected when the downstream PEP notices that the upstream PEP has forwarded a request for an entity that the downstream PEP believes is already present in the cache of the upstream PEP, allowing the downstream PEP to resynchronize its cache-index information for this entity.

The second reason is a loss of cache information by the downstream PEP (e.g., due to a failure and restart of the downstream PEP). This situation results in the downstream PEP fetching and sending HTML entities that are already present on the upstream PEP, wasting some network bandwidth. The upstream PEP notices this situation (i.e., the receipt of an entity that is already present in its cache) and resynchronizes its cache information for this entity.

HTTP requests may contain cookies. The presence of a cookie on any particular request is controlled by the cookie's rules. The fetching of some HTML entities is affected by the presence of cookies in the request. As described above, the downstream PEP may create HTTP requests. These requests must contain the associated cookie before they can be processed correctly in all cases. Usually, the downstream PEP has no problem generating the correct cookie as it has monitored previous requests and responses from the server, allowing it to retain cookies previously supplied by the server. If the downstream PEP's current list of cookies is incomplete, then the response for a generated request may also be incorrect (since the cookie would not have been supplied with the request). To handle this case, when the downstream PEP sends an entity to the upstream PEP's cache, it tags the response with the cookies that were used to prefetch it. Subsequently, when the upstream PEP receives the request from the client and determines that the requested entity is present in its cache (due to a prefetch), it also compares the cookies present in the client's request with the cookies that were used by the downstream PEP to fetch the entity in determining if the cached entry is able to satisfy the client's request. If the cookies are incompatible then the cached entry is not used and the upstream PEP forwards the client's request to the downstream PEP for normal processing. When the downstream PEP receives this request, it notices that the cookie associated with it is incompatible with the cookie used to perform the prefetch and updates its cookie information accordingly.

A mechanism must be provided that allows the upstream PEP to determine if the downstream PEP has decided to prefetch an HTML entity. This mechanism allows the upstream PEP to determine, upon receipt of a client request for that entity (for which prefetched data has not yet been received), whether to forward the request to the downstream PEP (in the case when the downstream PEP has not decided to prefetch) or to wait for the arrival of prefetched data (in the case when the downstream PEP has decided to prefetch). In a preferred embodiment, the downstream PEP inserts this information into the data of the initial response. As the upstream PEP parses the initial response, it removes this information, using it determine which HTML entities the downstream PEP has prefetched. Depending on the specific cache replace algorithm used, this information may be used to maintain cache coherence between the upstream and downstream PEPs.

The system must also deal with the transmission of the prefetched data from the downstream to the upstream PEP. This transmission mechanism must be tolerant of the unreliable nature of IP networks. In a preferred embodiment, the prefetched data is inserted into the same TCP connection as the initial response, immediately after the initial response. The upstream PEP uses the information about each prefetched HTML entity that was inserted into the initial response by the downstream PEP to parse this data out of the data stream. This technique provides (e.g., guarantees) consistency of the data as viewed by the upstream PEP.

Packet Interfaces and Deployment Scenarios

As described above, one enhanced PEP embodiment is a stand-alone network node. In this case, packet interface 440 and 450 would be actual hardware elements (NICs) that interface directly to a network. In one embodiment, there are two, physically separate NIC cards, one each for packet interfaces 440 and 450. This allows deployment "in line," which is shown in FIGS. 2 and 3 this is also known as bump-in-the-wire (BITW) mode. One advantage of this configuration is that the PEP need not have an IP network address and the network elements outside of the PEP need not even be aware of its existence. Though, as stated before, it may be desirable to provide a network address to the PEP for the purposes of monitoring and controlling it through the network itself. The PEP simply processes all packets received at one packet interface and sends them out the other interface. Packets with unrecognized or unhandled protocols simply are forwarded to the opposite side without further processing. Another advantage is that the PEP itself need not perform any type of routing function, reducing the latency of packets transiting the PEP.

Figure 6:
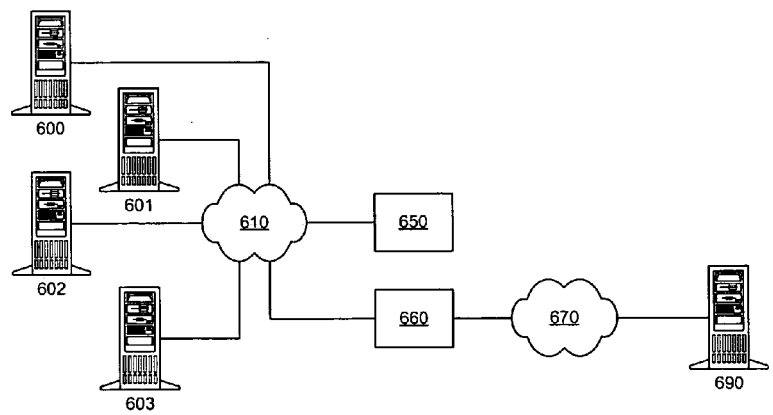
FIG. 6 shows the architecture of a system using a PEP with only one physical connection to the network.

In an alternate embodiment, packet interface 440 and 450 could be a single hardware instance that connects to a network at a single point. This is a difficult topology, as the network must be able to route packets into and out of the single network interface without changing the IP addresses of the packets. In an IP networking environment, this can be done by use of the gateway capability of IP routing. FIG. 6 depicts this configuration. Computers 600-603 (computer 600 henceforth) communicate using switch 610. Packets sent from computer 600 to computer 690 are processed as follows: Computer 600 uses its routing tables to locate the gateway for packets destined for computer 690; this gateway has been configured as PEP 650 (in this case PEP 650 must have an IP address on the local sub-net). PEP 650 receives the packet from computer 600, processing it through the PEP algorithms as described above. The IP gateway for PEP 650 is set to gateway 660 and the processed packet is forwarded to it. Gateway 660 forwards the packet through network 670 to computer 690. Packets originating at computer 690 and destined for computer 600 are handled as follows: The packets arrive at gateway 660, whose routing tables direct them to PEP 650. PEP 650 processes the packets and forwards them to computer 600. This configuration does not require that the PEP be on the same sub-net as the endpoint. The same configuration applies equally if computer 600 is a gateway to another network. Modification of the routing tables can be performed manually or the PEP could participate in a routing infrastructure by supporting the standard routing protocols such as RIP, OSPF, BGP, and others.

Figure 5A:
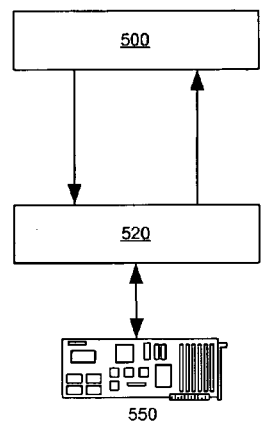
FIG. 5a shows the architecture of a TCP endpoint.

As described above, a PEP can be deployed within an endpoint node. FIG. 5a shows a common structure for the implementation of a TCP endpoint. TCP/IP stack 500 communicates with NIC driver 520, which in turn operates NIC 550. The application program (not shown) sends data to TCP/IP stack 500. The stack 500 creates the appropriate packets and sends them to NIC driver 520. NIC driver 520 operates the hardware of NIC 550, causing the packet to be sent to the network. Packets received from the network by NIC 550 are retrieved by NIC driver 520 and sent to stack 500, for processing by the endpoint. Stack 500 delivers data to the application as it becomes available.

Figure 5B:
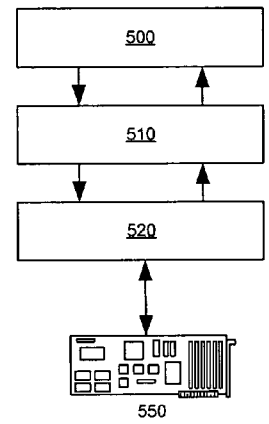
FIG. 5b shows the architecture of a TCP endpoint augmented with a PEP.

FIG. 5b shows the deployment of a PEP within this endpoint. PEP 510 is inserted between NIC driver 520 and stack 500. This style of insertion is typically known as a "shim." The connection between PEP 510 and stack 500 serves as one of the packet interfaces 440 or 450, and the connection between PEP 510 and NIC driver 520 serves as the other interface. One benefit of this mechanism is that the PEP is able to leverage certain facilities already implemented in stack 500. For example, the address resolution protocol (ARP), used to translate IP addresses into MAC addresses, need not be implemented in PEP 510, as the existing implementation in stack 500 will provide the MAC address with every packet. The PEP need only extract and utilize these addresses instead of implementing the complete ARP.

Figure 7A:
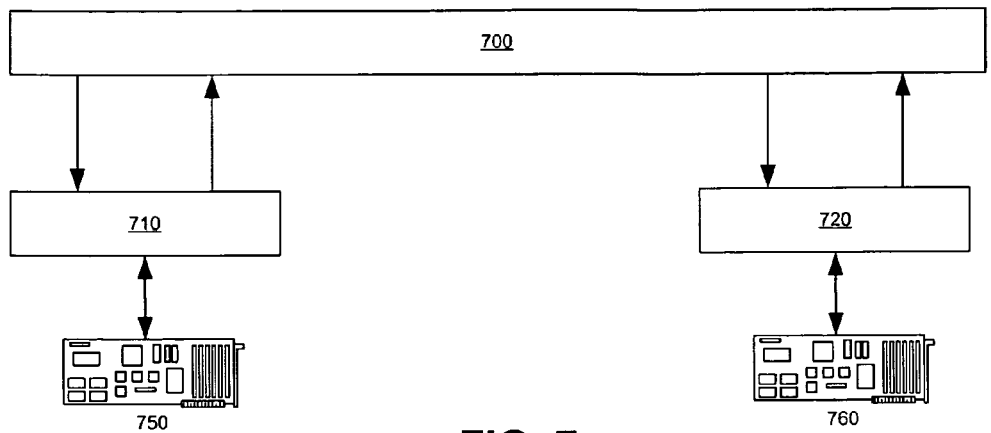
FIG. 7a shows the architecture of a gateway.

FIG. 7a shows diagram of a gateway. NIC drivers 710 and 720 operate NICs 750 and 760. Packets received by NIC 750, as operated by NIC driver 710, are sent to gateway 700, which in turn forwards them to NIC driver 720 for transmission by NIC 760, modifying them as needed. Likewise, packets received by NIC 760, as operated by NIC 720, are sent to gateway 700, which in turn forwards them to NIC driver 710 for transmission by NIC 750, modifying them as needed.

Figure 7B:
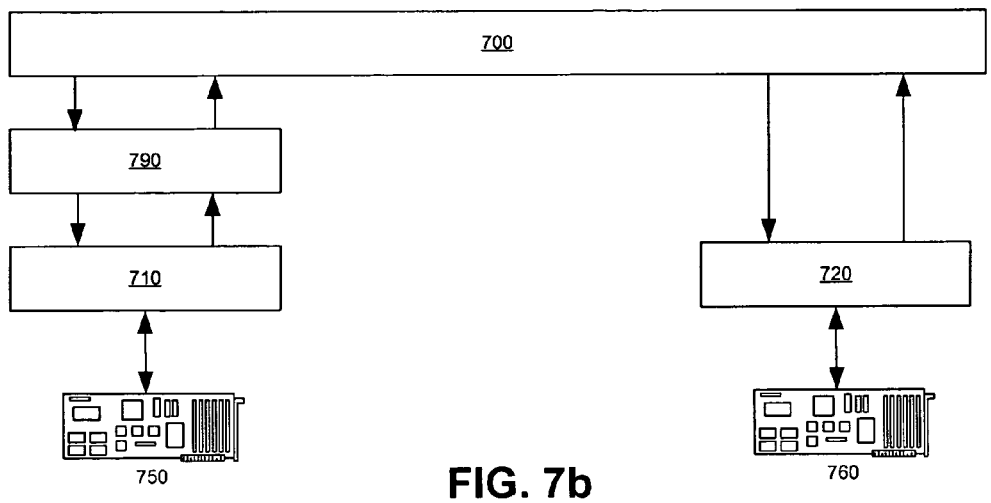
FIG. 7b shows the architecture of a gateway augmented with a PEP.

FIG. 7b shows the addition of PEP 790 to one side of the gateway. If this is the LAN side of a VPN gateway, then it has access to packets prior to any cryptographic protection added by gateway 700, allowing a large number of PEP algorithms to be employed.

Figure 12:
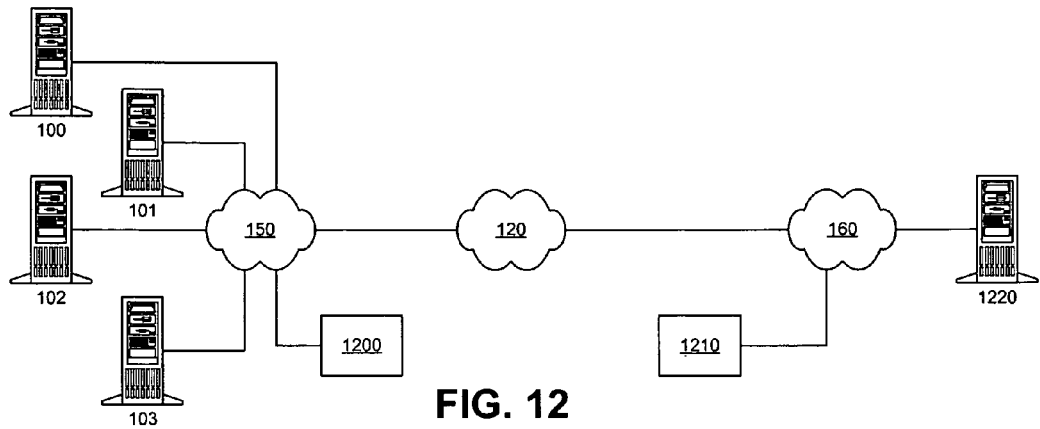
FIG. 12 depicts the architecture of a system with two PEPs using the proxy deployment mode.

An alternate deployment mode, called proxy mode, is depicted in FIG. 12. In this mode, upstream PEP 1200 hosts an IP address (called a VIP) that is a virtual analog of server computer 1220. Computer 100 (or any of 100-103) connect to server computer 1220 using either the VIP or the standard address for server computer 1220. When connection is to the VIP, the packets are automatically routed to upstream PEP 1200 by standard IP networking techniques. Upon receipt of packets to the VIP address, upstream PEP 1200 relabels these packets as sourced from upstream PEP 1200 (or optionally, sourced from the VIP) and destined for downstream PEP 1210. When downstream PEP 1210 receives these packets, they are relabeled to be sourced from downstream PEP 1210 and destined for server computer 1220. Server computer 1220 understands that this connection originates from downstream PEP 1210. Consequently, when packets for this connection are sent from server computer 1220 they are destined for downstream PEP 1210. Upon receipt of these packets, downstream PEP 1210 relabels these packets to be sourced from downstream PEP 1210 and destined for upstream PEP 1200. Upstream PEP 1200 receives these packets and relabels them to be sourced from VIP and destined for computer 100.

As with standard TCP, port number pairs are used to distinguish between individual conversations between two IP addresses. Port numbers for the connection are selected as follows. When upstream PEP 1200 receives a connection establishment packet from computer 100, it allocates a new port number for use in communication with downstream PEP 1210. As described above, the connection establishment packet is labeled as destined for downstream PEP 1210 and sourced from upstream PEP 1200 using the newly allocated port number (the downstream PEP uses a fixed, well known, port number). Further, upstream PEP 1200 inserts into the connection establishment packet information to inform downstream PEP 1210 of the ultimate destination for this connection, i.e., server computer 1220. This information consists of a TCP option that allows downstream PEP 1210 to determine the IP address and destination port for server computer 1220. In a preferred embodiment, the TCP option contains the IP address and port number for server computer 1220. In an alternate embodiment, the IP address is replaced with an index into a table of known server computers. Optionally, upstream PEP 1200 may also insert the IP address and port number of the connection from computer 100 for informational purposes, otherwise downstream PEP 1210 has no knowledge of the initiator of the connection. When downstream PEP 1210 receives the connection establishment packet, it uses the connection information placed into the TCP option by upstream PEP 1200 to determine the final destination of the connection (IP address and port number for server computer 1220). Downstream PEP 1210 then allocates a new port number for this connection and relabels the connection establishment packet and forwards it to server computer 1220. (Note that these modifications to the connection establishment packet are optionally in addition to any other modifications of the packet for the purposes of supporting other PEP algorithms).

In this mode, no changes to the network routing and switching infrastructure are required. Only connections to the new VIP address are modified. This allows a fine-grained control over which connections are modified and which are not, simply by altering the naming infrastructure used by the application that is establishing the connection.

Figure 13:
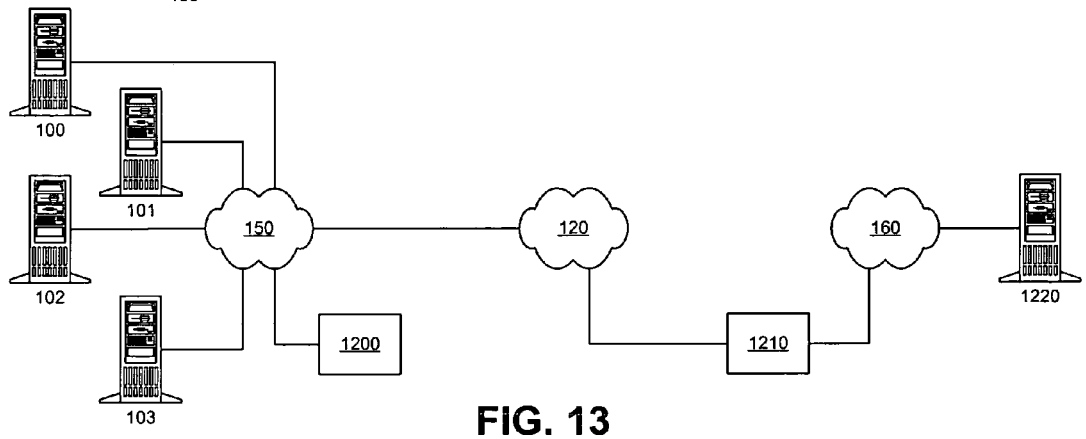
FIG. 13 depicts the architecture of a system with two PEPs using the proxy deployment mode in which the downstream PEP is dual-homed.

The upstream and downstream PEPs may have multiple network connections with multiple IP addresses. FIG. 13 shows one possible network topology with multiple connections for the downstream proxy. In this topology, downstream PEP 1210 has two network connections. One of the network connections is devoted to intercommunicating with upstream PEP 1200 and one of the connections is devoted to intercommunicating with server computer 1220. In this configuration, the IP address of server computer 1220 may or may not be directly visible to computer 100 (the figure does not show a direct connection as its present or absence has no effect on the operation of this mode).

One deficiency with this mode is that each PEP requires knowledge of the IP and VIP addresses that are related prior to establishing the connection. In a preferred embodiment, these relationships are entered manually into each PEP. In an alternate embodiment, the relationships are stored in a central facility that is consulted by each PEP.

Another deficiency of this deployment mode is that computer 100 and server computer 1220 address do not use the same IP addresses to intercommunicate. This creates problems with protocols that send IP addresses (and port numbers) as payloads within other IP packets. For these protocols, the upstream and downstream PEP monitor the payloads of packets using these protocols and edit their contents to properly reflect the correct IP address/port combinations. This is similar to the same process that a network address translation device (NAT) must perform when amalgamating multiple local IP addresses into a single external IP address.

Some protocols require that server computer 1220 initiate a connection to computer 100. In this situation, the entire mechanism as described above operates in reverse; upstream PEP 1200 plays the role of the downstream PEP 1210 and vice-versa. As described above, enabling this capability requires that upstream PEP 1200 and downstream PEP 1210 have the necessary IP address and port number associations. As described above, these relationships could be established manually or by consulting a central facility. For some protocols, the reverse proxy information can be determined automatically by monitoring the payloads for normal connections. For example, in the FTP protocol, a PORT command is issued by the client to the server to direct the server to contact the client for a specific transfer. The PORT command contains the IP address and port number for the server to contact the client at. In a preferred embodiment, upstream PEP 1200 and downstream PEP 1210 monitor the payloads of FTP connections and altering any PORT commands and internal tables to allow the subsequent connection to be successfully initiated by server computer 1220 to computer 100.

Figure 14:
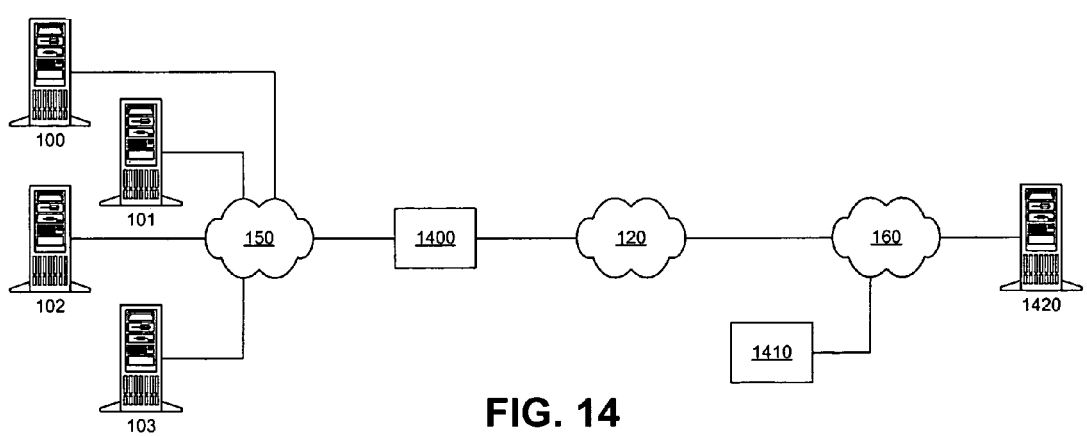
FIG. 14 depicts the architecture of the hybrid half-proxy deployment mode.

Hybrid deployment modes are also supported. FIG. 14 depicts the architecture of the half-proxy mode. In this mode, the upstream PEP 1400 operates in "bump-in-the-wire" mode as described above. The downstream PEP 1410 operates as a combination of the upstream PEP 1200 and downstream PEP 1210 of proxy mode. In half-proxy mode, the downstream PEP 1410 hosts the VIP that is a virtual analog for server computer 1420. It relabels packets that are destined for the VIP as being sourced from the VIP and destined for server computer 1420. Port numbers are allocated as needed.

Cryptographic NICs

A new class of NIC has been developed recently, the crypto-NIC. The crypto-NIC provides acceleration for the encryption and authentication of data packets for standard protocols, such as IPSec. Deployment of these cards has caused architectural changes in the operating system interface between protocol stacks, such as TCP/IP and NIC drivers. Modern operating system driver interfaces allow the protocol stack to interrogate the NIC driver to detect the presence of support for one or more of the cryptographic protocols. A crypto-NIC responds with a list the cryptographic algorithms that are supported, causing the protocol stack to direct the NIC to apply its cryptographic algorithms to packets as they are processed. Most crypto-NICs only provide bulk packet processing and do not provide any of the key distribution processing, leaving the protocol stack to perform this operation. The protocol stack provides the crypto-NIC with the cryptographic keys that have been allotted or negotiated by the key processing, allowing the crypto-NIC to apply properly the cryptographic algorithms for both sending and receiving packets. In this case, the communications between the protocol stack and the crypto-NIC are clear-text packets.

This situation creates an opportunity for the shim implementation of an enhanced PEP, whether a crypto-NIC is present or not. In the shim implementation of a PEP, the upper-level packet interface exports to the protocol stack the same software interface as a NIC. In a preferred embodiment, the shim responds to the protocol stack as though it were a crypto-NIC, returning a list of all implemented cryptographic capabilities when asked to do so. Hence, the protocol stack will assume that the PEP is a crypto-NIC and will provide it with cryptographic keys, expecting it to perform cryptographic operations on the packets. Thus, the PEP is able to operate on clear-text packets even in the presence of strong cryptographic protections. If there is no crypto-NIC present in the system or if the existing crypto-NIC does not support a particular cryptographic algorithm, then the PEP must provide the algorithms that it has indicated support for. However, if a crypto-NIC that supports the selected algorithms is present in the system, then the PEP uses it through the NIC driver, just as if it was the protocol stack itself.

When deployed in a shim configuration within an endpoint whose operating system supports crypto-NICs, the PEP is able to operate on clear-text packets, providing all PEP algorithms. Further, in this situation, no modification to the security policies is required. Communications leaving the endpoint remain at the same level of security as without the PEP.

When the present invention is used on the WAN side of a VPN as a shim, it utilizes the crypto-NIC operating system interface to gain access to the packets, independent of the presence of a crypto-NIC. In particular, it has access to the clear text of each packet and can perform all PEP operations normally prohibited when presented with the cipher-text version, which would be required if connected outside of the endpoint.

PEP NAT

PEP algorithms are not limited to optimizing connections. A PEP can also provide network address translation (NAT) as documented in RFC 1631. In a preferred embodiment, a PEP can create a "shadow" IP address, importing the presence of a system with an IP address on one side of the PEP onto the other side of the PEP. For example, referring to FIG. 2, assume that computers 100-103 are all on a common sub-net and that the PEP 200 has been configured to import computer 141 onto that sub-net. A shadow IP address from the sub-net of computers 100-103 is assigned to the import and configured into PEP 200. PEP 200 responds to address resolution protocol (ARP) requests and identifies its packet interface as the home for the shadow IP address, causing packets for that IP address to be sent to PEP 200 (no modification of the gateway address or routing tables is required in this case). Upon receiving packets destined for the shadow IP address, PEP 200 edits the packets using the techniques in RFC 1631, directing them to computer 141. Edited packets are processed through the PEP like other packets and are forwarded to gateway 110. Returning packets are processed similarly.

Flows

In a preferred embodiment, the PEP assigns TCP connections to flows. If the SYN packet exchange identifies a PEP on the other side of the connection, then the TCP connection is assigned to a flow for that PEP. In the case where there are multiple PEPs along a route, the last PEP is used as the end of the flow.

The PMTU of a flow is used by the repacketization algorithm for all connections assigned to that flow. Further, PMTU discovery need be performed only on one of the connections within a flow. When a new connection is established that has been assigned to a preexisting flow, the recongestion algorithm can use the flow information to provide substantially faster initial throughput than the standard TCP slow start algorithm. The flow can retain bandwidth and RTT information, allowing recongestion and bandwidth allocation algorithms to operate across the connections within the flow. Furthermore, when x-duplex detection is performed for a connection, the same assumptions can be applied to all of the connections applied to the same flow. Also, by collecting x-duplex information across all of the flows, the probabilistic x-duplex algorithms will reduce false error rates.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. A method for determining between a sender and receiver a data packet from the sender to retransmit to the receiver, the method comprising:

transmitting, by a sender, a plurality of data packets to a receiver, the sender identifying each of the plurality of data packets by a sequence number and a transmit number different from the sequence number, the transmit number identifying an instance of transmission of the data packet;

maintaining, by a receiver, a sorted list comprising an index of consecutive sets of continuous ranges of transmit numbers identifying data packets received by the receiver;

generating, by the receiver, a selection acknowledgment (SACK) packet, responsive to a landing data packet and identifying a plurality of sets of continuous ranges of transmit numbers of data packets that had been received prior to receipt of the landing data packet, at least two but less than the plurality of the sets of continuous ranges identified in the SACK packet being consecutive in the sorted list to identify transmit numbers of one or more data packets between the consecutive ranges have not been received, and a continuous range that includes the landing data packet is not consecutive with the at least two of the plurality of sets of continuous ranges identified in the SACK packet;

identifying, by the sender, from the SACK packet received from the receiver, the transmit numbers of data packets not received by the receiver; and transmitting, by the sender, the identified data packets.

2. The method of claim 1, wherein the consecutive sets of continuous ranges identified in a first SACK packet overlap the consecutive ranges identified in a next SACK packet.

3. The method of claim 1, wherein each SACK packet further identifies a range of received data packets that includes the landing data packet associated with the SACK packet.

4. The method of claim 1, further comprising:

maintaining a reference into the list of ranges of received data packets, wherein the consecutive sets of continuous ranges in the list identified in a generated SACK packet are chosen according to the reference; and responsive to the generation of a SACK packet advancing the reference to a subsequent continuous range in the list.

5. The method of claim 4, wherein advancing the reference comprises wrapping to a beginning of the list upon reaching an end of the list.

6. The method of claim 4, wherein advancing the reference to a subsequent continuous range in the list further comprises advancing the reference at least two ranges.

7. The method of claim 1, wherein the method complies with TCP/IP.

8. The method of claim 1, wherein the method is performed in a proxy device coupled to a receiver.

9. A method for retransmitting packets based on acknowledgements received from a receiver over a network, the method comprising:
   receiving, by a sender, a selection acknowledgement (SACK) packet from a receiver, the SACK packet identifying a plurality of sets of continuous ranges of transmit numbers of data packets that had been received by a receiver prior to receipt of a landing data packet, at least two but less than the plurality of the sets of continuous ranges identified in the SACK packet being consecutive in a sorted list maintained by the receiver to identify transmit numbers of one or more data packets between the consecutive ranges have not been received, each of the transmit numbers identifying an instance of transmission of a data packet and different from a sequence number of the data packet, and a continuous range that includes the landing data packet is not consecutive with the at least two of the plurality of sets of continuous ranges identified in the SACK packet;
   identifying from the SACK packet transmit numbers of the one or more data packets between the consecutive ranges not received by the receiver; and
   retransmitting the identified data packets.

10. The method of claim 9, wherein each SACK packet further identifies a range of received data packets that includes the landing data packet.

11. The method of claim 9, wherein the retransmitting comprises transmitting the one or more data packets between the consecutive ranges of transmit numbers of the SACK packet unless the one or more data packets were transmitted after the landing data packet.

12. The method of claim 9, further comprising:
   adding unacknowledged data packets to a presumed lost list upon receiving an acknowledgement for a later-transmitted data packet;
   wherein the retransmitting comprises retransmitting any data packets that are (1) in the presumed lost list, and (2) between the consecutive sets of continuous ranges of the SACK packet.

13. The method of claim 12, wherein the retransmitting a data packet further comprises waiting for a predetermined number of acknowledgements, and retransmitting the data packet only if the data packet has not been acknowledged.

14. The method of claim 9, wherein the method complies with TCP/IP.

15. The method of claim 9, wherein the method is performed in a proxy device coupled to a sender.

16. A method for identifying by a receiver a transmission of a data packet from a sender and not received by the receiver, the method comprising:
   receiving, by a receiver, a plurality of data packets, each of the plurality of data packets identified by a transmit number, the transmit number identifying an instance of transmission, by a sender, of a data packet and different from a sequence number of the data packet;
   maintaining a sorted list comprising an index of consecutive sets of continuous ranges of transmit numbers identifying data packets received by the receiver;
   generating a selection acknowledgment (SACK) packet, responsive to a landing data packet, the SACK packet identifying a plurality of sets of continuous ranges of transmit numbers of data packets that had been received prior to receipt of the landing data packet, at least two but less than the plurality of the sets of continuous ranges identified in the SACK packet being consecutive in the sorted list to identify transmit numbers of one or more data packets between the consecutive ranges have not been received, and a continuous range that includes the landing data packet is not consecutive with the at least two of the plurality of sets of continuous ranges identified in the SACK packet; and
   transmitting the SACK packet to the sender.

17. A computer readable medium for communicating data packets from a sender to a receiver over a network the computer readable medium comprising computer program code for performing the operations:
   transmitting, by a sender, a plurality of data packets to a receiver, the sender identifying each of the plurality of data packets by a transmit number, the transmit number identifying an instance of transmission of a data packet and different from a sequence number of the data packet;
   maintaining, by a receiver, a sorted list comprising an index of consecutive sets of continuous ranges of transmit numbers identifying data packets received by the receiver;
   generating, by the receiver, a selection acknowledgment (SACK) packet, responsive to a landing data packet and identifying a plurality of sets of continuous ranges of transmit numbers of data packets that had been received prior to receipt of the landing data packet, at least two but less than the plurality of the ranges being consecutive in the sorted list to identify transmit numbers of one or more data packets between the consecutive ranges have not been received, and a continuous range that includes the landing data packet is not consecutive with the at least two of the plurality of sets of continuous ranges identified in the SACK packet;
   identifying, by the sender, from the SACK packet received from the receiver, the transmit numbers of data packets not received by the receiver; and
   transmitting, by the sender, the identified data packets.

18. The computer readable medium of claim 17, wherein the consecutive sets of continuous ranges identified in a first SACK packet overlap the consecutive ranges identified in a next SACK packet.

19. The computer readable medium of claim 17, wherein each SACK packet further identifies a range of received data packets that includes the landing data packet associated with the SACK packet.

20. The computer readable medium of claim 17, further comprising:
   maintaining a reference into the list of ranges of received data packets, wherein the consecutive sets of continuous ranges identified in a generated SACK packet are chosen according to the reference; and
   responsive to the generation of a SACK packet, advancing the reference to a subsequent continuous range in the list.

21. The computer readable medium of claim 20, wherein advancing the reference comprises wrapping to a beginning of the list upon reaching an end of the list.

22. A computer readable medium for retransmitting packets based on acknowledgements received from a receiver over a network, the computer readable medium comprising a computer program code for performing the operations:
   receiving, by a sender, a selection acknowledgement (SACK) packet from a receiver, the SACK packet identifying a plurality of sets of continuous ranges of transmit numbers of data packets that had been received by a receiver prior to receipt of a landing data, at least two but less than the plurality of the sets of continuous ranges identified in the SACK packet being consecutive in a sorted list maintained by the receiver to identify transmit numbers of one or more data packets between the consecutive ranges have not been received, each of the transmit numbers identifying an instance of transmission of a data packet and different from a sequence number of the data packet, and a continuous range that includes the landing data packet is not consecutive with the at least two of the plurality of sets of continuous ranges identified in the SACK packet;

identifying from the SACK packet the transmit numbers of the one or more data packets between the consecutive ranges not received by the receiver; and retransmitting the identified data packets.

23. The computer of claim 22, wherein each SACK packet further identifies a range of received data packets that includes the landing data packet.

24. The computer readable medium of claim 22, wherein the retransmitting comprises transmitting the one or more data packets between the consecutive ranges of transmit numbers of the SACK packet unless the one or more data packets were transmitted after the landing data packet.

25. The computer readable medium of claim 22, further comprising:

adding unacknowledged data packets to a presumed lost list upon receiving an acknowledgement for a later-transmitted data packet;

wherein the retransmitting comprises retransmitting any data packets that are (1) in the presumed lost fist, and (2) between the consecutive sets of continuous ranges of the SACK packet.

26. The computer readable medium of claim 25, wherein the retransmitting a data packet further comprises waiting for a predetermined number of acknowledgements, and retransmitting the data packet only if the data packet has not been acknowledged.

27. A network communications system comprising:

a receiver-side flow module configured to generate a SACK packet responsive to receiving a landing data packet at a receiver, the SACK packet including a plurality of sets of continuous ranges of transmit numbers of data packets received by the receiver, wherein:

at least two of the plurality of sets of continuous ranges are consecutive, a continuous range that includes the landing data packet is not consecutive with the at least two of the plurality of sets of continuous ranges identified in the SACK packet, a data packet with a transmit number between the at least two consecutive sets of continuous ranges of transmit numbers of data packets is not received by the receiver, and each of the transmit numbers identify an instance of transmission of a data packet and are different from a sequence number of the data packet; and a sender-side flow module configured to receive SACK packets from the receiver side flow module and, responsive to receiving a SACK packet, identify that the data packet with the transmit number between the two consecutive sets of continuous ranges of transmit numbers of data packets in the SACK packet had not been received by the receiver when the SACK packet was generated;

wherein a sender is coupled to the sender-side flow module for retransmitting data packets from the sender to the receiver based on the inferred lost packets.

28. The system of claim 27, wherein the sender-side flow control module is implemented within the sender.

29. The system of claim 27, wherein the receiver-side flow control module is implemented within a receiver.

30. A method for determining between a sender and receiver a data packet from the sender to retransmit to the receiver, the method comprising:

transmitting, by a sender, a plurality of data packets to a receiver, the sender identifying each of the plurality of data packets by a transmit number, the transmit number identifying an instance of transmission of the data packet and different from a sequence number of the data packet;

maintaining, by a receiver, a sorted list comprising an index of consecutive sets of continuous ranges of transmit numbers identifying data packets received by the receiver;

generating, by the receiver, a selection acknowledgment (SACK) packet, responsive to a landing data packet and identifying a plurality of ranges of transmit numbers of data packets that had been received prior to receipt of the landing data packet, at least two but less than the plurality of the sets of continuous ranges identified in the SACK packet being consecutive in the sorted list to identify transmit numbers of one or more data packets between the consecutive ranges have not been received, a continuous range that includes the landing data packet is not consecutive with the at least two of the plurality of sets of continuous ranges identified in the SACK packet, and the receiver advancing a left-off pointer past a transmit number in the sorted list to a previous point in the sorted list;

transmitting, by the receiver, the SACK packet, the SACK packet identifying the transmit number in the plurality of sets of continuous ranges of transmit numbers, the SACK packet not received by the sender;

generating, by the receiver, a second SACK packet identifying a second plurality of sets of continuous ranges of transmit numbers, the second SACK packet identifying the transmit number in the second plurality of sets of continuous ranges of transmit numbers based on the left-off pointer identifying one or more sets of continuous ranges of transmit numbers previously transmitted in the SACK packet;

identifying, by the sender, from the second SACK packet received from the receiver, that a data packet with a transmit number between two consecutive sets of continuous ranges of transmit numbers included in the second SACK packet was not received by the receiver; and transmitting, by the sender, the data packet identified by the transmit number.

* * * * *

UNITED STATES PATENT AND TRADEMARK OFFICE
CERTIFICATE OF CORRECTION

PATENT NO. : 7,630,305 B2
APPLICATION NO. : 10/902491
DATED : December 8, 2009
INVENTOR(S) : Samuels et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Second Day of November, 2010

David J. Kappos
*Director of the United States Patent and Trademark Office*